United States Patent
Gao et al.

(10) Patent No.: US 7,645,856 B2
(45) Date of Patent: Jan. 12, 2010

(54) ETHER NITRILE CO-POLYMERS CONTAINING SULFONIC ACID GROUPS FOR PEM APPLICATION

(75) Inventors: Yan Gao, Quebec (CA); Michael D. Guiver, Ottawa (CA); Gilles P. Robertson, Hull (CA)

(73) Assignee: National Research Council of Canada, Ottawa, Ontario (CA)

( * ) Notice: Subject to any disclaimer, the term of this patent is extended or adjusted under 35 U.S.C. 154(b) by 530 days.

(21) Appl. No.: 11/281,584

(22) Filed: Nov. 18, 2005

(65) Prior Publication Data

US 2007/0292731 A1 Dec. 20, 2007

Related U.S. Application Data

(60) Provisional application No. 60/628,910, filed on Nov. 19, 2004.

(51) Int. Cl.
C08G 75/24 (2006.01)
H01M 8/10 (2006.01)
B01J 49/00 (2006.01)

(52) U.S. Cl. .................. 528/391; 528/373; 528/488; 521/25; 521/27; 429/33

(58) Field of Classification Search .................. 528/373, 528/488, 391; 521/25, 27; 429/33
See application file for complete search history.

(56) References Cited

FOREIGN PATENT DOCUMENTS

WO    WO2004/086584    * 10/2004

OTHER PUBLICATIONS

Roziere, J.; Jones, D.J. Annu. Rev. Mater. Res 2003, 33, 503-55.

Mecerreyes, D.; Grande, H.; Miguel, O.; Ochoteco, E.; Marcilla, R.; Cantero, I. Chem. Mater. 2004, 16, 604-607.

Yang, Y.; Shi, Z.; Holdcroft, S. Macromolecules 2004, 37, 1678-1681.

Wang, I.; Meng, Y.Z.; Wang, S.J.; Shang, X.Y.; Li, L.; Hay, A.S. Macromolecules 2004, 37, 3151-3158.

Ueda ,M.; Toyota, H.; Ouchi, T.; Sugiyama, J. ; Yonetake, K. ; Masuko, T. ; Teramoto, T. J. Polym. Sci., Part A: Polym. Chem. Ed. 1993, 31, 853-858.

Genies, C.; Mercier, R.; Sillion, B.; Cornet, N.; Gebel, G.; Pineri, M. Polymer 2001, 42, 359-373.

Miyatake, K.; Hay, A.S.; J. Polym. Sci., Part A: Polym. Chem. Ed. 2001, 39 3211-3217.

Wang, F.; Hickner, M.; Kim, Y.S.; Zawodzinski, T.A.; McGrath, J.E. J. Membrane Sci. 2002, 197, 231-242.

Faure, S.; Cornet,N.; Gebel, G.; Mercier, R.; Pineri, M.; Sillion, B.; in Proceedings of the Second International Symposium on New Materials for Fuel Cell and Modem Battery System, (Savadogo, O.; Roberge, P.R. eds.), Montreal, Canada, Jul. 6-10, 1997, p. 818.

Nolte, R.; Ledjeff, K.; Bauer, M.; Mülhaupt, R. J. Membrane Sci. 1993, 83, 211-220.

Kobayashi, T.; Rikukawa, M.; Sanui, K.; Ogata, N. Solid State Ionics 1998, 106, 219-225.

(Continued)

Primary Examiner—Duc Truong
(74) Attorney, Agent, or Firm—J. Wayne Anderson

(57) ABSTRACT

Ether nitrile co-polymers containing sulfonic acid groups, including wholly aromatic poly(aryl ether ether nitrile)s containing sulfonic acid groups (SPAEEN)s, and poly(phthalazinone ether ketone nitrile) co-polymers containing sulfonic acid groups (SPPEKN)s, intended for fuel cells applications as proton conducting membrane materials, were prepared.

16 Claims, 32 Drawing Sheets

OTHER PUBLICATIONS

Glipa, X.; Haddad, M.E.; Jones, D.J.; Rozière, J. *Solid State Ionics* 1997, 97, 323-331.

Kerres, J.; Cui, W.; Reichle, S. *J. Polym. Sci., Part A: Polym. Chem. Ed* 1996 34 ,2421-2438.

Kim, Y.S.; Dong, L.; Hickner, M.A.; McGrath, J.E. *Macromolecules* 2003, 36, 6281.

Harrison, W.L.; Wang, F.; Mecham, J.B.; Bhanu, V.A.; Hill, M.; Kim, Y.S.; McGrath, J.E. *J. Polym. Sci. Part A: Polym. Chem.* 2003, 41, 2264.

Gao, Y.; Robertson, G.P.; Guiver, M.D.; Jian, X. *J. Polym. Sci. Part A: Polym. Chem.* 2003, 41, 497.

Gao, Y.; Robertson, G.P.; Guiver, M.D.; Jian, X.; Mikailenko, S.D.; Wang, K.; Kaliaguine, S. *J. Polym. Sci. Part A; Polym. Chem.*2003, 41, 2731.

Gao, Y.; Robertson, G.P.; Guiver, M.D.; Jian, X.; Mikhailenko, S.D.; Wang, K.; Kaliaguine S. *J. Membrane Sci.* 2003, 227,39.

Xiao, G.; Sun, G.; Yan, D.; Zhu, P.; Tao, P. *Polymer* 2002, 43, 5335.

Xiao, G.; Sun, G.; Yan, D. *Macromol. Rapid Commun*, 2002, 23, 488.

Gao, Y.; Robertson, G.P.; Guiver, M.D.; Mikhailenko, S.D.; Li, X.; Kaliaguine, S. *Macromolecules* 2004, 37, 6748.

Xing, P.; Robertson, Robertson G.P.; Guiver, M.D.; Mikhailenko, S.D; Kaliaguine, S. *Macromolecules* 2004 , 37, 7960.

Kricheldorf, H.R.; Meier, J.; Schwarz, G. *Macromol. Chem., Rapid Commun.* 1987, 8, 529.

Kricheldorf, H.R.; Berghahn, M. *Macromol. Chem. Rapid Commun.* 1991. 12, 529.

Kricheldorj, H.R.; Garaleh, M.; Schwarz, G. *J. Polym. Sci. Part A: Polym. Chem.* 2003, 41, 3838.

Sakaguchi, Y.; Kitamura, K.; Nagahara, S.; Takase, S. *Polym. Prepr.* 2004, 45, 56.

Sumner, M.J.; Harrison, W.L.; Weyers, R.M.; Kim, Y.S.; McGrath, J.E.; Riffle, J.S.; Brink, A.; Brink, M.H. *J. Membrane Sci.* 2004, 239, 199.

Meng, Y.Z.; Tjong, S.C.; Hay, A.S.; Wang, S.J. *J. Polym. Sci. Part A: Polym. Chem.* 2001, 39, 3218.

Besso, E.; Eisenberg, A. Properties and tructures of ionomers and ionomeric membranes, in Proceedings of the Symposium on Membranes ad Ionic and Electronic Conducting Polymers, (Yeager, E.B.; Schumm, B.; Mauritz, Jr. K.; Abbey, J.; Blankenship, D.; Akridge J. eds.), Cleveland, United States, May 17-19, 1982, p. 4.

Gierke, T.D.; Munn, G.E.; Wilson, F.C. *J. Polym Sci, Polym Phys* 1981, 19 1687.

Zawodzinski, T.A.; Derouin C.; Raszinski, S.; Sherman, R.J. ; Smith, V.T. ; Springer, T.E. ; Gottesfeld, S. *J. Electrochem. Soc.* 1993, 140, 1041.

Yoshida, S.; Hay, A.S. Macromolecules, 1995, 36, 2579-2581.

Ding, Y.; Hlil, A.R.; Hay, A.S. Polym Prepr, 1997, 38, 187-188.

Kim Y.S., Wang F., Hickner, M.; McCartney S., Hong Y.T.; Harrison W.; Zawodzinski, T.A.; McGrath, J.E.; *J Polym Sci Part B: Polym Phys* 2003; 41: 2816.

Kim, Y.S.; Dong,L.; Hickner, J.A.; McGrath, J.E. *Macromolecules* 2003, 36, 6281.

Gao Y. Robertson G.P.; Guiver, M.D.; Mikhailenko, S.D.; Li, X.; Kaliaguine, S.; *Macromolecules* 2005; 38:3237.

\* cited by examiner

Wave Number (cm$^{-1}$)

ETHER NITRILE CO-POLYMERS CONTAINING SULFONIC ACID GROUPS FOR PEM APPLICATION

CROSS REFERENCE TO RELATED APPLICATION

This application claims priority on U.S. provisional application No. 60/628,910 filed Nov. 19, 2004, the entire content of which is hereby incorporated by reference.

BACKGROUND OF THE INVENTION

During the past several years, proton conducting polymers have attracted much attention due to their considerable promise for applications in some electrochemical devices, such as displays or sensors, and which is most important, as proton exchange membranes (PEM) in PEM fuel cells (PEMFC) and direct methanol fuel cells (DMFC). In PEMFCs and DMFCs, PEMs serve as separators for the reactants, catalysts support and provide the required ionic pathway between the anode and the cathode. Therefore, their properties such as proton conductivity, water maintenance, permeability for fuel and chemical stability are crucial for the fuel cells performance. Although perfluorosulfonic acid ionomers such as Nafion®, developed by DuPont, are considered state-of-the art, their high cost, difficulty in preparation, high methanol crossover and dramatic decrease in proton conductivity at temperatures over 80° C. due to the dehydration of membranes limit their further applications. As a response to the commercial need for less expensive and more versatile polymer electrolytes, the synthesis and characterization of new membrane materials has become an active research area[1].

High performance polymers are an important category of alternative candidates for PEMs. Many kinds of high performance polymers, such as poly(aryl ether sulfone)s, poly(aryl ether ketone)s, poly(ether imide)s, polybenzimidazole, poly (phenylene oxide), poly(phenylene sulfide), etc, are well known for their excellent thermal, mechanical and dielectric properties and good oxidative resistance. After modification they show rather high proton conductivities[2-23] and become promising PEM materials. Wang and McGrath[8] for example, reported the synthesis of biphenyl-based poly(arylene ether sulfone)s containing sulfonic acid groups by direct polymerization reactions of dipotassium 3,3'-disulfonate-4,4'-dichlorodiphenylsulfone (SDCDPS), 4,4'-dichlorodiphenylsulfone and 4,4'-biphenol. The proton conductivity values at 30° C. of 0.11 S/cm for 40% SDCDPS copolymer and 0.17 S/cm for the 60% SDCDPS copolymer were measured. Our group[17-19] and Xiao et al[20, 21] also reported the synthesis and conductivities of poly(phthalazinone ether ketone)s and poly(phthalazinone ether sulfone)s containing sulfonic acid groups, prepared by both, post-synthesis sulfonation reactions and by direct polymerization reactions. Both methods gave polymers with conductivities higher than $10^{-2}$ S/cm at around SC 1.0. However, this category of polymers has a tendency to swell at high humidity and elevated temperature, especially the polymers with high sulfonic acid content. As a consequence the membranes lose the mechanical strength and their ability to function under FC conditions becomes questionable. Aromatic poly(aryl ether nitrile)s are a new class of high performance thermoplastic polymers that exhibit good mechanical properties, high chemical and thermal resistance and have already been used as matrices in advanced composites in aerospace industries[24-38]. Aromatic poly(aryl ether nitrile)s have been prepared by Kricheldorf, McGrath and other researchers[24-38] via nucleophilic substitution polycondensation reactions of bisphenols and dihalobenzonitriles or dinitrobenzonitriles in dipolar solvents. Unlike many other poly (aryl ether)s, poly(aryl ether nitrile)s have strongly polar nitrile groups, pendant on aromatic rings, which will most probably promote adhesion of the polymers to many substrates via interaction with other polar chemical groups. It is believed that for PEM applications, the enhanced adhesive ability of aromatic poly(aryl ether nitrile)s to inorganic compounds is beneficial for adhesion of catalyst to the PEM. Recently, it was reported[39,40] that nitrile groups were introduced into poly(aryl ether sulfone)s containing sulfonic acid groups with the aim to decrease the swelling of membrane films via enhanced intermolecular interaction and potentially promote adhesion of the polymers to heteropolyacids in the composite membrane or to electrodes in order to improve the quality of membrane electrolyte assemblies (MEA)s.

SUMMARY OF THE INVENTION

According to one aspect of the invention, we provide a new class of poly(aryl ether ether nitrile) copolymers containing various amounts of sulfonic acid groups (SPAEEN)s, a method for preparing same and their application in the fuel cell domain as proton exchange membrane (PEM) materials.

According to another aspect of the invention, we provide a new class of poly(phthalazinone ether ketone nitrile) copolymers containing sulfonic acid groups (SPPEKN), a method for their preparation via nucleophilic polycondensation reactions and their use as PEMs in fuel cells.

DETAILED DESCRIPTION OF THE INVENTION

Experimental Part (SPAEEN)s

Figure 1A:
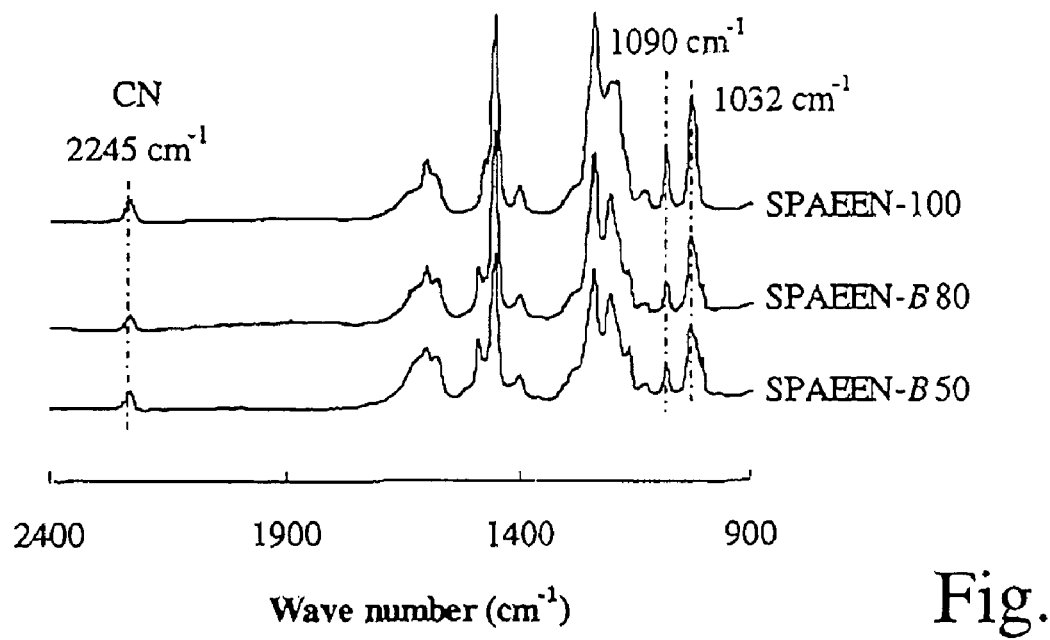
FIG. 1 illustrates FT-IR spectra of SPAEEN copolymers

Materials.

SHQ was recrystallized from water and ethanol. NMP was vacuum distilled and 4,4'-biphenol was purified by sublimation before use. All other chemicals (obtained from Aldrich) were reagent grade and used as received.

Copolymerization.

Synthesis of the polymers by nucleophilic substitution reactions was based on the procedure reported by McGrath[25]. In a typical reaction, 10.1 mmol 2,6-DFBN, 7 mmol SHQ, 3 mmol 4,4'-biphenol, and 15 mmol K$_2$CO$_3$ were added into a three-neck equipped flask with a magnetic stirrer, a Dean-Stark trap, and an argon gas inlet. Then, 13 mL NMP and 15 mL chlorobenzene were charged into the reaction flask under an argon atmosphere. The reaction mixture was heated to 130° C. After dehydration and removal of chlorobenzene, the reaction temperature was increased to about 160° C. When the solution viscosity had apparently increased, the mixture was cooled to 100° C. and coagulated into a large excess of ethanol or water with vigorous stirring. The resulting polymer was designated SPAEEN-B70, where B denotes that the comonomer is 4,4'-biphenol; while Q denotes hydroquinone as comonomer. n (70) refers to the SHQ content of aromatic phenol monomers. After washing with ethanol twice, SPAEENs were washed with water to remove salt. SPAEENs with high SC values, that either swell or dissolve in water, were purified by dialysis for a week to remove salt, using a membrane-cellulose dialysis tube (Serva Electrophoresis, Germany) with a molecular weight cut off value of 3500.

Copolymer Analysis and Measurement.

$^1$H-NMR spectra were obtained on a Varian Unity Inova NMR spectrometer operating at a proton frequency of 399.95 MHz. Deuterated dimethylsulfoxide (DMSO-d$_6$) was the NMR solvent and the DMSO signal at 2.50 ppm was used as the chemical shift reference. IR spectra were measured on a Nicolet 520 Fourier transform spectrometer with membrane film samples in a diamond cell.

A TA Instruments thermogravimetric analyser (TGA) instrument model 2950 was used for measuring T$_d$. Polymer samples for TGA analysis were preheated to 150° C. at 10° C./min under nitrogen atmosphere and held isothermally for 40 min for moisture removal. Samples were then heated from 90° C. to 750° C. at 10° C./min for T$_d$ measurement. A TA Instruments differential scanning calorimeter (DSC) model 2920 calibrated with Tin at 231.93° C. and Zinc at 419.53° C. was used for measuring T$_g$. Samples in potassium form for DSC analysis were initially heated rapidly at a rate of 20° C./min under nitrogen atmosphere to 20° C. higher than their T$_g$, followed by quenching in liquid nitrogen. When the DSC cell had cooled to around 50° C., the samples were replaced in the cell and heated at a rate of 10° C./min to 400° C. The procedure for samples in acid form was similar except that the initial heating rate was 10° C./min and the end point was below the polymer T$_d$ point.

Intrinsic viscosities were determined using an Ubbelohde viscometer for N,N-dimethylacetamide (DMAC) solutions of copolymer at 25° C.

Preparation of Membrane Films.

An amount of 0.7 to 0.8 g copolymer in the potassium salt form was dissolved in 20 mL of DMAc and filtered. The filtered solution was poured onto a glass plate and dried at about 40° C. under a constant purge of nitrogen for about one day. The acid form (SPAEENH-B or SPAEENH-Q) membrane films were obtained by immersing corresponding potassium form SPAEEN-B or SPAEEN-Q membrane films in 2 NH$_2$SO$_4$ for 24 h at room temperature, and then in deionized water for another 24 h during which water was chanced several times. The thickness of all membrane films was in the range of 40 to 70 µm.

Water Uptake Content Measurement and Swelling Ratio

The membrane films were dried at 100° C. overnight prior to the measurements. After measuring the lengths and weights of dry membranes, the sample films were soaked in deionized water for 24 h at predetermined temperatures. Before measuring the lengths and weights of hydrated membranes, the water was removed from the membrane surface by blotting with a paper towel. The water uptake content was calculated by $$\text{Uptake content } (\%) = \frac{\omega_{wet} - \omega_{dry}}{\omega_{dry}} \times 100\%$$

Where $\omega_{dry}$ and $\omega_{wet}$ are the masses of dried and wet samples respectively. The swelling ratio was calculated from films 5~10 cm long by:

$$\text{Swelling ratio } (\%) = \frac{l_{wet} - l_{dry}}{l_{dry}} \times 100\%$$

Where $I_{dry}$ and $I_{wet}$ are the lengths of dry and wet samples respectively.

Tensile Test

Tensile tests were performed on an Instron tensile tester (model 1123) at a strain speed of 50 mm/min at room temperature. Membrane films with typical size of 40 mm×4 mm×0.05 mm were used for testing.

Proton Conductivity

The proton conductivity measurements were performed on SPAEENH-B or SPAEENH-Q membrane films by AC impedance spectroscopy over a frequency range of 1-10$^7$ Hz with oscillating voltage 50-500 mV, using a system based on a Solatron 1260 gain phase analyzer. A 20×10 mm membrane sample was placed in a temperature controlled cell open to the air by a pinhole where the sample was equilibrated at 100% RH at ambient atmospheric pressure and clamped between two stainless steel electrodes. Specimens were soaked in deionized water for 24 to 48 h prior to the test. The conductivity (σ) of the samples in the longitudinal direction was calculated from the impedance data, using the relationship σ=d/RS where d and S are the thickness and face area of the sample respectively and R was derived from the low intersect of the high frequency semi-circle on a complex impedance plane with the Re (Z) axis. The impedance data were corrected for the contribution from empty and short circuited cell.

Results and Discussion

Synthesis and Characterization of SPAEENs

High performance polymers containing sulfonic acid groups are typically prepared either by post-sulfonation reaction or direct polymerization reaction of sulfonated monomers. Direct polymerization is susceptible to possible side reactions such as degradation and cross-linking, that could occur in strongly acidic media usually used for post-sulfonation. As shown in Scheme 1, SPAEENs were prepared via the nucleophilic polycondensation reactions of SHQ, 2,6-DFBN and the third monomer, 4,4'-biphenol or hydroquinone.

4,4'-biphenol (B) or hydroquinone (Q) with one mole of 2,6-DFBN, the SC is expressed as the molar ratio of SHQ units (bearing the —$SO_3Na$ group) to 1.0 molar 2,6-DFBN unit. For example, the average repeat unit of SPAEEN-Q70 is composed of 0.7 unit of SHQ, 0.3 unit of hydroquinone (Q) and 1.0 unit of 2,6-DFBN. Expressed in this way, both the number of —$SO_3Na$ groups per polymer repeat unit and the ratio of diol monomers (SC:1-SC) can be conveniently derived. Equivalent molecular weight (Meq) and ionic exchange capability (IEC) were also calculated theoretically and listed in Table 1 for comparison.

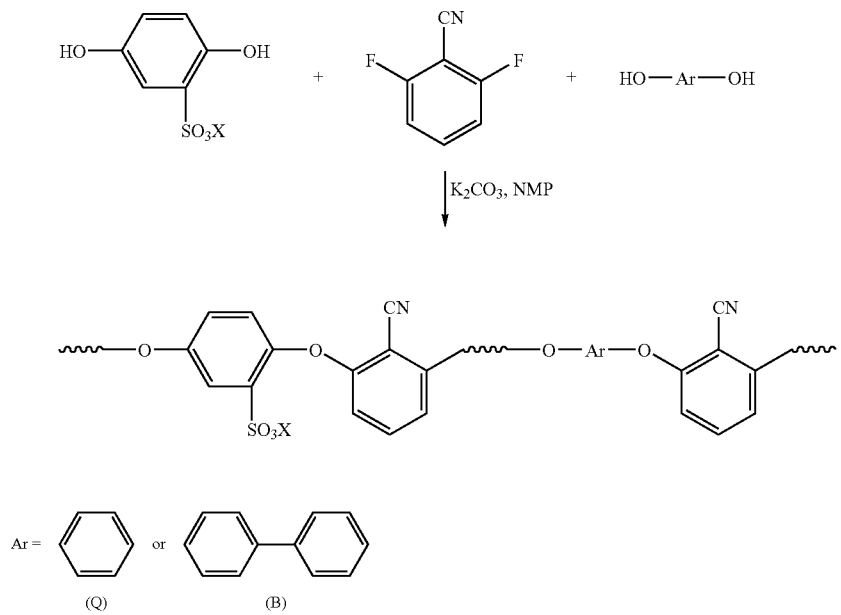

wherein X=K, Na or H

Since the copolymers were formed by reacting a combined amount of one mole of sulfonated diol (SHQ) and either

TABLE 1

Syntheses of SPAEEN copolymers

| Polymer | SHQ mmol | Second diphenol mmol | 2,6-DFBN mmol | $[\eta]^a$ dL/g | Calculated Meq (IEC) g/mol $SO_3$ (Meq $g^{-1}$) | SC from monomer ratio | SC experimental value from $^1$H NMR data |
|---|---|---|---|---|---|---|---|
| SPAEEN-100 | 10 | — | 4 | 3.28 | 289 (3.46) | 1.0 | 1.0 |
| SPAEEN-B90 | 9 | 1 | 10 | 3.52 | 321 (3.12) | 0.9 | 0.91 |
| SPAEEN-B80 | 8 | 2 | 10 | 1.78 | 361 (2.77) | 0.8 | 0.78 |
| SPAEEN-B70 | 7 | 3 | 10 | 1.59 | 412 (2.43) | 0.7 | 0.67 |
| SPAEEN-B60 | 6 | 4 | 10 | 1.95 | 479 (2.09) | 0.6 | 0.62 |
| SPAEEN-B50 | 5 | 5 | 10 | 1.73 | 575 (1.74) | 0.5 | 0.48 |
| SPAEEN-Q90 | 9 | 1 | 10 | 2.85 | 313 (3.20) | 0.9 | — |
| SPAEEN-Q80 | 8 | 2 | 10 | 2.03 | 342 (2.93) | 0.8 | — |
| SPAEEN-Q70 | 7 | 3 | 10 | 1.79 | 379 (2.64) | 0.7 | — |
| SPAEEN-Q60 | 6 | 4 | 10 | 2.38 | 429 (2.33) | 0.6 | — |
| SPAEEN-Q50 | 5 | 5 | 10 | 2.88 | 498 (2.01) | 0.5 | — |

$^a$Measured at 25° C. in DMAc.

For SPAEENs with lower SC values, the polymerization reaction proceeded homogenously. However, for SPAEENs with higher SC values, SPAEENs precipitated to the bottom of flask at the end of polymerization reactions. Table 1 lists the resulting polymers and details of the polymerization conditions. For the purpose of obtaining polymers with high proton conductivities (preferably higher than $10^{-2}$ S/cm), only SPAEENs with high SC values were synthesized. SPAEENs with SC values from 0.5 to 1.0 were obtained by changing the feed ratio of SHQ to unsulfonated monomer 4,4'-biphenol or hydroquinone. Both the homopolymer and copolymers exhibit intrinsic viscosities higher than 1.6 in DMAc at 25° C. indicating the high molecular weights of resulting polymers. Although much higher molecular weight polymers could be obtained by lengthening the reaction time, polymerization reactions were stopped when obvious increases in the viscosity of reaction solutions were observed. Much longer reaction times resulted in much more viscous polymer solutions containing some gel. Such products were difficult to redissolve completely, which makes subsequent membrane film casting more complicated.

All the polymer series were transformed by solution casting into strong transparent and tough membrane films, which is usually characteristic of the polymers with high molecular weights. All obtained SPAEENs had good solubility in aprotic solvents such as NMP, DMAc, and dimethylsulfoxide (DMSO).

Figure 1B:
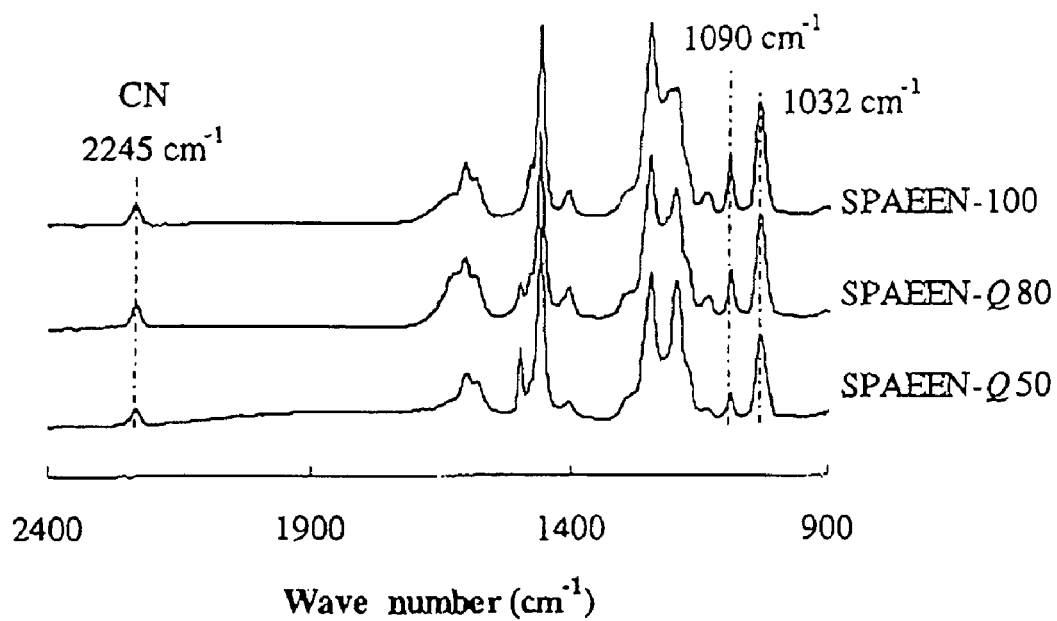
Figure 2:
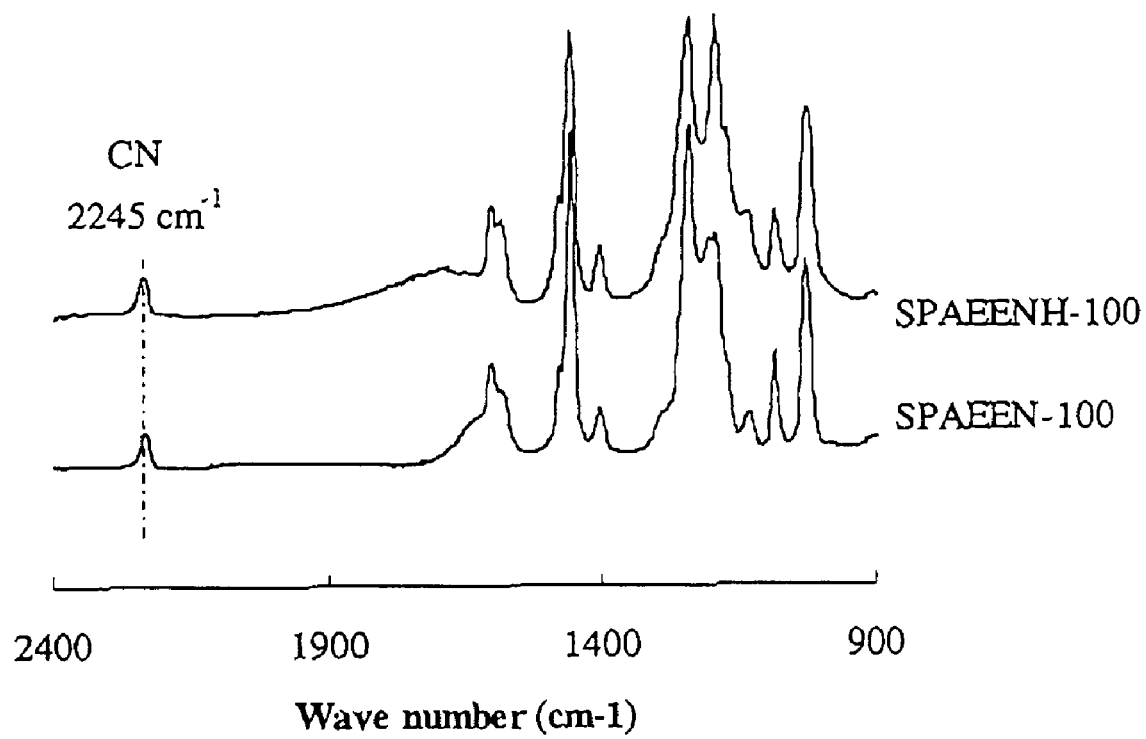
FIG. 2 illustrates FT-IR spectra of SPAEEN-100 and SPAEENH-100

Sulfonic acids or sulfonates are considered to be leaving groups that have a tendency to dissociate from their parent structure during high temperature reactions, as has been previously observed[41]. FT-IR is a convenient method to analyze the structures of polymers containing sulfonic or sulfonate groups. It was used in this work to verify if partial or complete loss of the sulfonate groups occurs during polymerization reactions. Representative FT-IR spectra of SPAEEN in potassium form are showed in FIG. 1. In the spectra of both series of SPAEENs, characteristic bands of the aromatic sulfonate salt symmetric and asymmetric stretching vibrations were observed at 1032 and 1090 $cm^{-1}$. In both series of SPAEENs the intensity of two characteristic absorption bands were observed to increase with SC, which confirm successful introduction of sulfonate groups into polymers. The characteristic symmetric stretching band of nitrile groups was observed at 2245 $cm^{-1}$. The absorption bands at 1197 and 1244 $cm^{-1}$, assigned to phenoxy groups, are overlapped at high SC. The absorption bands at 1458 and 1498 $cm^{-1}$ were assigned to phenyl ring and a band around 1600 $cm^{-1}$ is attributed to C=C stretching. The FT-IR spectrum of SPAEENH-100 is shown in FIG. 2 together reason with that of potassium form of SPAEEN-100 for comparative purpose. FIG. 2 shows that the vibration absorptions of phenoxy groups at 1197 and 1244 $cm^{-1}$ of SPAEEN are separate in acid form compared with potassium form. None of the samples exhibited a decrease in the intensity of the band at 2245 $cm^{-1}$, which is a characteristic symmetric stretching vibration of nitrile groups. In the FT-IR spectrum of SPAEENH-100, an ambiguous absorption appears around 1700 $cm^{-1}$. This absorption region is specific for stretching vibrations of carbonyl or carboxyl groups. The observed broad band is however believed not to be due to absorption of carboxyl groups since they are sensitive groups that show sharp absorption bands between 1650 and 1670 $cm^{-1}$. Thus, immersion of the SPAEEN membrane films in $2NH_2SO_4$ followed by immersion in deionized water at room temperature did not provoke a noticeable hydrolysis of nitrile groups to carboxyl groups.

Figure 3:
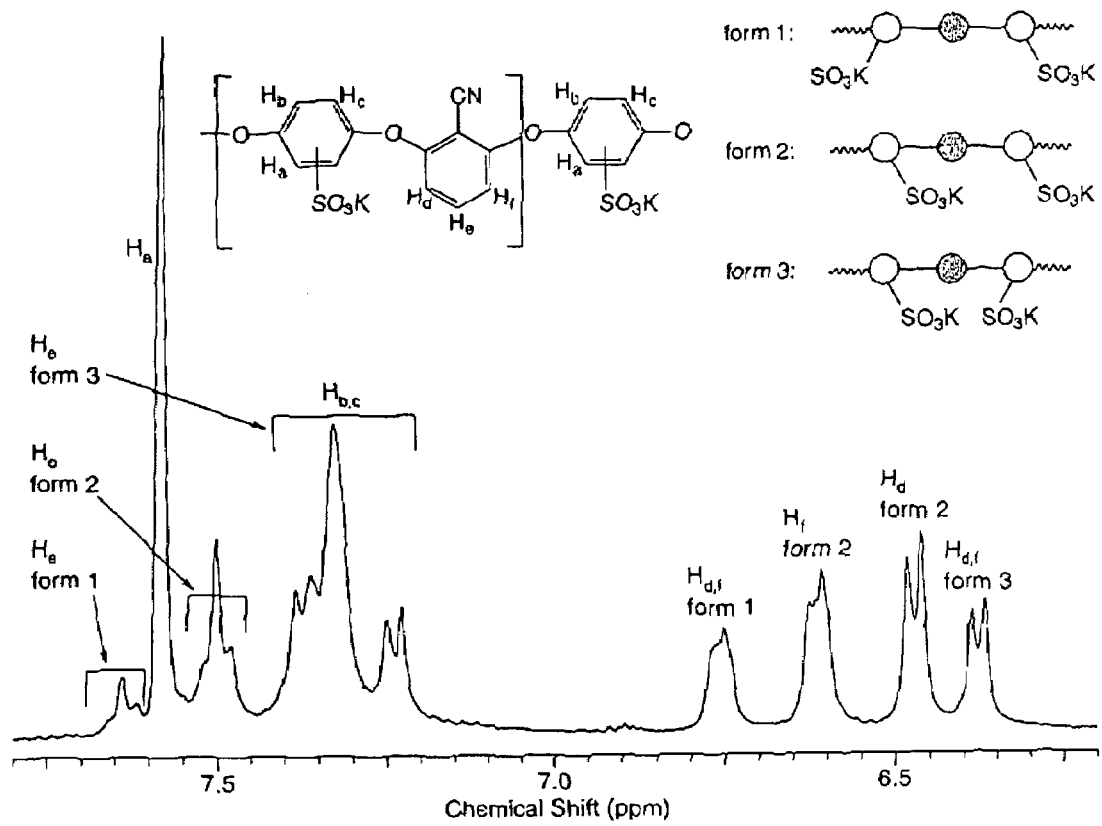
FIG. 3 illustrates $^1$H NMR spectrum of SPAEEN-100 in DMSO-$d_6$.

The structural properties of the synthesized polymers were also studied by liquid phase $^1H$ NMR spectroscopy with DMSO-$d_6$ as the solvent. FIG. 3 shows a spectrum of the aromatic protons for the highly sulfonated homopolymer SPAEEN-100 in potassium form prepared from 2,6-DFBN and sulfonated hydroquinone at 1:1 monomer ratio. Also illustrated in FIG. 3 are the chemical structure of the polymer and the expected distribution of repeat unit configurations arising from the structural asymmetry of the sulfonated hydroquinone monomer. The asymmetric monomer can be introduced in the chain in two different ways where the —$SO_3K$ group will either be adjacent or opposite to the benzonitrile phenyl ring. Therefore, every polymer repeat unit will have one of the three possible configurations whereby the —$SO_3K$ groups can be symmetrically arranged (forms 1 and 3) or asymmetrically arranged (form 2, statistically predominant) about the benzonitrile phenyl ring. The evidence of this distribution of three types of repeat units was seen in the $^1H$ NMR spectrum of FIG. 3, which can be divided into two regions: one of the higher frequencies (7.15-7.70 ppm, 4.00H) and the other of the lower frequencies (6.30-6.85 ppm, 2.00H). The four low frequency signals on the right end of the spectrum were found to be the benzonitrile phenyl ring protons $H_d$ and $H_f$ which were spin-coupled ($^3J_{H-H}$, 8 Hz) with the $H_e$ triplets (7.64, 7.50, 7.39 ppm, 8 Hz) on the left side of the spectrum. The sulfonated hydroquinone phenyl ring protons $H_{a,b,c}$ were found at higher frequency due to the effect of the electron withdrawing sulfonic acid salt group. A 2D-ROESY spectrum was used to show that $H_a$ was close in space to $H_d$ and $H_f$ for the configurations with the —$SO_3K$ groups opposite the benzonitrile phenyl ring. Therefore, unambiguous assignment was achieved for the $H_{d,e,f}$ signals of all three possible configurations shown in FIG. 3. The ROESY spectrum showed that the signal at 7.58 ppm ($H_a$) was close in space to two signals at 6.61 and 6.76 ppm which could only be from $H_f$ of form 2 and $H_{d,f}$ of form 1 respectively. As expected, the signals $H_{d,e,f}$ from form 2 had higher intensities than those of forms 1 or 3 due to the statistical predominance of form 2; the distribution of forms 1, 2 and 3 was found to be 1:3:1. Electron shielding from the adjacent electron rich —$SO_3K$ groups is responsible for the shift of $H_d$ (form 2) and $H_{d,f}$ (form 3) towards lower frequencies.

Figure 4:
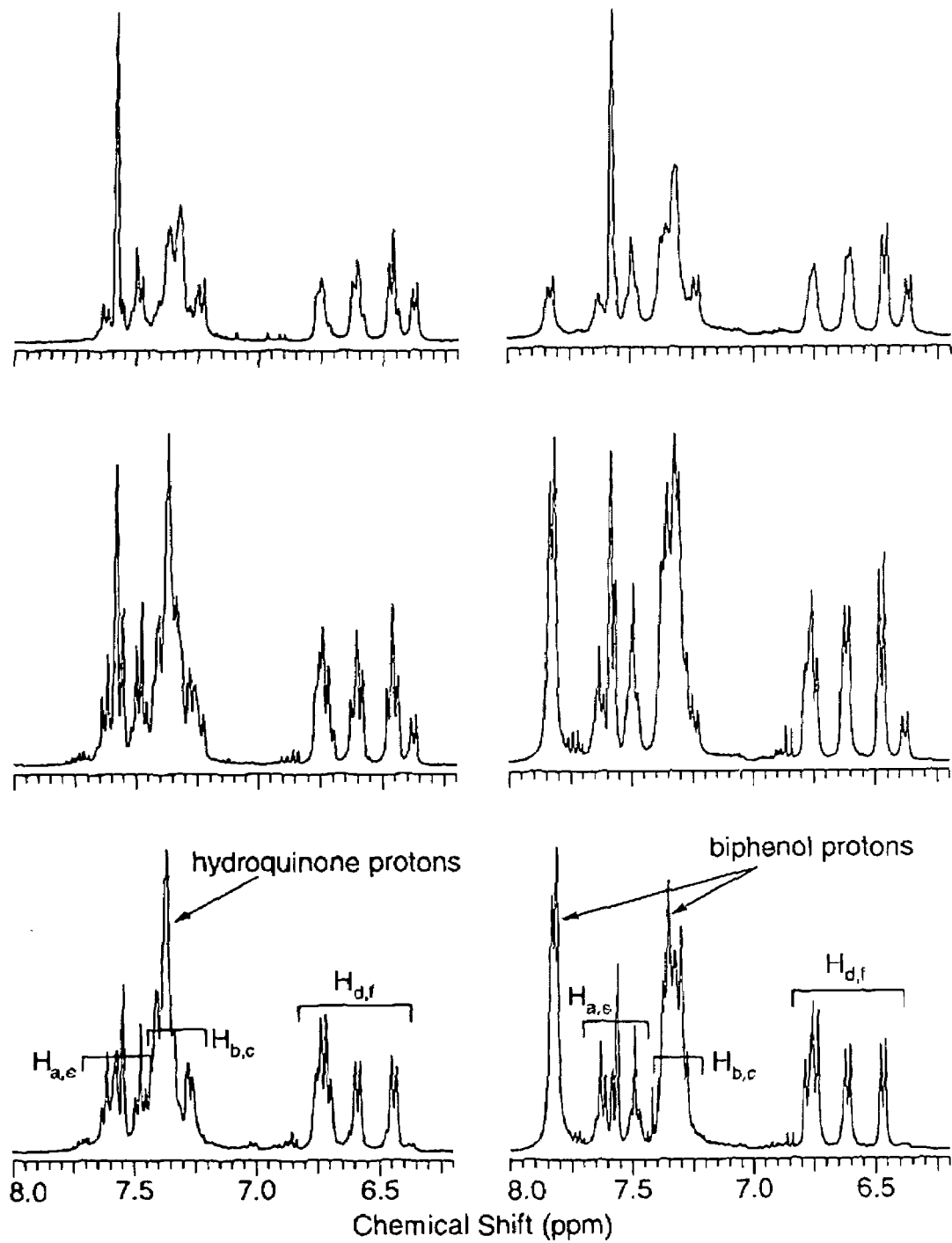
FIG. 4 illustrates $^1$H NMR spectra of SPAEEN copolymers in DMSO-$d_6$; left column: SPAEEN-Q90 (top), SPAEEN-Q70 (middle) and SPAEEN-Q50 (bottom), right column: SPAEEN-B90 (top), SPAEEN-B70 (middle) and SPAEEN-B50 (bottom).

The complete analysis of the NMR spectrum from the homopolymer SPAEEN-100 greatly simplified the interpretation of the more complicated copolymer spectra. FIG. 4 shows stacked spectra of three SPAEEN-Qs (left column) and three SPAEEN-B copolymers (right column). The spectra clearly show the gradual decrease of the far right signal ($H_{d,f}$ of form 3) for both SPAEEN-Q and SPAEEN-B polymer derivatives with decreased SCs. That signal is expected to decrease statistically as it originates exclusively from the symmetric $H_{d,f}$ which are shielded by the adjacent —$SO_3K$ groups of form 3. On the other hand, the less shielded $H_d$ and $H_f$ signals around 6.75 ppm grow in intensities as the content of sulfonated monomer is replaced by either hydroquinone (SPAEEN-Q) or biphenol (SPAEEN-B) monomers. Similarly, the strong $H_a$ signal (7.58 ppm) originating from the hydrogen at the ortho —$SO_3K$ position decreases in intensity as the sulfonated monomers are being replaced by non-sulfonated monomers. The trend and regularity of intensity variation for all of the previously described signals is obvious. As before[22, 23], these $^1H$ NMR spectra were used to estimate the SCs by comparison of the intensities of specific signals. The advantage of $^1H$ NMR over elemental analysis resides in the fact that residual solvents or moisture in the polymers do not appear in the aromatic region of the spectra hence have no detrimental effect on SC calculations. The equations were conveniently derived because the spectra are divided in two distinct regions, S1 (7.0-8.0 ppm) and S2 (6.2-7.0 ppm), for both the copolymer derivatives. The integral (signal intensity) values of S1 and S2 were used in the calculation of the SCs as follows:

$$SPAEEN\text{-}Q\frac{S1}{S2} = \frac{(5-n)}{(2)}$$

$$SPAEEN\text{-}B\frac{S1}{S2} = \frac{(9-5n)}{(2)}$$

where:
S1 of SPAEEN-Q (7.0–8.0 ppm)=$n \times H_{abc} + H_e + (1-n) \times HQ = 3n + 1(1-n) \times 4$
S1 of SPAEEN-B (7.0–8.0 ppm)=$n \times H_{abc} + H_e + (1-n) \times HB = 3n + 1 + (1-n) \times 8$
S2 of SPAEEN-Q and 52 of SPAEEN-B (6.2–7.0 ppm)= $H_{df} = 2$
n=number of SHQ groups=SC(maximum=1.00)

The experimental SC for the SPAEEN-Bs copolymers were found to be within 0.02 of the calculated SC (listed in Table 1). Unfortunately, the differences between experimental and calculated SC values for SPAEEN-Q series were larger, possibly due to the presence of smaller signals which have a significant effect on the integration values. These signals may arise from chain-end groups or from different conformations of SPAEEN-Q polymer chains with more restricted chain movement. Their chemical shifts would be different from the main chain proton signals and therefore, for the SC calculation to be accurate, they must all be accounted for and their intensity values assigned to the proper integral region S1 or S2. As these signals are small, difficult to identify and overlap with other major signals, this is difficult to accomplish. The deviation between experimentally derived NMR values and calculated SC values may be a result of distinctive structural properties for this polymer in comparison with SPAEEN-Bs. The experimental NMR results for the SCs of SPAEEN-Q copolymers are not reported. However, based on the regularity of intensity variations of aromatic signals, observed and described above, it is believed that the SCs are close to the expected values, derived from the reaction feed ratios.

Thermal Properties of SPAEEN

Thermal stabilities of the SPAEEN copolymers in both potassium and acid forms were investigated by TGA analysis. $T_d$ measurements were conducted from 90° C. to 750° C. at a heating rate of 10° C./min and the results are listed in Table 2.

TABLE 2

Thermal properties of SPAEEN copolymers

| Polymer | $T_g$ (° C.) | | $T_{d5\%}$ (° C.) | | $T_d$ (° C.) extrapolated onset for first weight loss | |
|---|---|---|---|---|---|---|
| | Potassium form | Acid form | Potassium form | Acid form | Potassium form | Acid form |
| SPAEEN-100 | 371 | ND | 451 | 325 | 440 | 327 |
| SPAEEN-B90 | 365 | ND | 445 | 337 | 433 | 336 |
| SPAEEN-B80 | 353 | ND | 442 | 340 | 427 | 334 |
| SPAEEN-B70 | 339 | ND | 454 | 334 | 441 | 317 |
| SPAEEN-B60 | 350 | ND | 428 | 328 | 442 | 316 |
| SPAEEN-B50 | 345 | ND | 426 | 318 | 441 | 289 |
| SPAEEN-Q90 | 357 | ND | 453 | 337 | 441 | 336 |
| SPAEEN-Q80 | 350 | ND | 446 | 330 | 439 | 298 |
| SPAEEN-Q70 | 333 | ND | 432 | 330 | 434 | 315 |
| SPAEEN-Q60 | 316 | ND | 443 | 342 | 440 | 324 |
| SPAEEN-Q50 | 308 | ND | 434 | 339 | 433 | 333 |

*ND: Not detected

Figure 5:
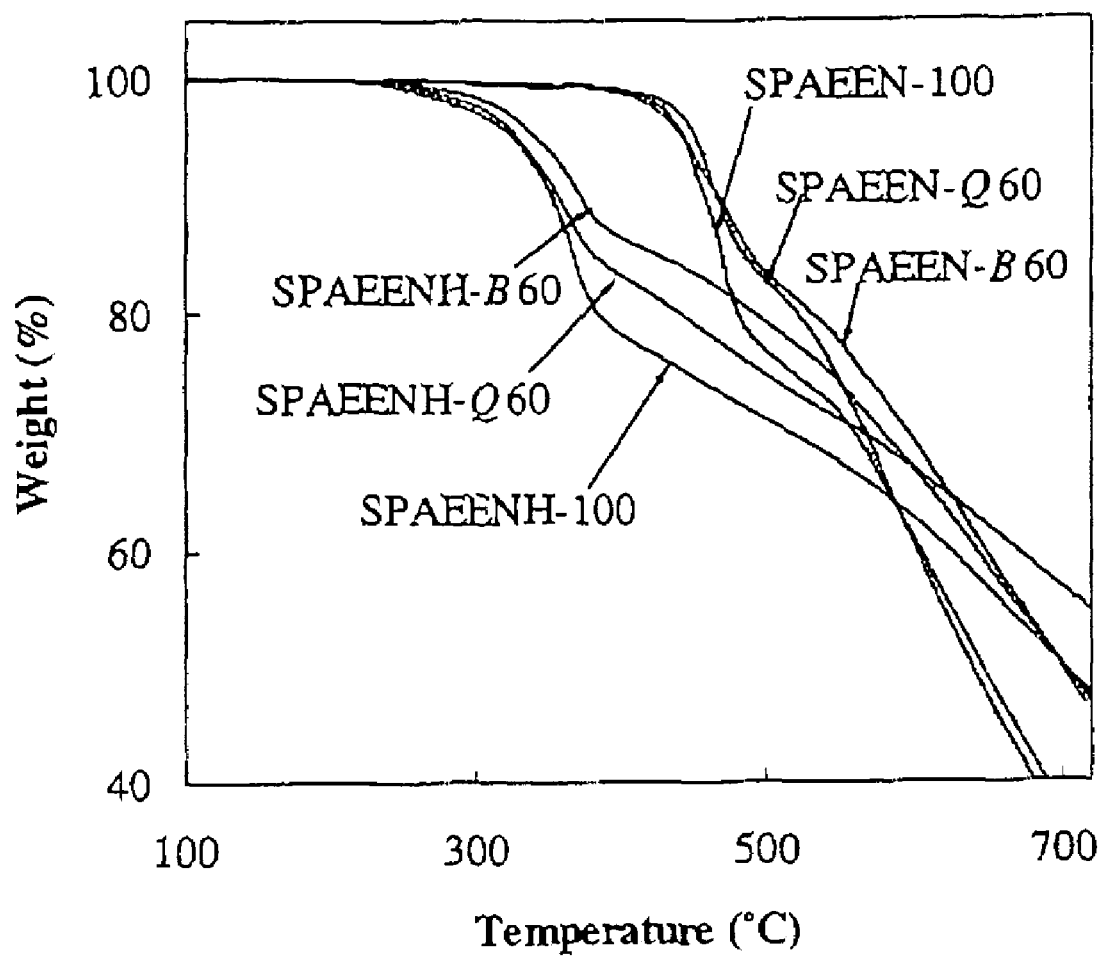
FIG. 5 illustrates TGA traces of SPAEEN copolymers

Table 2 shows that $T_{d5\%}$ and onset weight loss temperatures ($T_d$) of SPAEEN copolymers in potassium form are observed between 432 to 453° C., indicating good thermal stabilities. In contrast with potassium forms, $T_{d5\%}$s and $T_d$s of copolymers in acid form are observed between 318 to 342° C., more than 100° C. lower than potassium form. A comparison of potassium and acid forms is also shown in FIG. 5. The TGA curves are similar to those of poly(aryl ether ketone)s and poly(aryl ether sulfone)s containing sulfonic acid groups[17-19, 22] prepared before by our group. Polymers in potassium form exhibit only one weight-loss step in their TGA curves and in acid form exhibit a much earlier decomposition and two distinct transition steps.

Figure 6A:
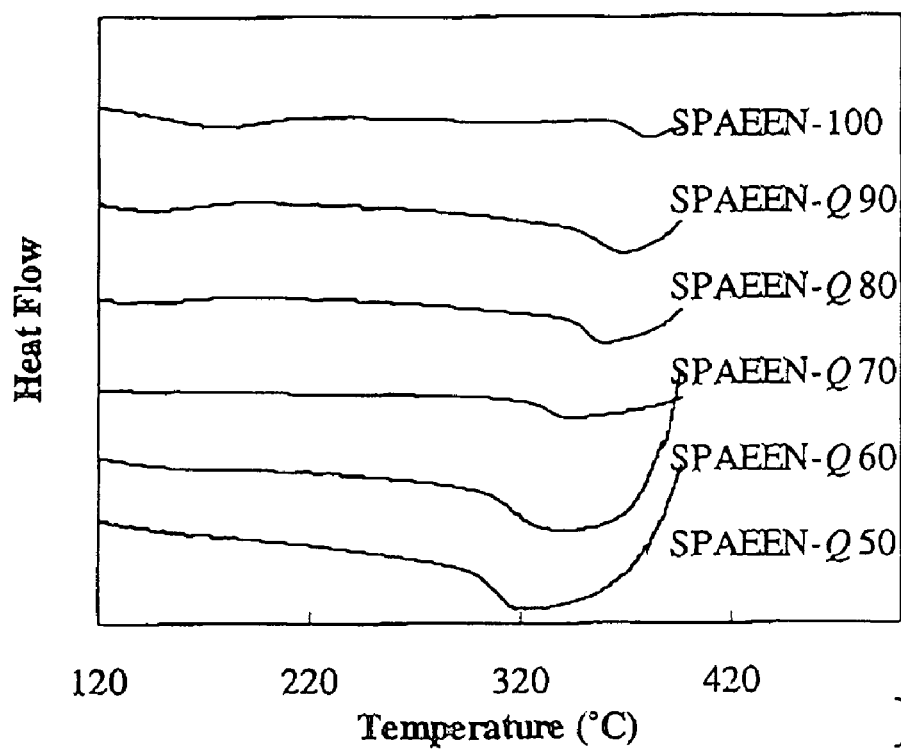
FIG. 6 illustrates DSC curves of SPAEEN copolymers in potassium sulfonate form
Figure 6B:
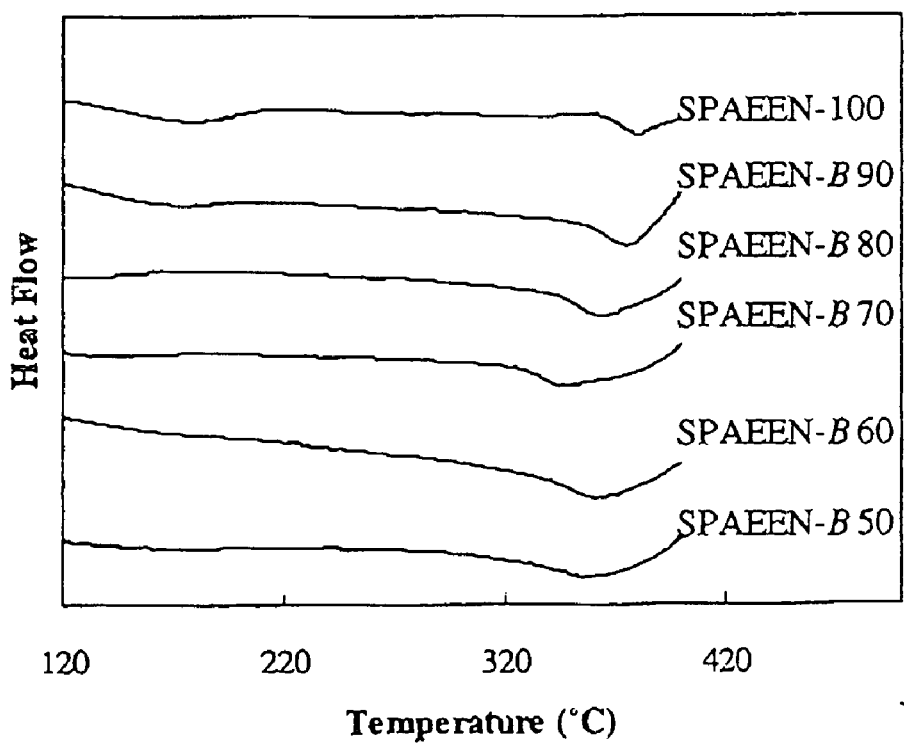

$T_g$s of copolymers in both potassium and acid forms reported here were mainly obtained from the second scan except SPAEEN-100, for which $T_g$ was determined in the first run. DSC curves of SPAEEN in potassium form are plotted in FIG. 6. From our previous studies and from the literatures[8,17-19], it is known that glass transition is less pronounced in the DSC curves of poly(aryl ether ketone)s or poly(aryl ether sulfone)s containing sulfonate groups, compared to their parent polymers. However, SPAEEN copolymers, as can be seen from FIG. 6, exhibited distinctive glass transitions in their DSC curves. All samples were amorphous and only a single $T_g$ is discernable on each curve. The obtained $T_g$s are listed in Table 2. It is seen that the $T_g$s of copolymers in potassium form increase with SC values varying from 308 to 371° C. for SPAEEN-Qs and from 339 to 371 for SPAEEN-Bs. Compared with the unsulfonated nitrile copolymer (PEEN), which shows a $T_g$ value at 144° C., all the prepared SPAEEN copolymers in potassium form show more than a two-fold increase in $T_g$. It was discussed previously[18] that the increase in $T_g$s is mainly the result of introducing of sulfonate groups, which increases the intermolecular interactions by pendant ions, enhances molecular bulkiness, and raises the rotation activation energy of polymer molecular segment. This can be expressed as $T_g \Box cq/a$, where c is the concentration of ionic repeat unit in backbone, q is the cation charge, and a is the distance of closest approach between the centers of charge of the anion and cation[42]. Furthermore, cluster formation due to the separation of hydrophilic and hydrophobic domains also contributed to the increase in $T_g$[21]. For SPAEEN-Q copolymers $T_g$s continually goes down when SC decreases. However, for SPAEEN-B copolymers, the $T_g$ dependence on the SC is not the same. From SPAEEN-100 to SPAEEN-B50, $T_g$s decrease with decreasing SC values initially, and then begin to increase at a certain SC value. To explain this, it should be taken into consideration that a decrease in the content of sulfonate groups is achieved by decrease in the feed ratio of SHQ to biphenol during synthesis. However, the increase in polymer rigidity caused by replacement of short benzene ring by long rigid biphenyl between two ether linkages, which results in an increase in $T_g$s of SPAEEN-B copolymers. Therefore, when the content of biphenyl structures in polymer chain reaches a high enough value, the change in $T_g$s depends not only on SC values, but is also influenced by backbone structure. The weak transitions occurring between 100 to 200° C. in the DSC curves of SPAEEN with high SC values were caused by evaporation of residual water, strongly bound by the copolymers, which is difficult to remove completely. Glass transitions for SPAEEN in acid form were not observed.

Water Uptake and Swelling Ratio

The proton conductivity and mechanical stability of PEMs are strongly related to the presence of water. In sulfonated poly(aryl ether ketone) or sulfonated poly(aryl ether sulfone)[8,43], hydrophilic sulfonic acid clusters are distributed in continuous hydrophobic domains. These domains swell with imbibed water and are inter-connected to form continuous ionic pathways. Water uptake and swelling ratio of SPAEEN as determined by measuring the changes in weight and length are listed Table 3.

uptake of SPAEENH copolymers. At elevated temperatures, the polymer chain mobility and the free volume for water adsorption increase. As a result, the rigid network structure of the membrane is weakened or even destroyed for copolymers with high SC, since in hot water the ionic interactions between macromolecules is gradually replaced by hydrogen-bonding between $H_2O$ and sulfonic acid groups.

It should be also mentioned that unlike sulfonated poly (phthalazinone ether sulfone) previously prepared in our group[18] or other sulfonated poly(aryl ether)s, which showed some brittleness in the dry state at high SC, all SPAEEN copolymers even up to SC1.0 (IEC 3.46) showed good film-forming properties and yielded membranes that were tough and flexible. This could be the result of the good proportion of the flexible ether linkage in polymer backbone and the rigid polar chemical groups as a side substitute instead of in the polymer backbone.

TABLE 3

Water uptake and swelling ratio of SPAEEN copolymers

| | Room temperature | | | | 80° C. | | | |
|---|---|---|---|---|---|---|---|---|
| | Water uptake (%) | | Swelling ratio (%) | | Water uptake (%) | | Swelling ratio (%) | |
| Polymer | Salt form | Acid form | Salt form | Acid form | Salt form | Acid form | Potassium form | Acid form |
| SPAEEN-100 | 190 | Swelled | 51 | Swelled | D | D | D | D |
| SPAEEN-B90 | 61 | 250 | 14 | 61 | PD | D | PD | D |
| SPAEEN-B80 | 32 | 81 | 11 | 28 | PD | D | PD | D |
| SPAEEN-B70 | 19 | 51 | 3.9 | 17 | 190 | SW | 42 | SW |
| SPAEEN-B60 | 16 | 22 | 0.61 | 9.1 | 29 | 58 | 9.5 | 17 |
| SPAEEN-B50 | 7.7 | 19 | 0.50 | 6.9 | 13 | 36 | 0.92 | 11 |
| SPAEEN-Q90 | 76 | 520 | 23 | 110 | PD | D | PD | D |
| SPAEEN-Q80 | 42 | 160 | 16 | 52 | 880 | SW | 130 | SW |
| SPAEEN-Q70 | 25 | 90 | 10 | 30 | 690 | S | 120 | S |
| SPAEEN-Q60 | 22 | 50 | 2.8 | 16 | 140 | 410 | 31 | 75 |
| SPAEEN-Q50 | 15 | 31 | 2.2 | 9.4 | 34 | 96 | 5.6 | 26 |

* D: dissolved; PD: partially dissolved; SW: swelled

The water uptake and swelling ratio increase with SC or EC values and temperature. At room temperature, membrane films, both in salt and acid forms, show gradual increases in water uptake up to a certain SC value then increase sharply. At 80° C., SPAEEN copolymers with SC values lower than 0.7 for SPAEEN-Bs and 0.6 for SPAEEN-Qs show moderate water uptake and swelling. SPAEENH copolymers with higher SC values swelled too much or completely dissolved in hot water. Membrane films in acid form have higher water uptake and swelling ratio values than in salt form due to hydrogen bond interactions between $H_2O$ and sulfonic acid groups. Compared with Nafion®117 (IEC=0.91 mmol/g) membrane, which shows a water uptake of 35% at room temperatures, SPAEENH copolymers absorbing similar proportion of water have much higher IEC values. In other words, SPAEENH with the same sulfonic acid content have lower water uptake values than Nafion® 117. The copolymers imbibe less water than Nafion® 117 at room temperature since the aromatic chain of SPAEENHs is more rigid than that of Nafion® 117 and the sulfonic acid groups have lower acidity. In addition, the strong ionic interaction between sulfonic acid groups increases rigidity of network structure. A combination of these two effects results in the restriction of free volume for water adsorption and a decrease in the water Tensile Properties Tensile properties of SPAEENH copolymers were tested at room temperature during two days and the results are tabulated in Table 4.

TABLE 4

Tensile properties of SPAEENH copolymers

| Polymer | Tensile strength (MPa) | Elongation at break (%) | Tensile strength at break (MPa) |
|---|---|---|---|
| SPAEEN-B90 | 67 | 63 | 61 |
| SPAEEN-B80 | 64 | 65 | 71 |
| SPAEEN-B70 | 77 | 70 | 81 |
| SPAEEN-B60 | 81 | 45 | 74 |
| SPAEEN-B50 | 82 | 16 | 72 |
| SPAEEN-Q90 | 51 | 39 | 71 |
| SPAEEN-Q80 | 66 | 37 | 71 |
| SPAEEN-Q70 | 73 | 24 | 67 |
| SPAEEN-Q60 | 80 | 21 | 73 |
| SPAEEN-Q50 | 75 | 25 | 71 |
| Nafion 117 | 10 | 623 | 15 |

In general, all SPAEENH copolymers exhibited good tensile strengths ranging from 51 MPa to 82 MPa, which decreased with increasing SC values. The elongations at break ranged from 16% to 70%, increasing with the SC values. Since SPAEENH-100 swelled excessively during the process for conversion from salt to acid form and then wrinkled when dry, the film dimension was difficult to measure accurately. Thus, tensile properties of SPAEENH-100 were not reported. However, its tensile curve also exhibited the same trend. For comparison, Nafion117 was also tested for tensile properties under the same conditions and the results are also listed in Table 4. All SPAEENH copolymers exhibited tensile strength values several-fold higher and less elongation at break compared with Nafion117. In addition, all SPAEENH copolymers showed yield behavior, while Nafion117 exhibited a continuous increase in tensile strength before break. In other words, Nafion117 exhibited tensile behavior between elastomer and thermoplastic whereas the SPAEENH copolymer exhibited thermoplastic behavior.

Proton Conductivity

Figure 7:
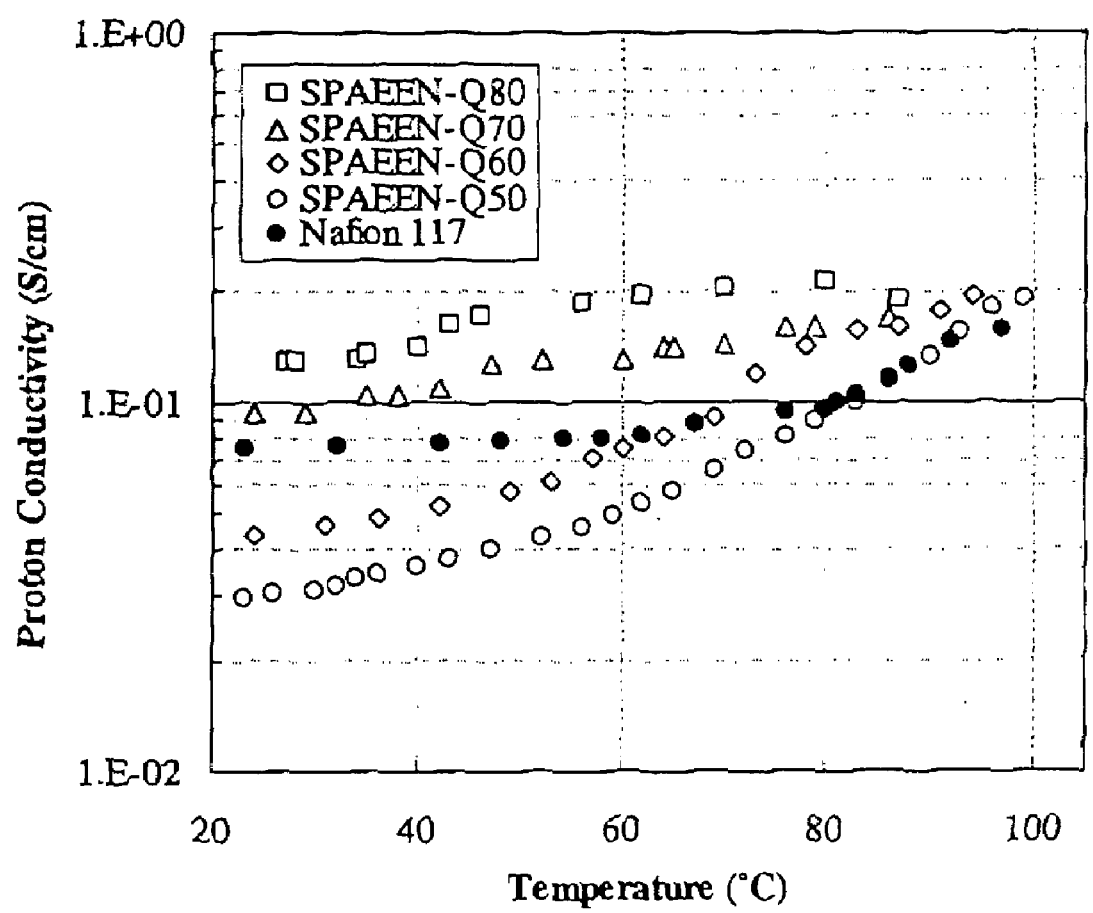
FIG. 7 illustrates Proton Conductivities of SPAEEN-Q copolymers
Figure 8:
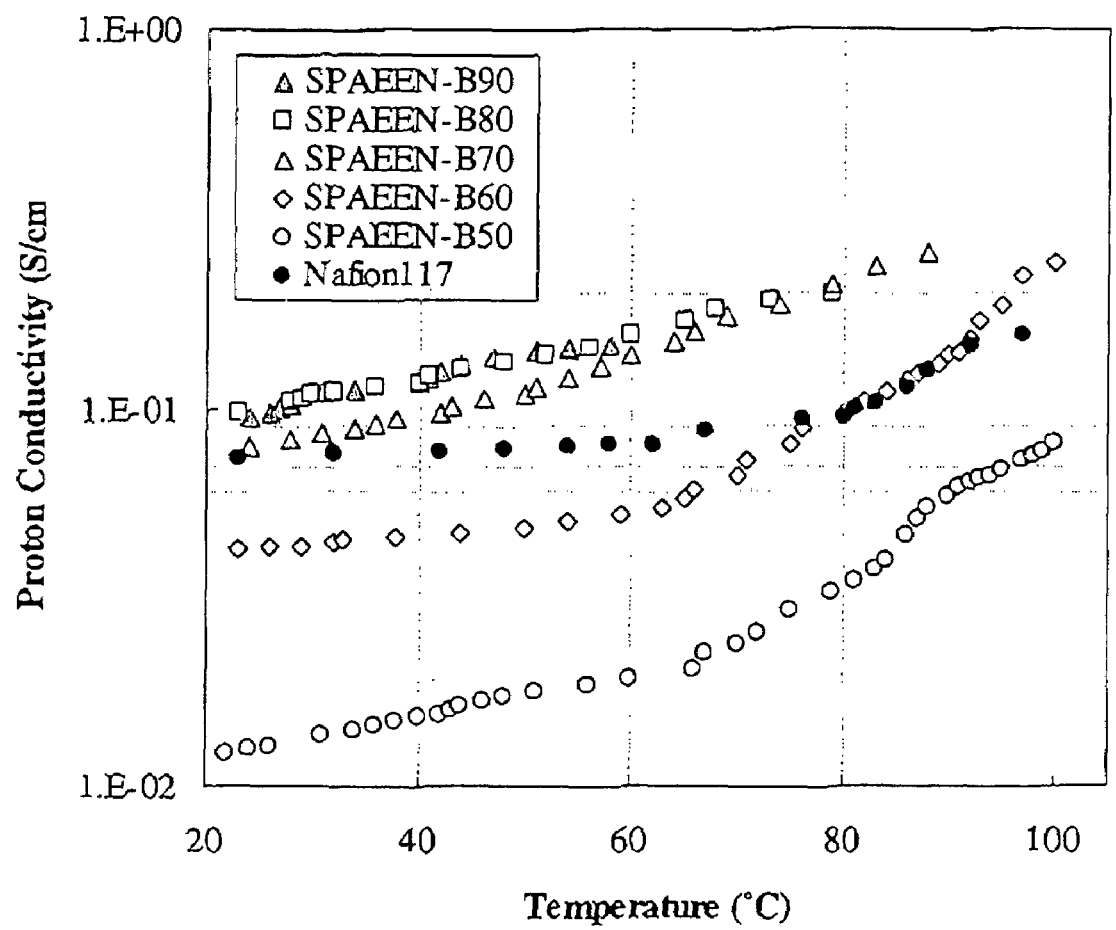
FIG. 8 illustrates Proton Conductivities of SPAEEN-B copolymers

In our previous study[23], X-ray fluorescence spectroscopy confirmed that all the sodium sites were effectively converted into sulfonic acid use the method described in experimental part. Proton conductivities of the acid form of SPAEEN-Q and SPAEEN-B copolymers were measured at 100% relative humidity as a function of SC and temperature and are shown in FIGS. 7 and 8 respectively. For comparison the proton conductivity of Nafion117 measured under the same experimental conditions is also shown in the figures.

All SPAEEN membrane films showed room temperature proton conductivities higher than $10^{-2}$ S/cm, which makes them placed among the promising PEMs as representing a practical interest for use in fuel cells. As expected, membrane proton conductivity increases with sulfonic acid groups' content. The membranes with lower IBC values, SPAEEN-B50, SPAEEN-B60, SPAEEN-Q50, and SPAEEN-Q60 showed room temperature proton conductivities comparable to Nafion117. The films with higher IEC values, SPAEEN-B70, SPAEEN-B80, SPAEEN-B90, SPAEEN-Q70 and SPAEEN-Q80 showed room temperature proton conductivities higher than Nafion117, in some cases even exceeding 0.1 S/cm. SPAEEN-Q90 showed unexpectedly lower proton conductivity than SPEEN-Q70 and SPAEEN-Q80, although its proton conductivities was still higher than $10^{-2}$ S/cm. This apparent inconsistency is attributed to its higher water uptake and swelling ratio. From Table 3, it can be seen that SPAEEN-Q90 exhibited high water absorption and a more substantial dimensional change than other samples. This large dimensional change resulted in a large decrease in the SC content per unit of volume of wet membrane. In other words, although it has a high SC value, the sulfonic acid groups in the excessively swollen membrane are highly diluted, resulting in a decrease in its proton conductivity. FIG. 7 also illustrates the fact that a higher proton carrier conductivity. FIG. 7 also illustrates the fact that a higher proton carrier concentration in dry membranes does not necessarily ensure a higher proton conductivity in humidified material. Thus, high proton conductivities of PEMs cannot be pursued solely by increasing the IEC values. SPAEEN-100 swelled excessively even at room temperature; its proton conductivity could not be measured. However, since the entire SPAEEN copolymer series up to SPAEEN-100 showed good membrane-forming properties and could be cast into tough and flexible membrane films in the dry state, there may be application for the materials having high SC in a non-aqueous environment which would not cause excessive swelling.

In general, proton conductivities increased with temperature and the SPAEEN-Q series showed higher proton conductivities than the SPAEEN-B series at the same SC values, which may be explained by the difference in their equivalent molecular weights. Compared with Nafion117, SPAEEN copolymers exhibited a more sensitive change in proton conductivities with temperature which suggests that SPAEEN copolymers have higher activation energy for proton conductivity that Nafion117.

SUMMARY

Wholly aromatic sulfonated poly(aryl ether ether nitrile)s (SPAEEN)s were prepared via $K_2CO_3$ mediated direct polymerizations of commercially available monomers: 2,6-difluorobenzonitrile (2,6-DFBN), potassium 2,5-dihydroxybenenesulfonate (SHQ), or 2,8-DHNS-6 (see below) and a third monomer 4,4'-biphenol or hydroquinone, in NMP. The sulfonic acid group content (SC) in the copolymers was controlled by varying the ratio of the sulfonated diol monomer to either biphenol or hydroquinone diol monomers.

The sulfonic acid group content (SC), expressed as a number per repeat unit of polymer, ranged from 0.5 to 1.0 and was obtained by changing the feed ratio of SHQ to the unsulfonated bisphenol. Membrane films in potassium salt and acid forms were obtained by casting N,N-dimethylacetamide (DMAc) solution of SPAEENs, followed by immersing in 2 N sulfuric acid at room temperature. FT-IR confirmed the structure of polymer in both salt and acid forms. NMR was used to determine the obtained SC values of SPAEENs. Decomposition temperatures ($T_d$s) of SPAEENs were around 300° C. for acid form and over 400° C. for potassium form. Water uptake and swelling ratio values increased with SC and temperature. All SPAEENH copolymers were mechanically stronger than Nafion117 and exhibited a reasonable flexibility. The proton conductivities of acid form membrane at different SC values were close to or higher than that of Nafion117, and reached $10^{-1}$ S/cm. The best compromise on PEM mechanical strength, water swelling and proton conductivity, was achieved at SC ranged from 0.5 to 0.7.

The resulting copolymers had high $T_g$s ranging from 308 to 371° C. in potassium salt form and were thermally stable up to at least 289° C. in acid form. SPAEEN copolymers were organic soluble and could be cast into membrane films, that were tough and flexible in the dry state, even at high IEC values. The SPAEEN membranes with high IEC are superior to sulfonated (aryl ether ketone)s and sulfonated (aryl ether sulfone)s, which are often brittle at high IEC values when dry. SPAEENH copolymers were readily prepared from inexpensive commercially available chemicals via one pot reactions. All SPAEENH copolymers exhibited reasonable flexibility and high tensile strength. Both potassium and acid form sulfonated membrane films show continuous increases in water uptake and swelling ratio with SC and temperature, and the acid form membrane films show higher and more rapid increases than those in the potassium form. SPAEEN copolymers obtained from high sulfonated diol monomer ratios swelled excessively or dissolved in water. The copolymers showed a similar or slightly higher room temperature proton conductivities compared with Nafion®117. Nitrile groups are also anticipated to promote adhesion of the polymers to catalyst or to carbon black in the membrane electrolyte assemblies (MEA) and might be beneficial for preparation of the composite membrane, increasing bonding to embedded second phase[37]. This combination of desirable properties makes SPAEENH copolymers potentially good candidate for proton conducting membrane materials for fuel cells applications.

Some examples of other sulfonated diphenol monomers that can be used in Scheme 1 in the preparation of novel SPAEEN co-polymers instead of just the sulfonated hydroquinone Na, and K substituents are interchangeable, are shown below

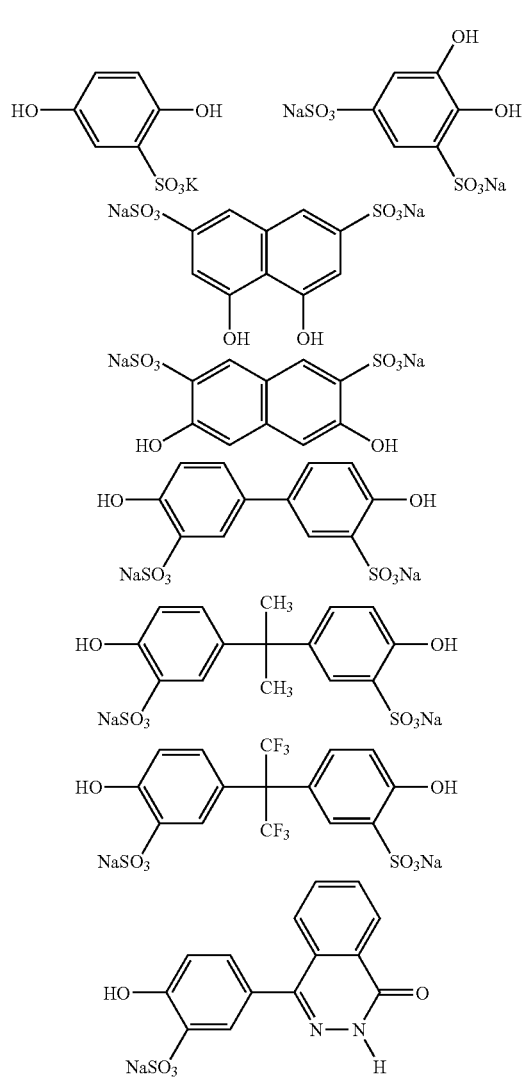

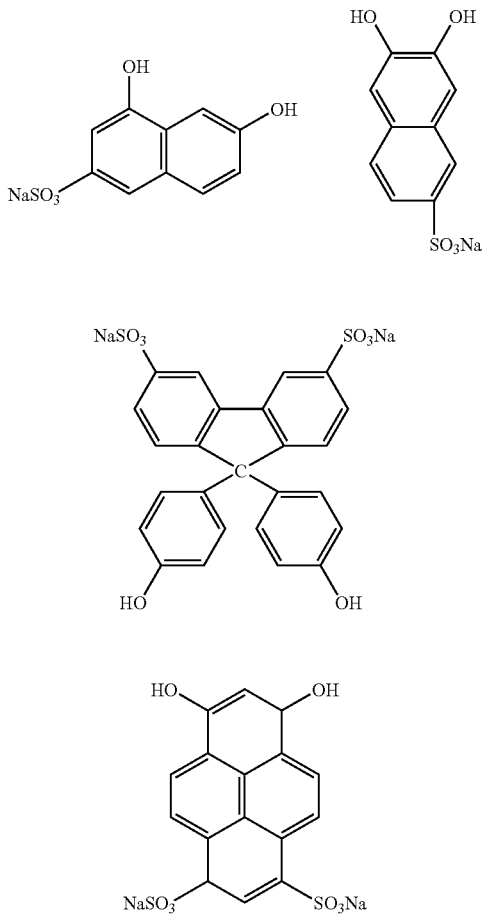

The following is additional basic information regarding data for PEMs prepared using yet another monomer in the preparation of novel SPAEEN co-polymers according to Scheme 1. The data for the −50 and −60 polymer show very good conductivity and low swelling.

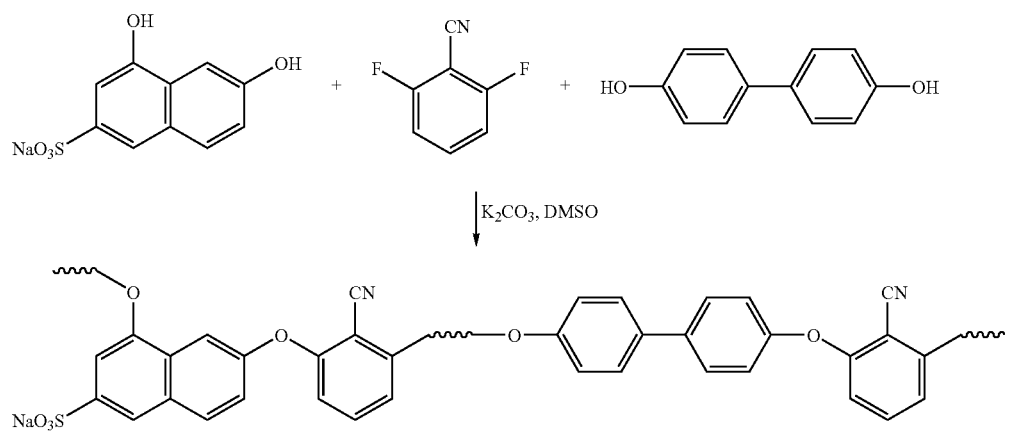

Experimental Part

SPAEEN's containing naphthalene structure with sulfuric acid groups meta to ether linkage.

Materials.

2,8-dihydroxynaphthalene-6-sulfonate sodium salt (2,8-DHNS-6) was purchased from Rintech, Inc. and recrystallized from deionized water. DMSO and 4,4'-biphenol were purchased from Aldrich and was vacuum distilled and purified by sublimation respectively before usage. All other chemicals (obtained from Aldrich) were reagent grade and used as received.

Copolymerization.

Figure 14:
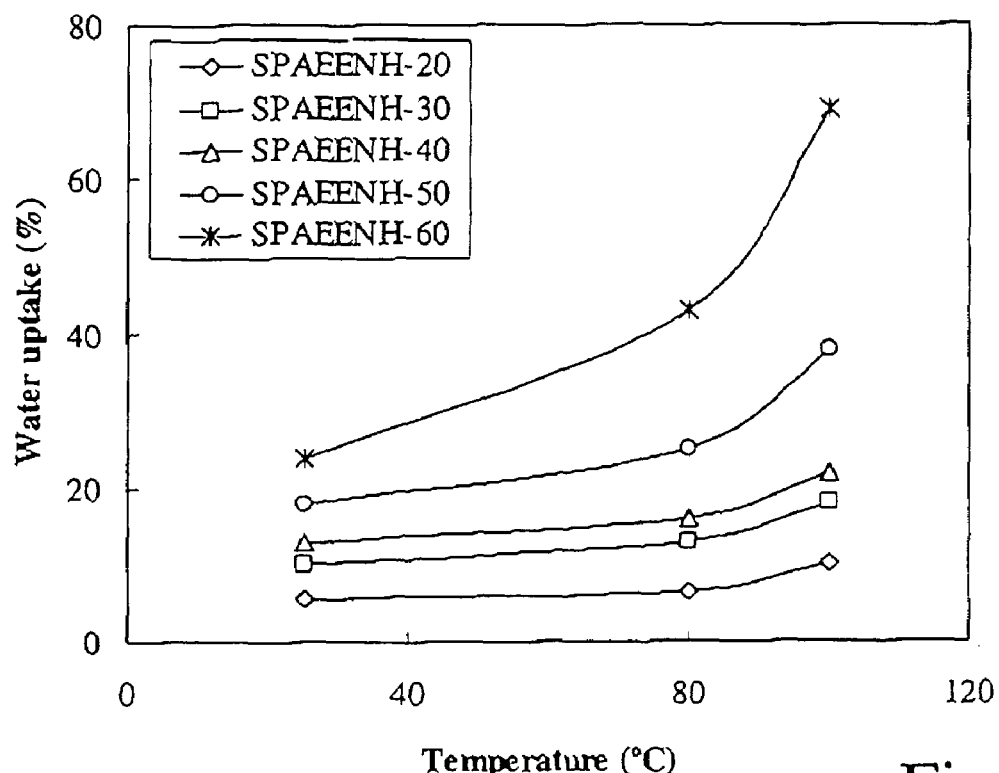
FIG. 14-16 illustrates results of water uptake, swelling and proton conductivity of the various SPAEENs.
Figure 15:
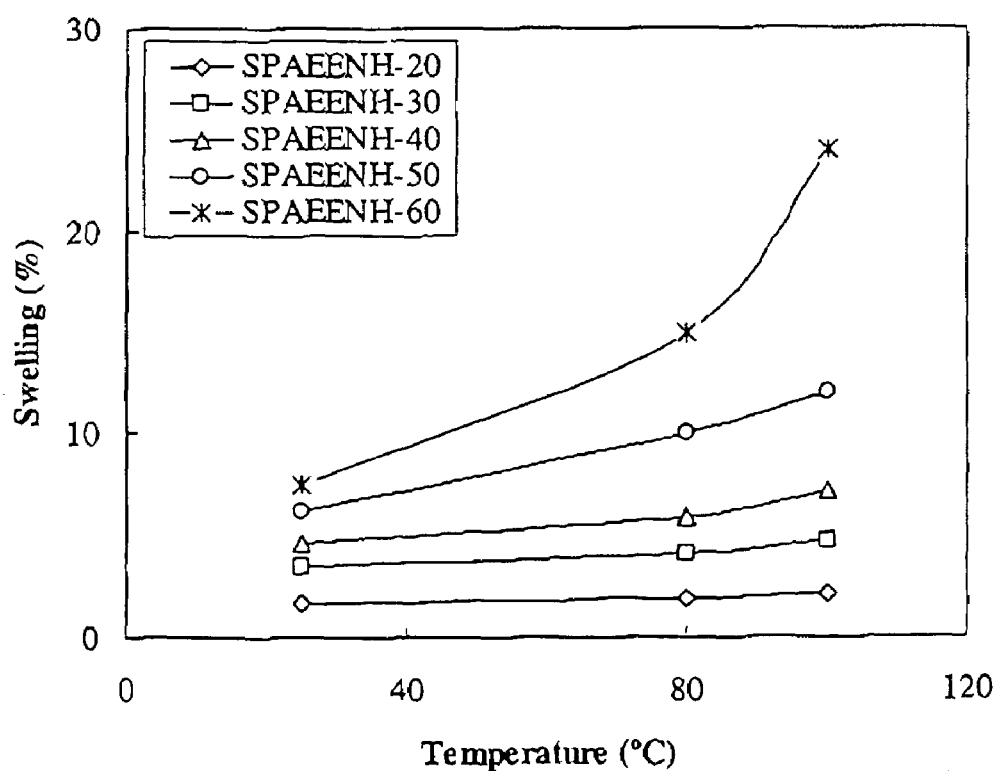
Figure 16:
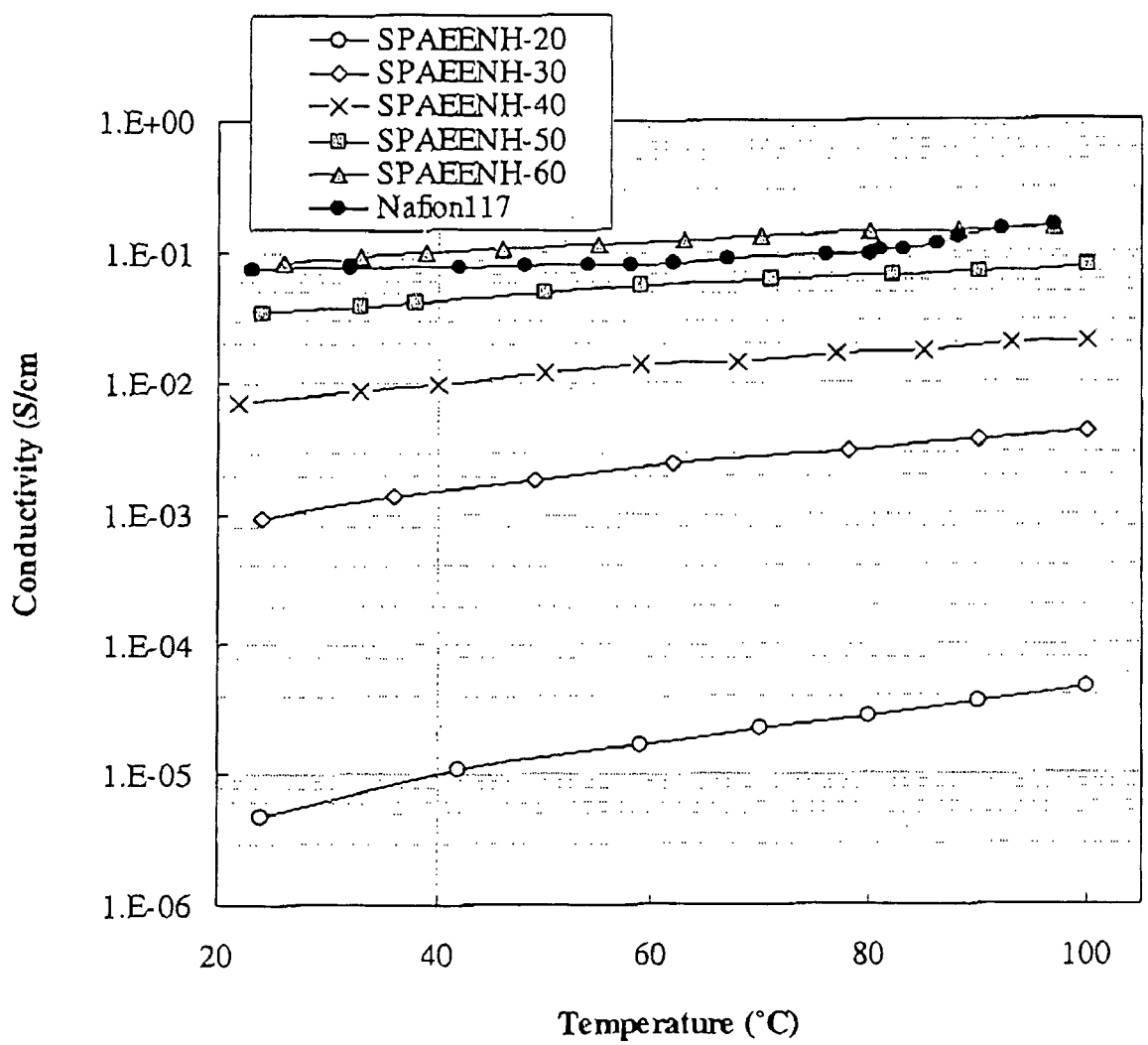

Synthesis of the polymers by nucleophilic substitution reactions was based on the procedure reported by McGrath[25]. In a typical reaction, 10 mmol 2,6-DFBN, 5 mmol 2,8-DHNS-6(2,8-dihydroxynaphthalene-sulfonate sodium salt), 5 mmol 4,4'-biphenol, and 15 mmol $K_2CO_3$ were added into a three-neck equipped flask with a magnetic stirrer, a Dean-Stark trap, and an argon gas inlet. Then, 10 mL DMSO and 10 mL chlorobenzene were charged into the reaction flask under an argon atmosphere. The reaction mixture was heated to 130° C. After dehydration, and removal of chlorobenzene, the reaction temperature was increased to about 160-170° C. When the solution viscosity had apparently increased, the mixture was cooled to 100° C. and coagulated into a large excess of ethanol or water with vigorous stirring. The resulting polymer was designated SPAEEN-50, where 50 refers to the 2,8-DHNS-6 content of aromatic phenol monomers. SPAEENs were washed with water to remove salt. The results for water uptake, swelling and proton conductivity of the various SPAEENs are illustrated in FIGS. 14-16.

Copolymer Analysis and Measurement.

$^1$H-NMR spectra were obtained on a Varian Unity Inova NMR spectrometer operating at a proton frequency of 399.95 MHz. Deuterated dimethylsulfoxide (DMSO-$d_6$) was the NMR solvent and tetramethylsilane (TMS) was used as the chemical shift reference (0 ppm). IR spectra were measured on a Nicolet 520 Fourier transform spectrometer with membrane film samples in a diamond cell.

A TA Instruments thermogravimetric analyzer (TGA) instrument model 2950 was used for measuring $T_d$. Polymer samples for TGA analysis were preheated to 150° C. at 10° C./min in either nitrogen or air and held isothermally for 40 min for moisture removal. Samples were then heated from, 90° C. to 750° C. at 10° C./min for $T_d$ measurement. A TA Instruments differential scanning calorimeter (DSC) model 2920 calibrated with Tin at 231.93° C. and Zinc at 419.53° C. was used for measuring $T_g$. Samples in sodium form for DSC analysis were initially heated rapidly at a rate of 10° C./min under nitrogen atmosphere to 380° C. When the DSC cell had cooled to around 50° C., the samples were reheated at a rate of 10° C./min to 430° C. The procedure for samples in acid form was similar except that the end point of the initial heating was 250° C.

Intrinsic viscosities were determined using an Ubbelohde viscometer for N,N-dimethylacetamide (DMAc) solutions of copolymer at 25° C.

Preparation of Membrane Films.

An amount of 1 g copolymer in the sodium salt form was dissolved in 20 mL of DMAc and filtered. The filtered solution was poured onto a leveled glass plate having a circular glass retaining wall and dried at about 40° C. under a constant purge of nitrogen for about one day. The acid form (m-SPAEENH) membrane films were obtained by immersing corresponding sodium form m-SPAEEN membrane films in 2 N $H_2SO_4$ for 24 h at room temperature, and then in deionized water for another 24 h during which time the water was changed several times. The thickness of all membrane films was in the range of 40 to 70 μm.

Water Uptake Content Measurement and Swelling Ratio

The membrane films were dried at 100° C. overnight prior to the measurements. After measuring the lengths and weights of dry membranes, the sample films were soaked in deionized water for 24 h at predetermined temperatures. Before measuring the lengths and weights of hydrated membranes, the water was removed from the membrane surface by blotting with a paper towel. The water uptake content was calculated by $$\text{Uptake content (\%)} = \frac{\omega_{wet} - \omega_{dry}}{\omega_{dry}} \times 100\%$$

Where $\omega_{dry}$ and $\omega_{wet}$ are the masses of dried and wet samples respectively. The swelling ratio was calculated from films 5~10 cm long by:

$$\text{Swelling ratio (\%)} = \frac{l_{wet} - l_{dry}}{l_{dry}} \times 100\%$$

Where $l_{dry}$ and $l_{wet}$ are the lengths of dry and wet samples respectively.

Tensile Test

Tensile tests were performed on an Instron tensile tester (model 1123) at a strain speed of 50 mm/min at room temperature. Membrane films with typical size of 40 mm×4 mm×0.05 mm were used for testing.

Proton Conductivity

The proton conductivity measurements were performed on m-SPAEENH membrane films by AC impedance spectroscopy over a frequency range of 1-107 Hz with oscillating voltage 50-500 mV, using a system based on a Solartron 1260 gain phase analyzer. Proton conductivities in the longitudinal direction were measured. Prior to the proton conductivity measurements, membranes were immersed in 98° C. water for 36 h to attain hydration equilibrium, and then cool to room temperature. A 20×10 mm membrane sample was lightly clamped between two electrodes and placed in a temperature controlled cell open to the air by a pinhole where the sample was equilibrated at 100% RH at ambient atmospheric pressure. The proton conductivity (σ) of the samples in the longitudinal direction was calculated from the impedance data, using the relationship σ=l/Rdw, where l is the distance between the electrodes, d and w are the thickness and width of the films, respectively and R was derived from the low intersect of the high frequency semi-circle on a complex impedance plane with the Re (Z) axis, where Re refers to "Real" in the complex impedance plane. The impedance data were corrected for the contribution from empty and short circuited cell.

Results and Discussion

Synthesis and Characterization of m-SPAEEN Copolymers m-SPAEEN copolymers were synthesized by copolymerization of 2,6-DFBN, 2,8-DHNS-6 and 4,4'-biphenol as shown in Scheme 1. DMSO was used as polymerization solvent instead of N-methyl-2-pyrrolidone (NMP), which was used in most of our previous polycondensation reactions since complete precipitation of reactants or oligomers in NMP took place at the bisphenoxide formation stage. Water generated during this stage was removed as an azeotrope with chlorobenzene. It should be noted that replacement of chlorobenzene with toluene for dehydration also caused precipitation during the bisphenoxide formation. Polymerization solutions appeared cloudy yellow color. Polymerization compositions, details of the resulting polymers such as equivalent weight per sulfonate group (EW), ion exchange capacity (IEC) of n2-SPAEEN-X copolymers are summarized in Table 10.

Figure 17:
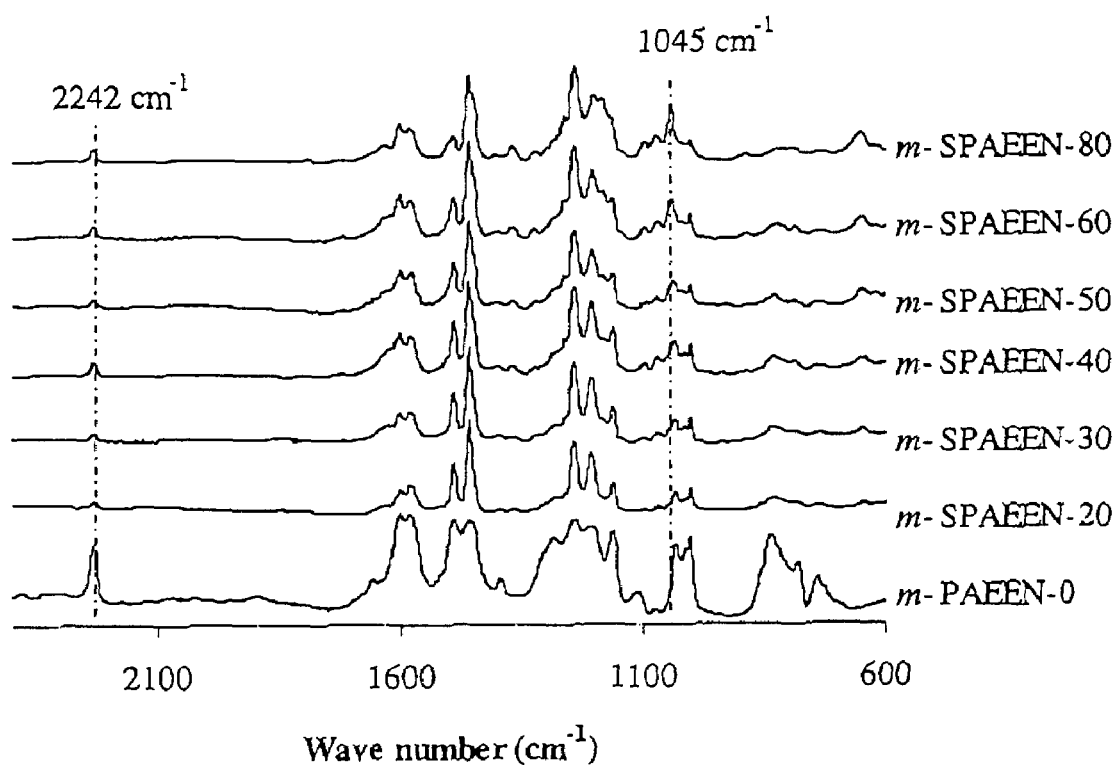
FIG. 17 illustrates FT-IR spectra of SPAEEN copolymers

The chemical structures of m-SPAEEN copolymers were initially confirmed by FT-IR. As seen in FIG. 17, characteristic bands of the aromatic sulfonate salt are observed at 1045, 1084, and 1108 cm$^{-1}$ for m-SPAEEN copolymers compared with unsulfonated m-PAEEN and the intensity of these characteristic absorption bands increase with SC. The characteristic symmetric stretching band of nitrile groups was observed at 2242 cm$^{-1}$. The absorption bands at 1211 and 1246 cm$^{-1}$ are assigned to phenoxy groups. The absorption bands at 1463 and 1495 cm$^{-1}$ were assigned to phenyl ring and the bands at 1587 and 1606 cm$^{-1}$ are attributed to C=C stretching.

Figure 18:
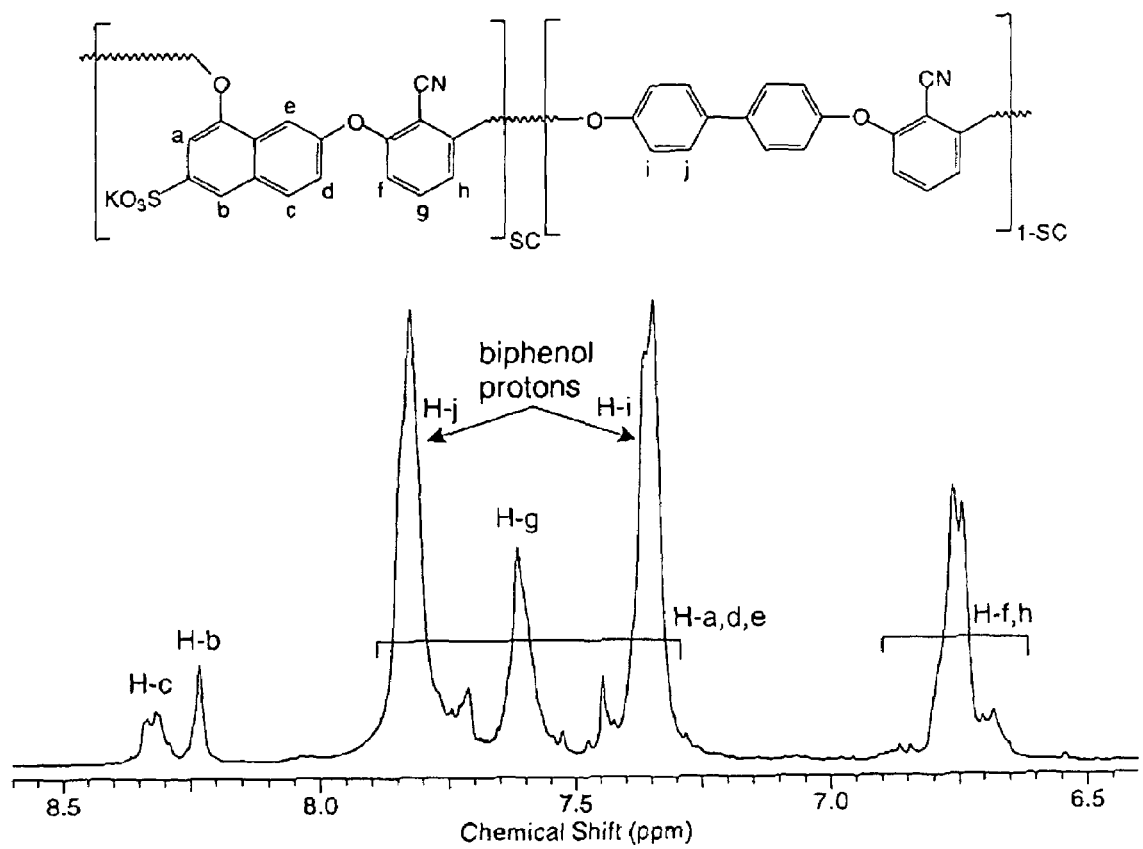
FIG. 18 illustrates $^1$H NMR spectrum of m-SPAEEN in DMSO-d6.

The structural properties of the synthesized polymers were also studied by liquid phase $^1$H NMR spectroscopy with DMSO-d$_6$ as the solvent. As an example, the $^1$-NMR spectrum of the aromatic region of m-SPAEEN-30 is shown in FIG. 18. The benzonitrile proton signals for H-f,h (2H) appeared at the same low frequencies (6,6-6.9 ppm) as observed before in the SPAEEN polymers[22]. The intensity of the distinct signals at high frequencies (8.15-8.40 ppm) for H-b,c of the DHNS monomers were used to estimate and compare the experimental SCs with the expected SCs from the feed ratios. Using m-SPAEEN-30 as an example in FIG. 18, the intensity of H-b,c is 0.62 therefore the ratio of DHNS:

TABLE 10

Syntheses of m-SPAEEN copolymers

| Polymer | 4,4'-BP mmol | 2,6-DFBN mmol | 2,8-DHNS-6 mmol | [η]$^a$ dL/g | EW (IEC) expected g/mol SO$_3$ (Meq g$^{-1}$) | SC expected | SC from $^1$H-NMR data |
|---|---|---|---|---|---|---|---|
| m-PAEEN-0 | 5 | 5 | 0 | — | — | 0 | 0 |
| m-SPAEEN-20 | 8 | 10 | 2 | 0.85 | 1480 (0.68) | 0.2 | 0.19 |
| m-SPAEEN-30 | 7 | 10 | 3 | 1.0 | 1005 (1.0) | 0.3 | 0.31 |
| m-SPAEEN-40 | 6 | 10 | 4 | 0.62 | 767 (1.3) | 0.4 | 0.38 |
| m-SPAEEN-50 | 5 | 10 | 5 | 0.9 | 625 (1.6) | 0.5 | 0.50 |
| m-SPAEEN-60 | 4 | 10 | 6 | 0.82 | 530 (1.9) | 0.6 | 0.57 |

$^a$Measured at 25° C. in DMAc.

Intrinsic viscosity values of 0.62 to 1.0 dL/g in DMAc at 25° C. indicate the success of polymerization in producing high molecular m-SPAEEN-20 to m-SPAEEN-60. However, due to the angled structure of 2,8-DHNS-6, m-SPAEEN copolymers with SC values ≧0.7 were limited not obtained with high molecular weights. This was probably due to excessive entanglement in the polymer chains that contained less linear biphenol segments. Indeed, there is no need to further increase the sulfonic acid content in m-SPAEEN. From Table 10, it can be seen that the m-SPAEEN-60 already has a high EEC value. It can also be seen in FIG. 20 that m-SPAEENH-60 (the acid form of m-SPAEEN-60) has a swelling of 24% at 100° C., which indicates that SC≧0.70 in m-SPAEENH copolymers will result in unacceptable swelling in membrane at high temperatures, and cause the decrease in the membrane morphologic stability and mechanical stability. m-SPAEEN-20 to m-SPAEEN-60 have good solubility in N,N-dimethylacetamide and were cast into strong transparent and flexible membrane films. Since all the reactants used in the preparation of m-SPAEEN copolymers are commercially available and inexpensive, the present sulfonated nitrile copolymers are much cheaper to manufacture than Nafion.

biphenol is 0.31:0.69 for 1.0 DFBN hence an experimental SC of 0.31. Table 10 shows the experimental SC values obtained from NMR are in close agreement with the expected SCs from the feed ratios.

Thermal Properties of m-SPAEEN

Figure 19A:
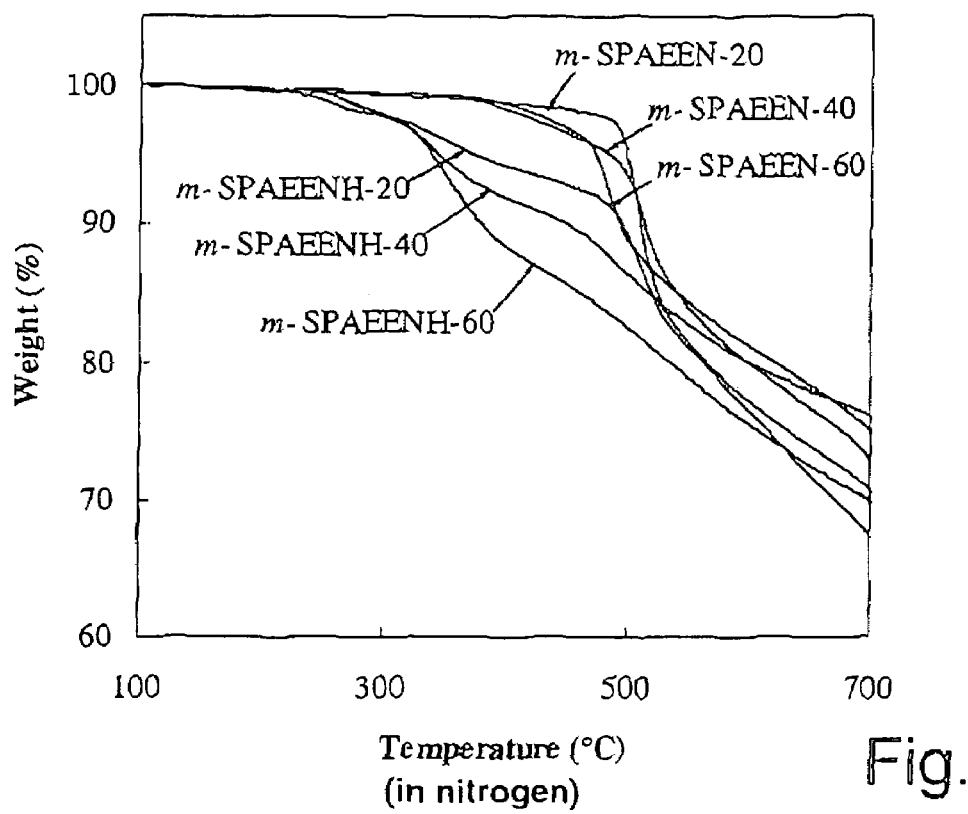
FIG. 19 illustrates TGA traces of m-SPAEEN copolymers in nitrogen and air
Figure 19B:
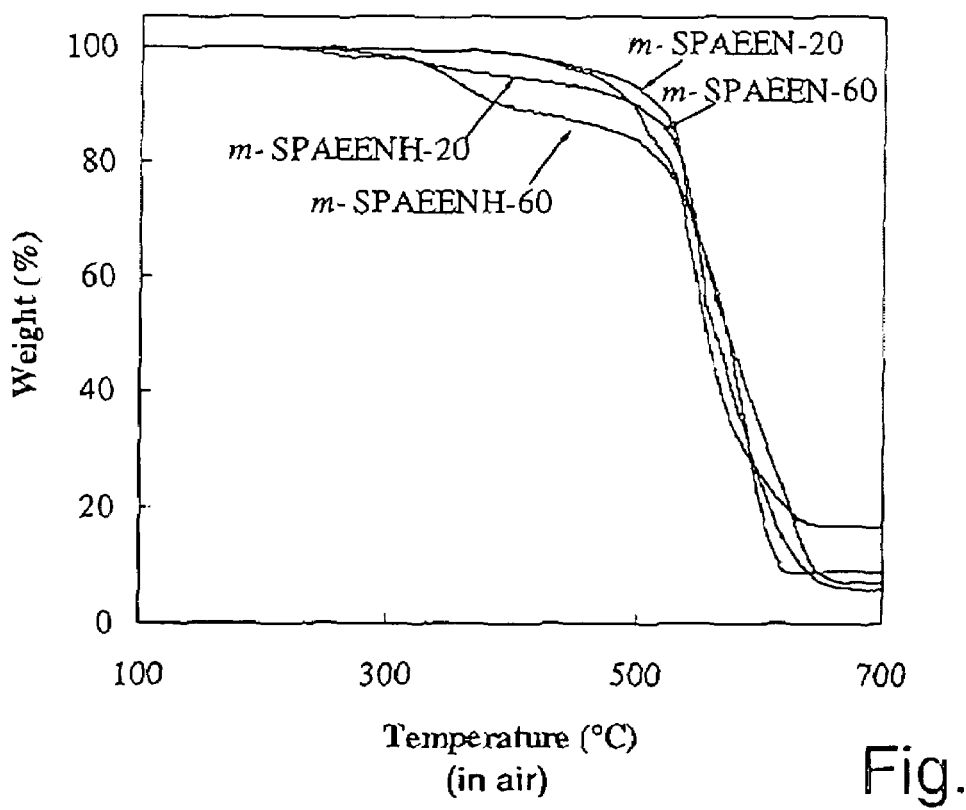

Thermal properties of m-SPAEEN copolymers were evaluated by their $T_d$ and $T_g$ data. $T_g$s were determined in both nitrogen and air in order to detect their inherent thermal stabilities and thermal stabilities in air. FIG. 19 shows that the TGA curves of m-SPAEEN copolymers in both nitrogen and air are very similar to those of other sulfonated high performance polymers reported before[17-19, 22]. Each copolymer showed only one weight loss steps for sodium form polymers at around 460-500° C. attributed to the degradation of polymer chain, and two distinct weight loss steps for acid form polymers, of which the earlier weight loss at around 260-300° C. is caused by cleavage of —SO$_3$H. FIG. 19 also shows that air didn't cause earlier cleavage of —SO$_3$H than in nitrogen and m-SPAEEN copolymers are both thermally stable and thermo-oxidatively stable enough for PEM usage. Table 11 summarizes the observed $T_{d5\%}$ (5% weight loss) and onset weight loss temperatures ($T_d$) data of m-SPAEEN.

TABLE 11

Thermal properties of polymers

| Polymer | $T_g$ (°C.) | | $T_{d5\%}$ (°C.) | | | | $T_d$ (°C.) extrapolated onset for first weight loss | | | |
|---|---|---|---|---|---|---|---|---|---|---|
| | | | In nitrogen | | In air | | In nitrogen | | In air | |
| | Na form | Acid form | Na form | Acid form | Na form | Acid form | Na form | Acid form | Na form | Acid form |
| m-SPAEEN-20 | 233 | 230 | 498 | 373 | 477 | 390 | 491 | 268 | 521 | 264 |
| m-SPAEEN-30 | 261 | 244 | 493 | 353 | 468 | 361 | 484 | 299 | 504 | 290 |
| m-SPAEEN-40 | 310 | 247 | 485 | 345 | 449 | 352 | 482 | 300 | 491 | 290 |
| m-SPAEEN-50 | 313 | 260[a] | 468 | 345 | 467 | 341 | 488 | 288 | 489 | 297 |
| m-SPAEEN-60 | 336 | — | 473 | 339 | 463 | 344 | 460 | 307 | 512 | 310 |

[a] approximate value

Table 11 also summarizes $T_g$s of m-SPAEEN copolymers in both sodium and acid forms. The $T_g$s of copolymers increase with SC values varying from 233 to 336° C. in sodium form and from 230 to 260° C. in acid form. The $T_g$s of sodium form copolymers were all observed before the onset of thermal decomposition. However, the acid form copolymer m-SPAEENH-60 had a decomposition onset lower than its $T_g$ and the $T_g$ of m-SPAEENH-50 was observed at a temperature that decomposition had already started, so the reported value is only an approximation. The combination of $T_g$s and $T_d$ values leads us to conclude that all m-SPAEENH copolymers have good thermal stabilities.

Water Uptake, Swelling Ratio and Proton Conductivity and Mechanical Properties

There is a considerable body of scientific evidence to suggest that the electrostatic interactions in sulfonic acid-containing polymers results in microphase separation to hydrophobic and hydrophilic regions in their membrane films. The majority of ion exchange sites and counter ions aggregate to form hydrophilic phase, which form clusters in a continuous hydrophobic phase. Upon hydration, the hydrophilic regions imbibe water and increase the clusters sizes into interconnecting channels for protons. Hydrophobic blocks of polymers are tightly packed to provide the membrane films with dimensional and mechanical stabilities. Consequently, morphology concerning the distribution of hydrophilic and hydrophobic phases is greatly affected by absorbed water, which in turn further affects the proton conductivity and mechanical properties of PEMs.

Figure 20A:
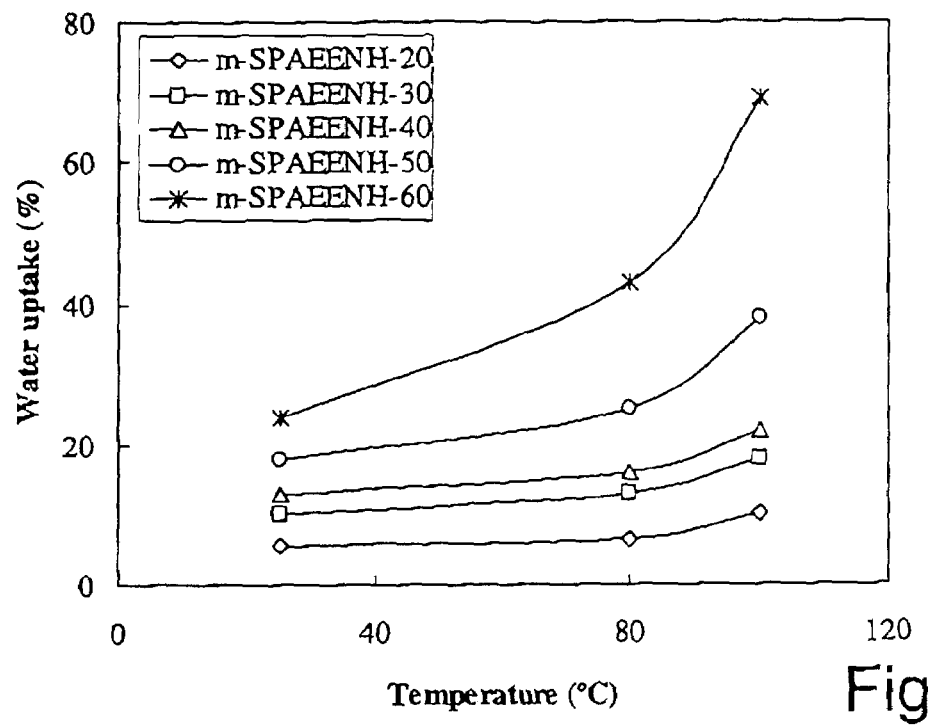
FIG. 20 illustrates water uptake (a) and swelling (b) of m-SPAEENH copolymers
Figure 20B:
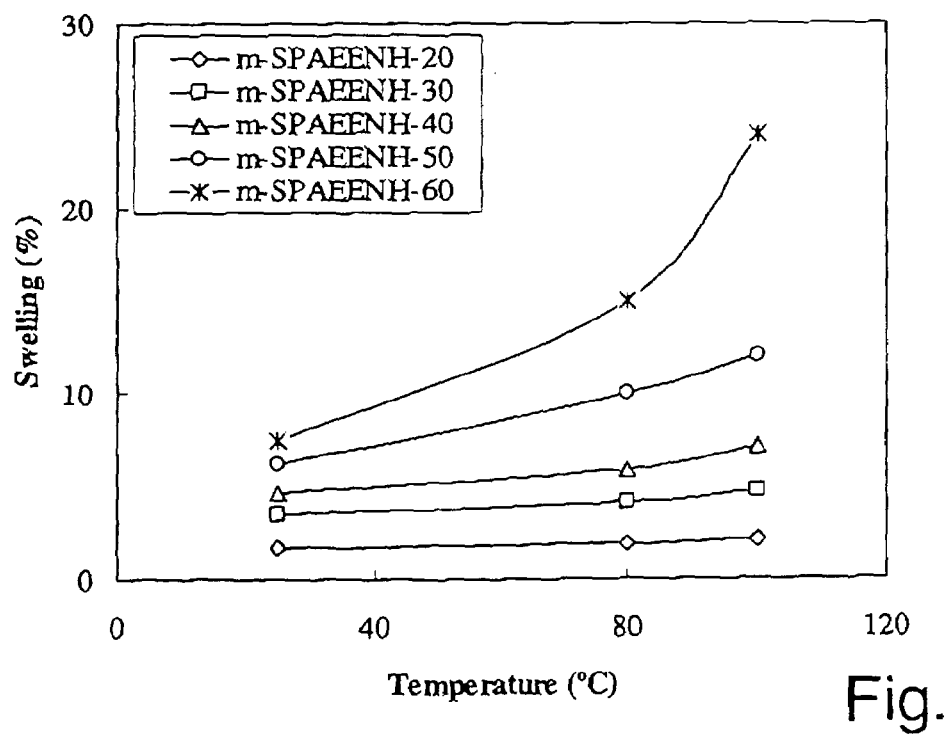

The water uptake and swelling ratio of m-SPAEENH membranes are plotted as functions of SC values and temperatures in FIG. 20. PEMFCs are normally operated at temperatures from RT to 80° C. based on the properties of state-of-art polymer electrolyte Nafion. However, since elevated operation temperatures will raise the tolerance ability of catalysts to CO, PEMs that can endure temperatures higher than 100° C. are preferred. Considering these experimental conditions, the water uptake and swelling ratios were tested at room temperature, 80° C., and 100° C. respectively. FIG. 20 shows that the m-SPAEENH copolymers absorbed water in the range of 5.7% to 69% with increases in the 2,8-DHNS-6 content and temperature from RT to 100° C. after 24 h immersion in water and increased their linear dimensional sizes by 1.7% to 24%. Normally, swelling of 25% may be considered as an acceptable value for adequate dimensional stability of PEM under humidified conditions. Using these criteria, all the present m-SPAEENH copolymers had low or adequate dimensional swelling when fully hydrated. FIG. 20 also indicates that an SC value of ~0.6 is the highest practical one for FC application. A further increase in 2,8-DHNS-6 content in the copolymer will result in an over-uptake of water, which will weaken the interactions of hydrophobic phase and cause excessive dimensional swelling. The present nitrile copolymers show much lower water uptakes and swelling ratios, when compared with our previously prepared sulfonic acid-containing poly(aryl ether)s (Table 12) of similar proton conductivity values, including both poly(aryl ether ketone) and poly(aryl ether nitrile) from flexible hydroquinone monomer.

TABLE 12

Comparisons of swelling and proton conductivities of different polymers

| Polymer | EW expected g/mol SO$_3$ | Room temperature | | 80° C. | | 100° C. | |
|---|---|---|---|---|---|---|---|
| | | Swelling ratio[a] (%) | Conductivity (S/cm) | Swelling ratio (%) | Conductivity (S/cm) | Swelling ratio (%) | Conductivity (S/cm) |
| m-SPAEEN-50 | 625 | 6.2 | $3.5 \times 10^{-2}$ | 10 | $6.4 \times 10^{-2}$ | 12 | $7.8 \times 10^{-2}$ |
| m-SPAEEN-60 | 530 | 7.5 | $8.3 \times 10^{-2}$ | 15 | $1.4 \times 10^{-1}$ | 24 | $1.5 \times 10^{-1}$ |
| SPAEEKK-100 [21] | 575 | 18 | — | Excessively swollen | — | — | — |
| SPAEEN-B50 [43] | 575 | 6.9 | $~1.2 \times 10^{-2}$ | 11 | $3.5 \times 10^{-2}$ | — | $8.0 \times 10^{-2}$ |
| SPAEEN-B60 [43] | 479 | 9.1 | $~4.5 \times 10^{-2}$ | 17 | $1.0 \times 10^{-1}$ | — | $2.5 \times 10^{-1}$ |
| SPAEEN-Q50 [43] | 498 | 9.4 | $~3.0 \times 10^{-2}$ | 26 | $1.0 \times 10^{-1}$ | — | — |
| Nafion 117 | 1100 | 13 | $7.5 \times 10^{-2}$ | 20 | $9.6 \times 10^{-2}$ | — | $1.6 \times 10^{-1}$ |

[a] % length gain of 5-10 cm strips of films after 24 h.

We attribute the lower swelling ratios to the combination of polar nitrile groups and hydrophobic naphthalene structures to network the film structure. In nano-phase separated hydrated film, the hydrophobic domains in nitrile-containing polymers are more intensively packed than other polymer films via their strong polar intermolecular actions and enhance the hydrophobic phases, which consequently improve the dimensional stability of membrane films.

Figure 21:
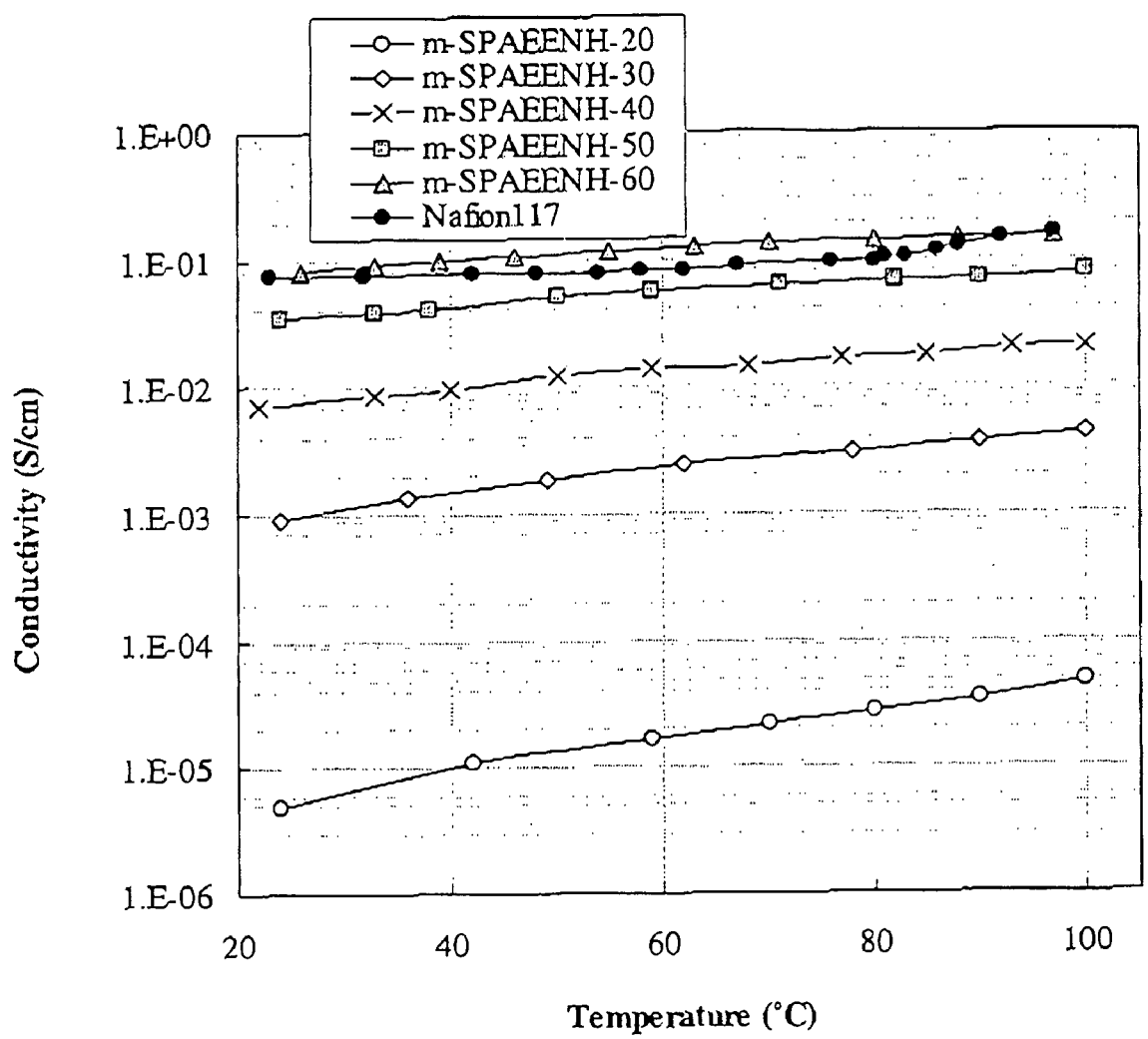
FIG. 21 illustrates proton conductivities of m-SPAEENH copolymers after hydration in hot water for 36 h

All the membranes maintained good shape and were mechanically strong after the hydration pretreatment of immersion in 98° C. water for 36 h. This pretreatment differs from previous ones we employed in past studies, where the films were simply soaked in water at room temperature. This is because the nitrite copolymers were apparently more difficult to hydrate initially, as observed by conductivity profiles. The proton conductivity measurements of m-SPAEENH copolymers were run at 100% relative humidity as a function of SC and temperature in the longitudinal direction by AC impedance spectroscopy and the results are shown in FIG. 21. It shows that the proton conductivities of m-SPAEENH copolymers increase with both SC and temperature. However, their SC dependent tendency seems quite different from the temperature dependence. All m-SPAEENH copolymers display temperature-dependant proton conductivity curves parallel to that of Nafion 117, i.e., their logarithmic conductivities are linearly dependant on the reciprocal of the temperature from RT to 100° C., indicating their similar proton transfer mechanism and activation energy to Nafion, involving hydronium ions.

Figure 22:
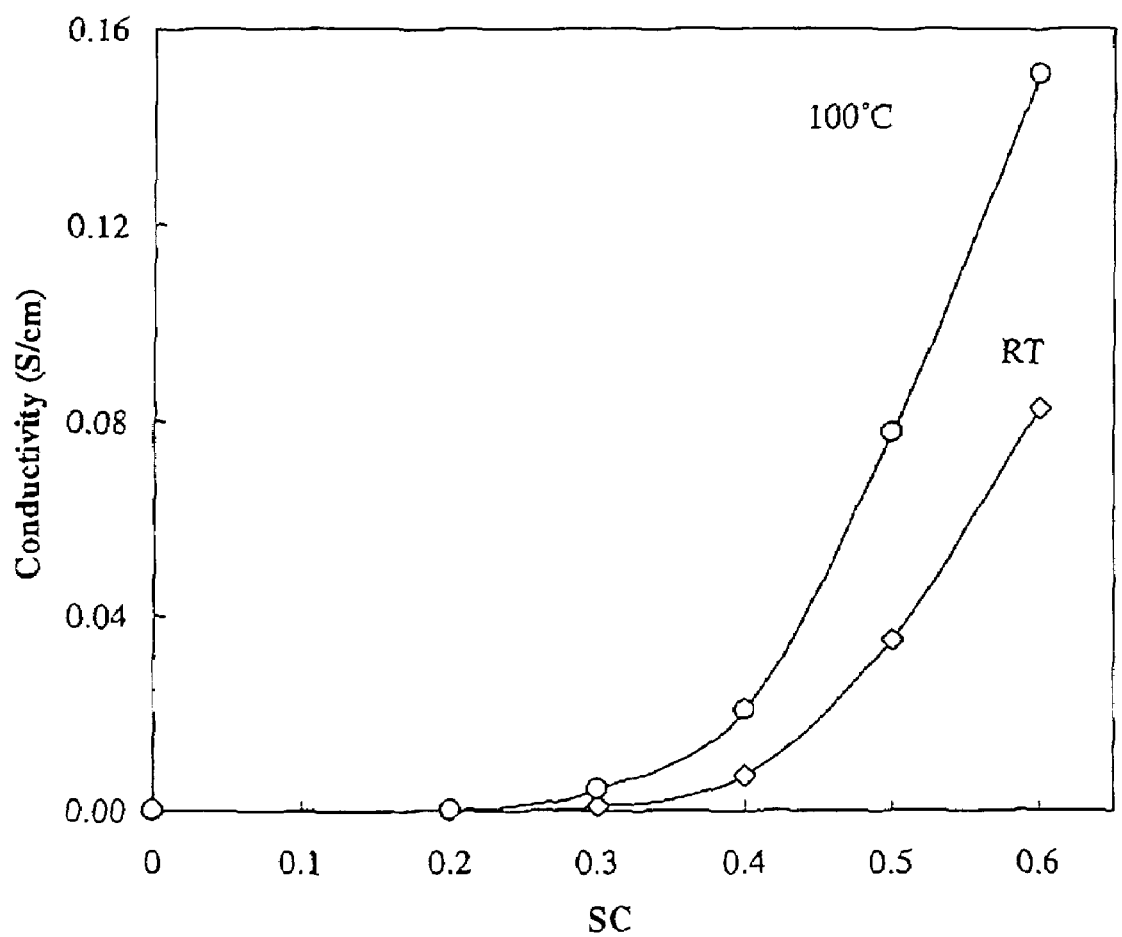
FIG. 22 illustrates SC dependence of proton conductivity of m-SPAEENH copolymers

An increase in SC from 20% to 30% resulted in a two orders of magnitude increase in proton conductivity. At SC>30%, the rate of increase in proton conductivity with SC slows down gradually. When the proton conductivities were plotted against SC (FIG. 22), it is noticeable that the proton conductivity initially increases exponentially with SC and then the rate of increase diminishes. This phenomenon can be explained by channel formation upon hydration. As described previously, sulfonic acid groups form clusters in the continuous hydrophobic phase, which increase in size into interconnecting channels for protons upon hydration. At low SC values, hydrated sulfonic acid groups formed mainly distributed clusters and less connected channels, which resulted in low proton conductivities. An increase in the SC will considerably improve the connection and promote the proton conductivity greatly. At high SC values, however, obvious dimensional swelling in hydrated membranes will dilute the volume concentration of sulfonic acid groups in the membrane, which negatively affects the increase of proton conductivity with increasing SC. This is because the swelling increases at an accelerate rate with SC and retards the increase in conductivity. m-SPAEENH-50 and m-SPAEENH-60 show high proton conductivities comparable with Nafion117 from room temperature to 100° C., ranging from $6.2 \times 10^{-2}$ to $1.5 \times 10^{-1}$ S/cm. The comparisons on swelling and conductivity of m-SPAEENH copolymers and Nafion117 in addition to our selected previously prepared sulfonic acid-containing poly(aryl ether)s are summarized in Table 12. SPAEEKK-100 prepared from 1,3-bis(4-fluorobenzoyl)benzene and sodium 6,7-dihydroxy-2-naphthalenesulfonate was reported with proton conductivities values which were lower than that of Nafion117 under the same measurement conditions [22]. It should be noted here that the proton conductivities were originally measured transversely (through the membrane), which give values significantly lower than those measured longitudinally (along the membrane). As Table 12 shows, previously reported sulfonic acid-containing poly(aryl ether)s have either Nafion-comparable proton conductivities but excessive swelling or reasonable swelling but lower proton conductivities than Nafion. However, m-SPAEENH copolymers, especially m-SPAEENH-60, have both low dimensional swellings and high proton conductivities, comparable to Nafion117. The reason for low water uptake and swelling has been discussed before. Here, the high proton conductivity is explained. Normally, post-sulfonation of poly(aryl ether)s results in the sulfonic acid group being located ortho to the ether linkage, which deactivates the acidity of sulfonic acid and lowers the proton conductivity. The sulfonated poly(aryl ether sulfone) or poly(aryl ether ketone) copolymers prepared from biphenol and SDCDPS or 3,3'-disulfonate-4,4'-difluorobenzophenone (S-DFB) also have sulfonic acid groups ortho to ether linkage, which are both deactivated by the ether linkage and activated by the SDCDS or S-DFB units at the same time. Unlike those polymers, m-SPAEENH has sulfonic acid groups meta to the ether linkage, which is a less deactivating position, resulting in a higher acidity of sulfonic acid groups. The effect of sulfonic acid located on different sites will be further discussed in another paper.

Figure 23:
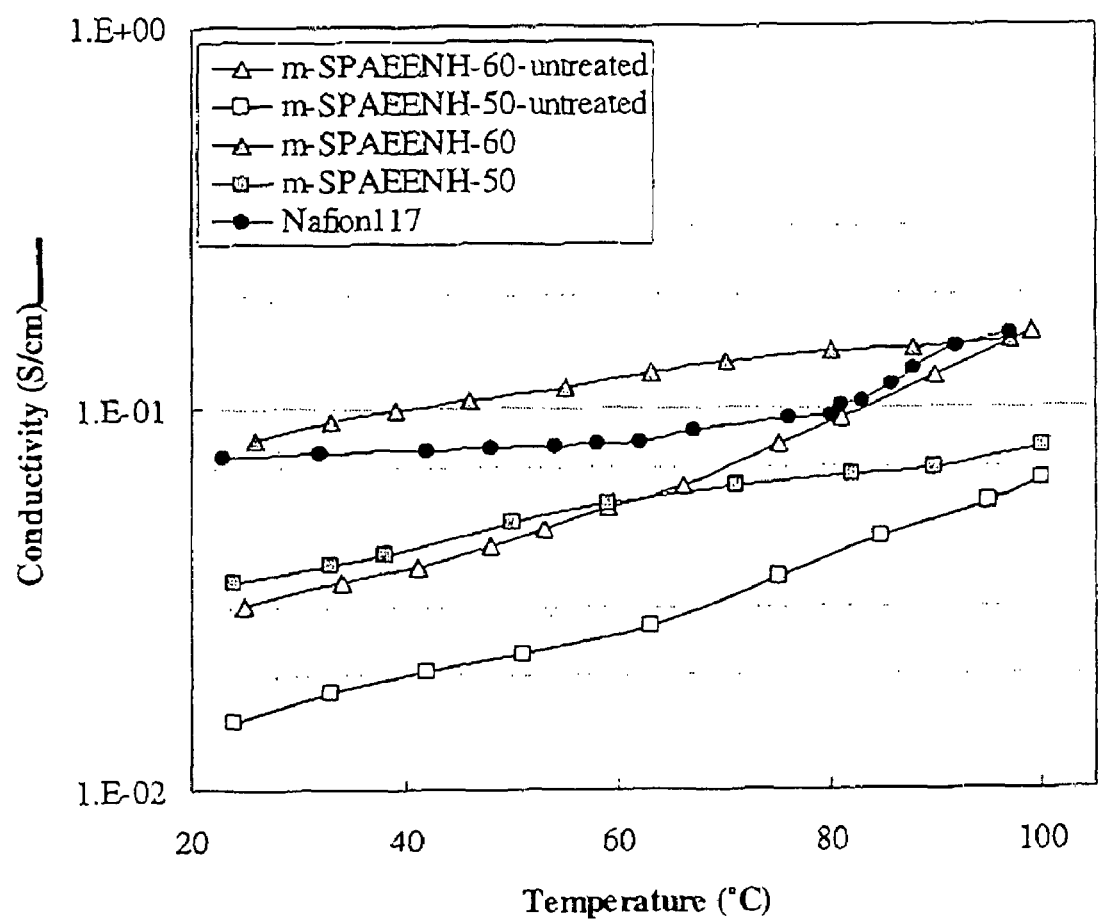
FIG. 23 illustrates temperature dependence of proton conductivity of M-SPAEENH copolymers with or without hot water treatment

Kim [49] reported that high-temperature acidification of solvent-cast films gave high proton conductivities due to different microstructure formation occurring during various acidification process. In the present work, the films were all acidified at room temperature. However, they were soaked in deionized water at different temperatures before conductivity test. The results are plotted in FIG. 23. Unlike m-SPAEENH copolymers, which were soaked in hot water for 36 h prior to conductivity measurement, m-SPAEENH-50-untreated and m-SPAEENH-60-untreated were only immersed in deionized water at room temperature for 24 h. FIG. 23 shows that proton conductivities of hot water-soaked m-SPAEENH-50 and m-SPAEENH-60 are less temperature-dependant than those of m-SPAEENH-50-untreated and m-SPAEENH-60-untreated and at high temperatures they to converge to approximately the same values for the membranes treated differently. This is explained by taking into consideration the synergic effect of a water confinement effect of 2,8-DHNS-6 structure, the nitrile group polarity as well as the microstructure effect discussed by Kim [50]. m-SPAEENH-50-untreated and m-SPAEENH-60-untreated were not completely hydrated at low temperatures, consequently inadequately formed proton channels were improved with temperature and the proton conductivities increased more sensitively with temperature. The angled structure of 2,8-DHNS-6 increases the interchain spacing and creates permanent pores lined with —$SO_3H$ groups. Once $H_2O$ enters the pore at high temperature, it is held very strongly. In addition, polar nitriles in the hydrophilic domains of nano phased separated film may also interact with the water molecules confined in the pore, which would assist in enhancing the water confinement. As a result, hot water-soaked rn-SPAEENH-50 and m-SPAEENH-60 show higher proton conductivities even after having been cooled down to room temperature. At higher temperatures, water uptake and proton channels tend to be the same no matter how the membranes were treated initially; their proton conductivities tend to be the same.

The tensile properties were measured at room temperature and are summarized in Table 13.

TABLE 13

Tensile properties of m-SPAEENH copolymers

| Polymer | Tensile strength (MPa) | Elongation at break (%) |
|---|---|---|
| m-SPAEEN-20 | 78 | 4.5 |
| m-SPAEEN-30 | 73 | 10 |
| m-SPAEEN-40 | 39 | 3.5 |
| m-SPAEEN-50 | 56 | 4.6 |
| m-SPAEEN-60 | 54 | 4.6 |
| Nafion ®117 | 10 | 623 |

All membranes show small strain with elongation at break of 3.5% to 10% compared to 623% of Nafion117. Tensile strengths are from 39 MPa to 78 MPa, several-fold higher that the 10 MPa value of Nafion117.

Conclusions

A series of aromatic poly(aryl ether ether nitrile)s containing sulfonic acid groups meta to ether linkage (m-SPAEEN) having 0-60 mol % of 2,8-dihydroxynaphthalene-6-sulfonate (2,8-DHNS-6) segment, have been successfully prepared from commercially available inexpensive monomers via one-step polycondensation reactions. m-SPAEENH copolymers have good thermal stabilities with decomposition temperatures higher than 250° C. and $T_g$s higher than 230° C. m-SPAEENH membranes have tensile strength from 39 to 78 MPa, several times higher than 10 MPa of Nafion117 and elongation at break from 3.5-10%, several hundred times smaller than 623% of Nafion117. Pendant nitrile groups increase the dipole interactions between polymer chains and decrease the membrane swelling, even up to 100° C. The angled structure of 2,8-DHNS-6 increases the interchain spacing and confines he water molecules, which improves the proton conductivities of membranes at lower temperatures. The location of the sulfonic acid groups meta to the ether linkage results in the copolymer sulfonic acid groups being less deactivated, giving membranes with high proton conductivity due to the increased acidity. Furthermore, the meta position is expected to reduce hydrolytic instability. The combination of inexpensive monomers, high thermal stability, low dimensional swelling, good mechanical properties and high proton conductivity makes m-SPAEENH-50 and m-SPA-EN-60 attractive as PEM materials for fuel cells applications.

Experimental (SPPEKN)s

Materials

DHPZ was synthesized according to the procedure reported previously[45-48]. SDFB-Na was prepared according to the procedures described early and in literature articles[16, 18]. N-methyl-2-pyrrolidone (NMP) was vacuum distilled before use. All other chemicals were obtained from Aldrich and were reagent grade and used as received.

MEMBRA-CEL™ dialysis tubing (MWCO 3500) was obtained from Serva Electrophoresis (Germany)

Copolymerization Reaction

As depicted in scheme 1A, the SPPEKN copolymers were synthesized via nucleophilic polycondensation reaction.

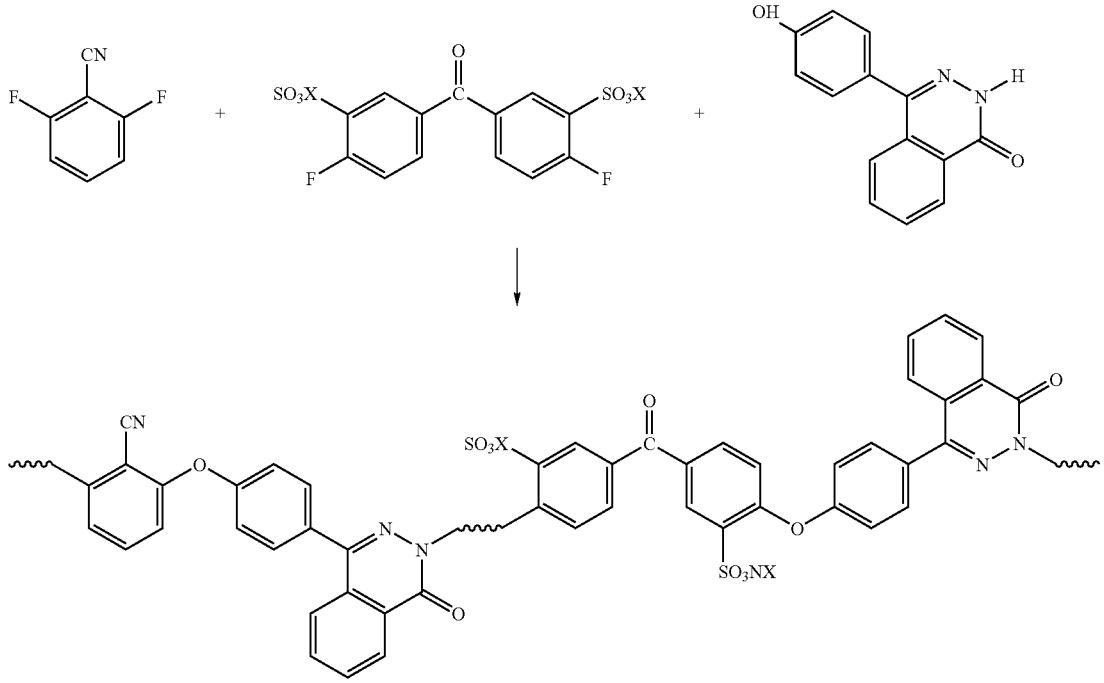

Scheme 1A Synthesis of SPPEKN copolymers

Wherein X=Na or K or H

The synthesis of SPPEKN-40 is used as a typical example, where n (40) denotes to the SDFB-Na monomer feed mole ratio of difluoro monomers. To a three-neck flask with a magnetic stirrer, a Dean-Stark trap and condenser, and an argon inlet, 0.8605 g 2,6-DFBN (4.04 mmol), 1.706 g SDFB- Na (6 mmol), 2.383 g DHPZ (10 mmol), and 1.8 g potassium carbonate (13 mmol) were added. Then 12 mL of NMP and 20 mL chlorobenzene were charged into the reaction flask under an argon atmosphere. The reaction mixture was heated to 140° C. After dehydration and removal of chlorobenzene (~3-4 h), the reaction temperature was increased to around 165° C. After a period of 5-7 h, when the solution viscosity had obviously increased, several mL of NMP was added to dilute the solution and the reaction was continued for a further 3-5 h. Then, the mixture was cooled to 100° C. and coagulated into a large excess of ethanol with vigorous stirring. After recovering the product, SPPEKN-40 was washed with deionized water to remove residual solvent and salt.

Copolymer Analysis and Measurement $^1$H NMR spectra were obtained on a Varian Unity Inova NMR spectrometer operating at a proton frequency of 399.95 MHz. Deuterated dimethylsulfoxide (DMSO-$d_6$) was the most convenient NMR solvent for SPPEK; the TMS signal at 0 ppm was used as the chemical shift reference. IR spectra were measured on a Nicolet 520 Fourier transform spectrometer with membrane film samples in air.

A TA Instruments thermogravimetric analyzer (TGA) instrument model 2950 was used for measuring the degradation (weight loss) temperatures ($T_d$) and a TA Instruments differential scanning calorimeter (DSC) model 2920 calibrated with Tin at 231.93° C. was used for measuring the $T_g$s. Copolymer samples for TGA analysis were preheated to 120° C. at 10° C./min under air atmosphere and held isothermally for 60 min for moisture removal. Samples were then heated from 90° C. to 750° C. at 10° C./min for $T_d$ measurement. Samples in potassium form for DSC analysis were initially heated rapidly at a rate of 20° C./min under nitrogen atmosphere to 450° C., followed by quenching in liquid nitrogen. When the DSC cell had cooled to around 50° C., the samples were replaced in the cell and heated at a rate of 10° C./min to 400° C. The procedure for samples in acid form was similar except that the initial heating rate was 10° C./min and the end point was below the polymer $T_d$ point.

Intrinsic viscosities were determined using an Ubbelohde viscometer for N,N-dimethylacetamide (DMAC) solutions of polymer at 25° C.

Preparation of Membrane Films

An amount of 1 g sulfonated polymer in sodium form was dissolved in 20 mL of DMAc and filtered. The filtered solution was poured onto a glass plate and dried at 40° C. for about two days. The acid form (SPPEKNH) membrane films were obtained by immersing sodium form membrane films in 2 N $H_2SO_4$ for 24 h at room temperature, followed by deionized water for 24 h during which deionized water was change several times in order to remove excess acid, then dry in the air for several hours.

Water Uptake Content Measurement and Swelling Ratio

The sample films were soaked in deionized water for 24 h. The membrane films were then dried at 80° C. for 24 h. Weights of dry and hydrated membranes were measured. The water uptake content was calculated by $$\text{Uptake content (\%)} = \frac{\omega_{wet} - \omega_{dry}}{\omega_{dry}} \times 100\%$$

Where $\omega_{dry}$ and $\omega_{wet}$ are the masses of dried and wet samples respectively. The swelling ratio was calculated from films 5~10 cm long by:

$$\text{Swelling ratio (\%)} = \frac{l_{wet} - l_{dry}}{l_{dry}} \times 100\%$$

Where $l_{dry}$ and $l_{wet}$ are the lengths of dry and wet samples respectively.

Tensile Test

Tensile tests were performed on an Instron tensile tester (model 1123) at a strain speed of 50 nm/min at room temperature. Membrane films with typical size of 40 mm×4 mm×0.05 mm were used for testing.

Proton Conductivity

The proton conductivity measurements were performed on SPPEKNH membrane films by AC impedance spectroscopy over a frequency range of 1-10$^{49}$ Hz with oscillating voltage 50-500 mV, using a system based on a Solatron 1260 gain phase analyzer. A 20×10 mm membrane sample was placed in a temperature controlled cell open to the air by a pinhole where the sample was equilibrated at 100% RH at ambient atmospheric pressure and clamped between stainless steel electrodes. Specimens were soaked in deionized water for 24 to 48 h prior to the test. The conductivity ($\sigma$) of the samples in the longitudinal direction was calculated from the impedance data, using the relationship $\sigma$=/RS where d and S are the thickness and face area of the sample respectively and R was derived from the low intersect of the high frequency semicircle on a complex impedance plane with the Re (Z) axis. The impedance data were corrected for the contribution from empty and short circuited cell.

Results and Discussion

Copolymerization

In order to obtain polymers with target proton conductivities of $\geq 10^{-2}$ S/cm, a specific range of monomer compositions were designed for SPPEKN copolymers. The series of SPPEKN copolymers were prepared by nucleophilic substitution reactions with DHPZ as the diphenol, SDEB-Na and 2,6-DFBN as activated dihalides and $K_2CO_3$ as a weak base. All SPPEKN copolymers were obtained under the same polymerization conditions used for the synthesis of SPPEKs and SPPESs[18]: under inert argon atmosphere, NMP was used as the reaction solvent, chlorobenzene was used to remove the water generated from the reaction of diphenol and $K_2CO_3$ at 130 to 140° C. When an obvious increase in the viscosity of reaction solutions was observed at a reaction temperature of 170° C., which indicated a high molecular weight had been reached, the reaction solutions were precipitated in ethanol or water. As shown in Scheme 1A, the sulfonate content and the nitrile group content in SPPEKN copolymers were balanced by varying the feed ratio of SDFB-Na to 2,6-DFBN. The sulfonate content (SC) is used to define the SPPEKN copolymers and is expressed as the molar ratio of SDFB-Na units (bearing the —$SO_3Na$ group) to 1.0 molar DHPZ unit. For example, the average repeat unit of SPPEKN-30 copolymer is composed of 0.3 unit of SDFB-Na, 0.7 unit of 2,6-DFBN and 1.0 unit of DHPZ. Table 5 lists the polymerization conditions and details of the resulting polymers.

TABLE 5

Viscosity data for SPPEKNs

| Polymer | SDFB-Na mmol | 2,6-DFBN mmol | DHPZ mmol | $[\eta]^a$ dL/g | Meq (IEC) expected g/mol $SO_3$ (Meq $g^{-1}$) | SC expected |
|---|---|---|---|---|---|---|
| SPPEKN-30 | 3.0 | 7.07 | 10 | 2.32 | 702 (1.42) | 0.6 |
| SPPEKN-35 | 3.5 | 6.56 | 10 | 1.71 | 631 (1.58) | 0.7 |
| SPPEKN-40 | 4.0 | 6.06 | 10 | 1.39 | 562 (1.78) | 0.8 |
| SPPEKN-45 | 4.5 | 5.56 | 10 | 1.20 | 515 (1.94) | 0.9 |
| SPPEKN-50 | 5.0 | 5.05 | 10 | 1.45 | 478 (2.09) | 1.0 |
| SPPEKN-55 | 5.5 | 4.55 | 10 | 0.684 | 447 (2.24) | 1.1 |
| SPPEKN-60 | 6.0 | 4.04 | 10 | 1.02 | 422 (2.37) | 1.2 |

$^a$Measured at 25° C. in DMAc.

For the purpose of attaining polymers with proton conductivities higher than $10^{-2}$ S/cm, only SPPEKN copolymers with SC values ranged from 0.3 to 0.6 were synthesized. All SPPEKN copolymers had intrinsic viscosities higher than 0.6 in DMAc at 25° C. indicating the polymerizations proceeded to high molecular weights. All SPPEKN copolymers were cast into free-standing films, also confirming the high molecular weight of the resulting copolymers. Equivalent molecular weight (Meq) and ionic exchange capability (IEC) were also calculated theoretically and listed in Table 5 for comparison.

FT-IR

Figure 9:
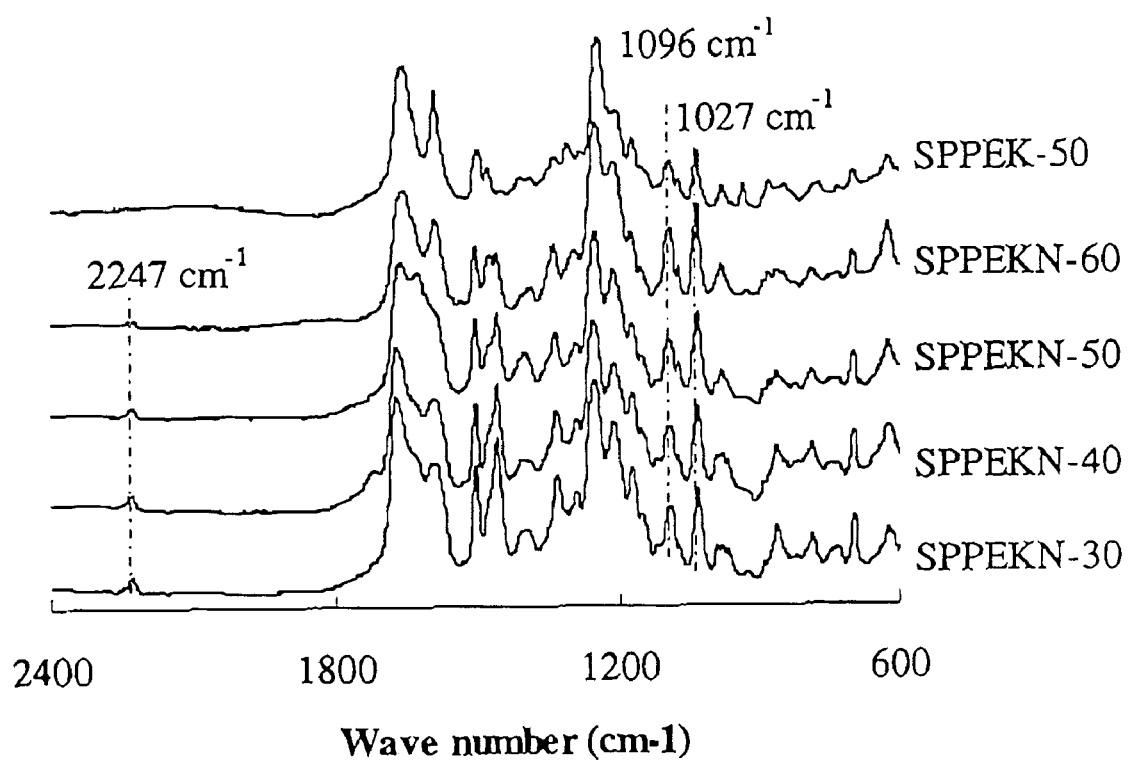
FIG. 9 illustrates FT-IR spectra of SPPEKN copolymers in sodium form

FT-IR is a convenient method to confirm the sulfonate or nitrile groups in new polymers. FIG. 9 illustrated the FT-IR spectra of SPPEKN copolymers, and the spectrum of SPPEK-50 (composed of 0.5 unit of SDFB-Na, 0.5 unit of 4,4-difluorobenzophenone and 1.0 unit of DHPZ) was also illustrated for comparison. In all the spectra of SPPEKN copolymers, characteristic bands of the aromatic sulfonate salt symmetric and asymmetric stretching vibrations were observed at 1027 and 1096 $cm^{-1}$ and the characteristic symmetric stretching band of nitrile groups was observed at 2247 $cm^{-1}$, which was not observed in the spectrum of SPPEK-50. It was observed that the intensity of two characteristic sulfonate absorption bands increases with SC values, meanwhile the intensity of the characteristic nitrile absorption decrease with values. This confirms that sulfonate groups and nitrile groups were introduced into the copolymers varying with the monomer feed ratio. Some other characteristic absorption in SPPEKN copolymers was also assigned. The absorption bands around 1600 $cm^{-1}$ is attributed to C=C stretching in phenyl ring. The absorption bands around 1668 $cm^{-1}$ is attributed to carbonyl group. The characteristic absorption bands of bands of 1,4-aromatic ring substitution at 1510 $cm^1$ also decrease with SC values. The absorption bands at 1217 and 1260 $cm^{-1}$ are due to phenoxy groups.

NMR

Figure 10:
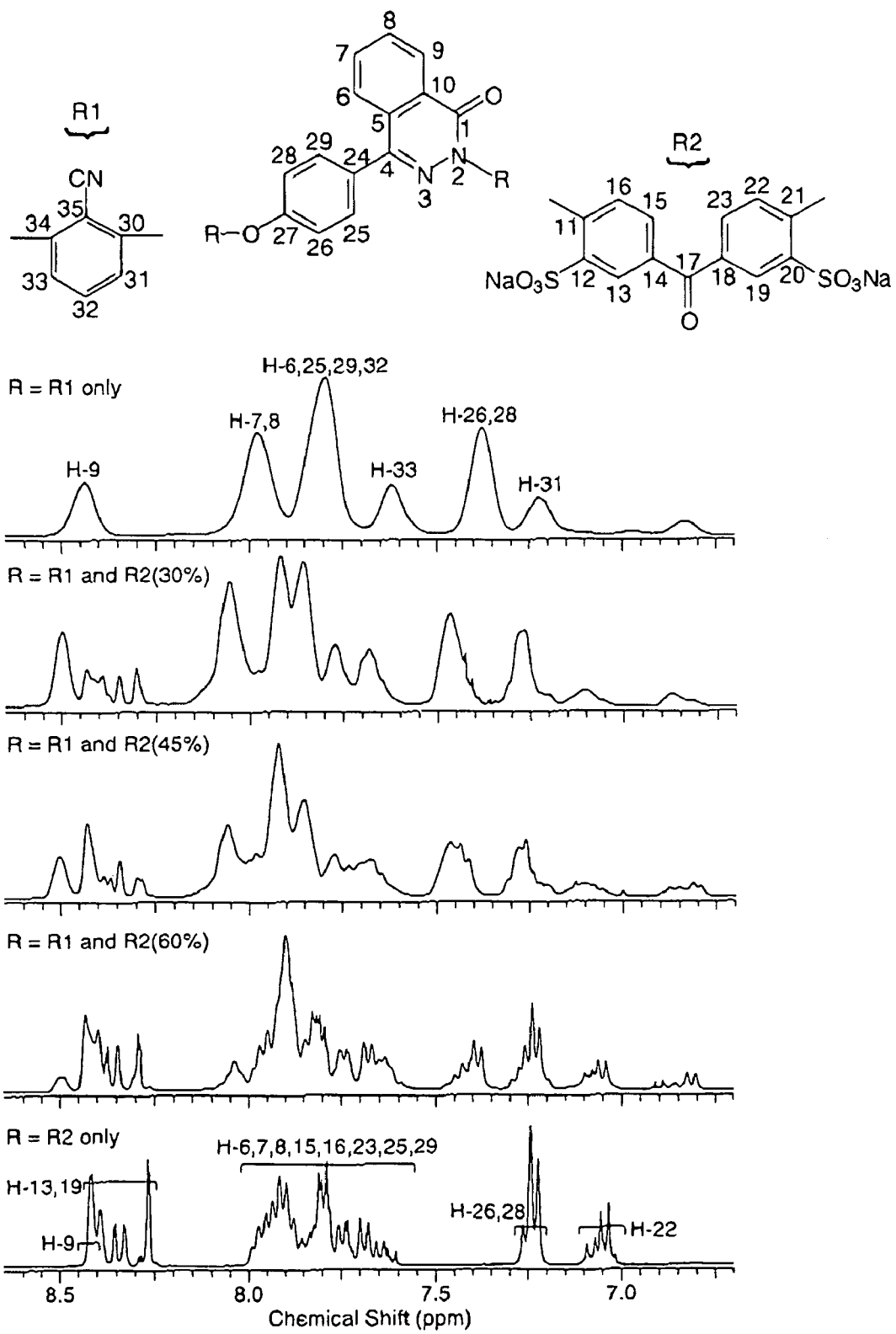
FIG. 10 illustrates $^1$H NMR stacked spectra of PPEKN (top), SPPEK (bottom) and SPPEKN with SC of 30, 45 and 60%

FIG. 10 displays the aromatic region of five polymers. The top and bottom spectra represent the polymers poly(phthalazinone ether nitrile) (PPEN) and SPPEK respectively whereas the three other spectra are SPPEKN with various SC. Assignment of the PPEN signals was done using $^1$H and 2D-COSY and TOCSY NMR. The three different hydrogen spin systems (H-6,7,8,9; H-25,26; H-31,32,33) were easily detected and assigned using 2D. The analysis of SPPEK $^1$H spectrum was achieved earlier 18 and is shown in FIG. 10. These two fully assigned spectra were incorporated into FIG. 10 in order to better visualize the signal changes taking place into the three SPPEKN spectra. The copolymer spectra are very complex as a result of the asymmetry of the phthalazinone monomer. As illustrated in FIG. 10, both R groups for the copolymers can either be nitrile or sulfonated monomers. The different feed ratios of sulfonated monomer also add to the complexity of the spectra therefore we did not try to assign the signals from the three SPPEKN copolymers. Nevertheless, FIG. 10 clearly shows downfield growing signals for sulfonated monomer and upfield growing signals for the nitrile monomer. We observed from previous experience[18] of measuring the SC from $^1$H NMR data that the SC is usually consistent with the feed ratio of monomers. The apparent changes one can see are that sulfonated repeat unit signals increase while nitrile decrease with SC values. The smaller signals at lower frequency are either from chain end groups or they could also be a result of one of the many possible configuration of RU due to the factors described above.

Thermal Properties

Figure 11:
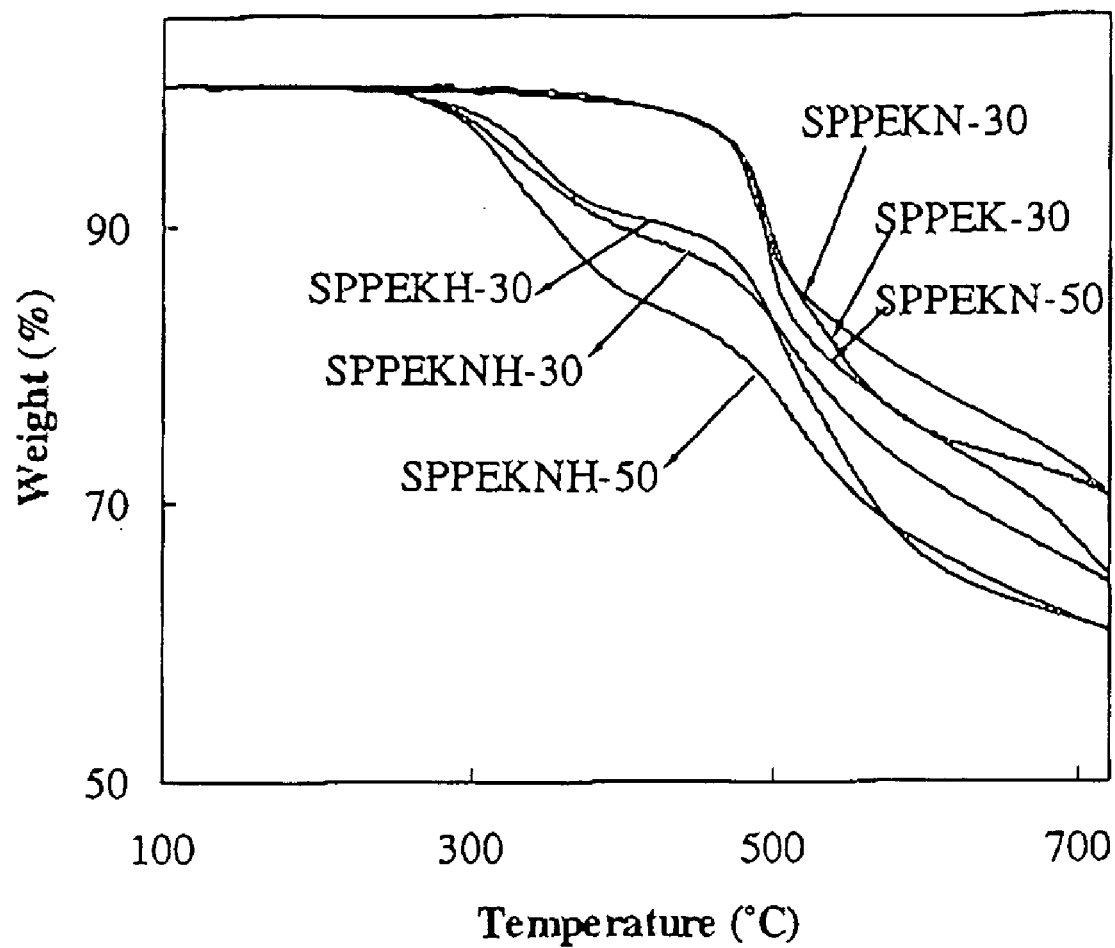
FIG. 11 illustrates TGA traces of copolymers

The thermal properties of SPPEKN copolymers in both salt and acid forms are listed in Table 6 and illustrated in FIG. 11.

TABLE 6

Thermal properties of copolymers

| Polymer | $T_g$ (° C.) Sodium form | $T_g$ (° C.) Acid form | $T_{d5\%}$ (° C.) Sodium form | $T_{d5\%}$ (° C.) Acid form | $T_d$ (° C.) extrapolated onset for first weight loss Sodium form | $T_d$ (° C.) extrapolated onset for first weight loss Acid form |
|---|---|---|---|---|---|---|
| PPEK | 263 | | 487 | | 470 | |
| SPPEK-40[12] | 367 | 294 | 475 | 340 | 456 | 302 |
| SPPEK-50[12] | 390 | ND | 482 | 322 | 458 | 294 |
| SPPEK-60[12] | ND | ND | 484 | 339 | 461 | 307 |
| SPPEKN-30 | 359 | ND | 475 | 327 | 463 | 278 |
| SPPEKN-35 | 362 | ND | 480 | 348 | 473 | 293 |
| SPPEKN-40 | 365 | ND | 483 | 342 | 479 | 298 |
| SPPEKN-45 | 372 | ND | 483 | 342 | 476 | 303 |
| SPPEKN-50 | ND | ND | 479 | 317 | 475 | 282 |
| SPPEKN-55 | ND | ND | 479 | 310 | 474 | 337 |
| SPPEKN-60 | 384 | ND | 466 | 327 | 476 | 296 |

* ND: not detected

There is only one weight loss step in the TGA curves of salt form SPPEKN copolymers (FIG. 11), which is assigned to the degradation of polymer main chain. Compared with PPEK and SPPEKs, no obvious difference in the thermal stability of salt form SPPEKN copolymers was observed and all their 5% weight loss temperatures and the extrapolated onset temperatures are higher than 460° C., indicating the high thermal stabilities of sodium form SPPEKN copolymers. As observed before[17-19, 22], there are two distinct weight loss steps in the TGA curves of SPPEKNH copolymers, and the 5% weight loss temperatures and the extrapolated onset temperatures for the first weight loss of SPPE-KNH copolymers caused by the loss of sulfonic acid groups are all higher than 280° C., which decrease with increasing SC values. The second thermal degradation around 480° C. was assigned to the degradation of the polymer main chain. Compared with SPPEK copolymers, the introduction of nitrile groups into the polymer chain did not have an obvious affect on the thermal stabilities of SPPEKN copolymers in either salt or acid forms. The SPPEKN copolymer series appear to have sufficient thermal stability for PEM usage.

Table 6 also lists the $T_g$s of SPPEKN copolymers. SPPE-KNH copolymers were not detected with $T_g$s before their $T_d$s. SPPEKN copolymers in sodium salt form show $T_g$s from 359 to 384° C., increasing with SC values and all higher than that of PPEK. The increase in the $T_g$s of SPPEKN copolymers are the result of the introduction of sodium sulfonate or sulfonic acid groups, which increase intermolecular interaction by pendant ions or hydrogen bonding and molecular bulkiness and hinder the internal rotation of high molecular chain segment. The introduction of nitrile groups didn't sacrifice the $T_g$s of SPPEKN copolymers.

Water Uptake and Swelling Ratio

It was reported that some sulfonated polymers are nanophase separated into hydrophilic and hydrophobic domains wherein sulfonate or sulfonic acid groups and polymer backbones aggregate separately[8, 50, 40, 43]. The hydrophobic part provides the hydrated sulfonated polymer membrane films with good morphological and mechanical stability whereas the hydrophilic domains imbibe water and provide good proton conductivity. Since PEMs in fuel cells are generally operated at temperatures close to 80° C., water uptake and swelling ratio of SPPEKN copolymers were measured at both room temperate and 80° C. in relation to the SC values, and the counter ions, as shown in Table 7.

pared from DHPZ, 4,4'-SDFB-Na and 4,4'-difluorobenzophenone reported previously[18], SPPEKN copolymers with similar water uptake have higher IEC values. In other words, SPPEKN copolymers imbibe less water and swell less at equivalent IEC values to SPPEK copolymers and Nafion®117. Since the aggregation of hydrophilic sulfonic acid groups in SPPEKN membrane films are similar to those in SPPEK, the greater hydrophobic aggregation occurring as a result of the SPPEKN leads to a relative decrease in the water uptake and swelling ratios compared with. The use of 2,6-DFBN for the SPPEKN copolymerizations instead of 4,4'-difluorobenzophenone for SPPEK polymerizations resulted in the strongly polar nitrile groups pendant on aromatic rings of SPPEKN copolymers, instead of the weaker ketone groups in the polymer main chains of SPPEK copolymers. The strongly polar nitrile groups in should enhance the intermolecular interaction of polymers and enhance the hydrophobic network structure. As a result, free volume for water adsorption in SPPEKN membrane films is restricted, while reduces the water uptake. Consequently the dimensional stability of membrane films is improved.

Tensile Properties

Besides the requirement for thermal and dimensional stability of PEMs for fuel cells, adequate mechanical strength is also required. The tensile properties of SPPEKNH copolymers were tested at room temperature in both the dry and fully hydrated states and the results are tabulated in Table 8.

TABLE 7

Water uptake and swelling ratio of SPPEKN copolymer

| | Meq (IEC) | Room temperature | | | | 80° C. | | | |
|---|---|---|---|---|---|---|---|---|---|
| | expected g/mol SO$_3$ | Water uptake (%) | | Swelling ratio (%) | | Water uptake (%) | | Swelling ratio (%) | |
| Polymer | (Meq g$^{-1}$) | Sodium form | Acid form | Sodium form | Acid form | Sodium form | Acid form | Sodium form | Acid form |
| SPPEK-40[12] | 698 (1.43) | 21 | 24 | 6.0 | 9.5 | 26 | 28 | 7.5 | 11 |
| SPPEK-50[12] | 568 (1.76) | 33 | 42 | 11 | 15 | 101 | 210 | 29 | 50 |
| SPPEK-60[12] | 482 (2.07) | 47 | 60 | 14 | 20 | 410 | 2300 | 87 | 150 |
| SPPEKN-30 | 702 (1.42) | 14 | 16 | 4.5 | 7.4 | 18 | 32 | 5.2 | 10 |
| SPPEKN-35 | 631 (1.58) | 16 | 20 | 5.6 | 8.5 | 20 | 40 | 6.8 | 14 |
| SPPEKN-40 | 562 (1.78) | 26 | 29 | 7.4 | 13 | 44 | 99 | 16 | 31 |
| SPPEKN-45 | 515 (1.94) | 31 | 34 | 7.9 | 15 | 65 | 150 | 20 | 42 |
| SPPEKN-50 | 478 (2.09) | 36 | 51 | 8.3 | 18 | 92 | 1100 | 25 | 145 |
| SPPEKN-55 | 447 (2.24) | — | 79 | — | 29 | — | Dissolved | — | Dissolved |
| SPPEKN-60 | 422 (2.37) | 220 | Swelled | 52 | Swelled | Dissolved | Dissolved | Dissolved | Dissolved |

SPPEKN-55 in sodium form was brittle when fully dehydrated. It was difficult to measure the changes in length and weight; hence no accurate data could be reported. However, the membrane film of SPPEKN-55 in sodium form maintained its shape in the hydrated state at room temperature. In general, the water uptake and swelling ratio of SPPEKN copolymers in both salt and acid forms increase with SC or IEC values and temperature. Membrane films in acid form have higher water uptake and swelling ratio values than salt form ones because of the hydrogen bond interactions between H$_2$O and sulfonic acid groups. Compared with Nafion®117 (IEC=0.91 mmol/g) membrane, which shows a water uptake of 35% at room temperature[44] and SPPEK copolymers pre-

TABLE 8

Tensile properties of SPPEKNH copolymers

| | Dry membranes | | Hydrated membranes | |
|---|---|---|---|---|
| Polymer | Tensile strength (MPa) | Elongation at break (%) | Tensile strength at break (MPa) | Elongation at break (%) |
| SPPEKNH-30 | 39 | 5.4 | 36 | 6.8 |
| SPPEKNH-35 | 52 | 4.1 | 48 | 5.4 |
| SPPEKNH-40 | 43 | 3.8 | 37 | 3.9 |

TABLE 8-continued

Tensile properties of SPPEKNH copolymers

| Polymer | Dry membranes | | Hydrated membranes | |
|---|---|---|---|---|
| | Tensile strength (MPa) | Elongation at break (%) | Tensile strength at break (MPa) | Elongation at break (%) |
| SPPEKNH-45 | 37 | 3.7 | 36 | 4.9 |
| SPPEKNH-50 | 42 | 3.9 | 21 | 4.2 |
| SPPEKNH-55 | 22 | 3.0 | 25 | 3.8 |
| SPPEKNH-60 | 35 | 5.8 | — | — |
| Nafion ®117 | 10 | 623 | — | — |

In general, all SPPEKNH copolymers exhibited good tensile strength ranging from 22 to 52 MPa and an elongation at break ranging from 3.7% to 5.8%. SPPEKNH-55 exhibited lower tensile strength than other SPPEKNH copolymers, since SPPEKNH-55 had lower molecular weight than other copolymers. For comparison, Nafion®117 was also tested under the same conditions and the results are also shown in Table 8. Compared with Nafion®117, all SPPEKNH copolymers exhibited much higher tensile strength values and less elongation at break. After immersion in deionized water at room temperature for 24 h, during which time the polymer membrane films are normally fully hydrated[18,40], SPPEKNH copolymers exhibited decreases in tensile strength and increase in elongations at break except SPPEKNH-55, which maintained its tensile strength. SPPEKNH-60 swelled excessively and lost its mechanical strength in the fully hydrated state. The decreases in tensile strengths were the result of water plasticization in membrane films. In the dry state, the sulfonic acid groups contribute to the tensile strength of membrane films via ionic interactions. However, when fully hydrated, the ionic interactions were partly replaced by hydrogen-bonding between $H_2O$ and sulfonic acid groups. The film dimensional size was increased by imbibed water and the rigid network structure of the membrane was weakened, resulting in a decrease in the tensile strength in membrane films. However, all hydrated SPPEKNH membrane films still have higher tensile strength values than Nafion®117. The comparison with Nafion®117 indicates that SPAEENH copolymers qualify for the tensile strength requirements for PEM fuel cells applications.

Proton Conductivity

Figure 12:
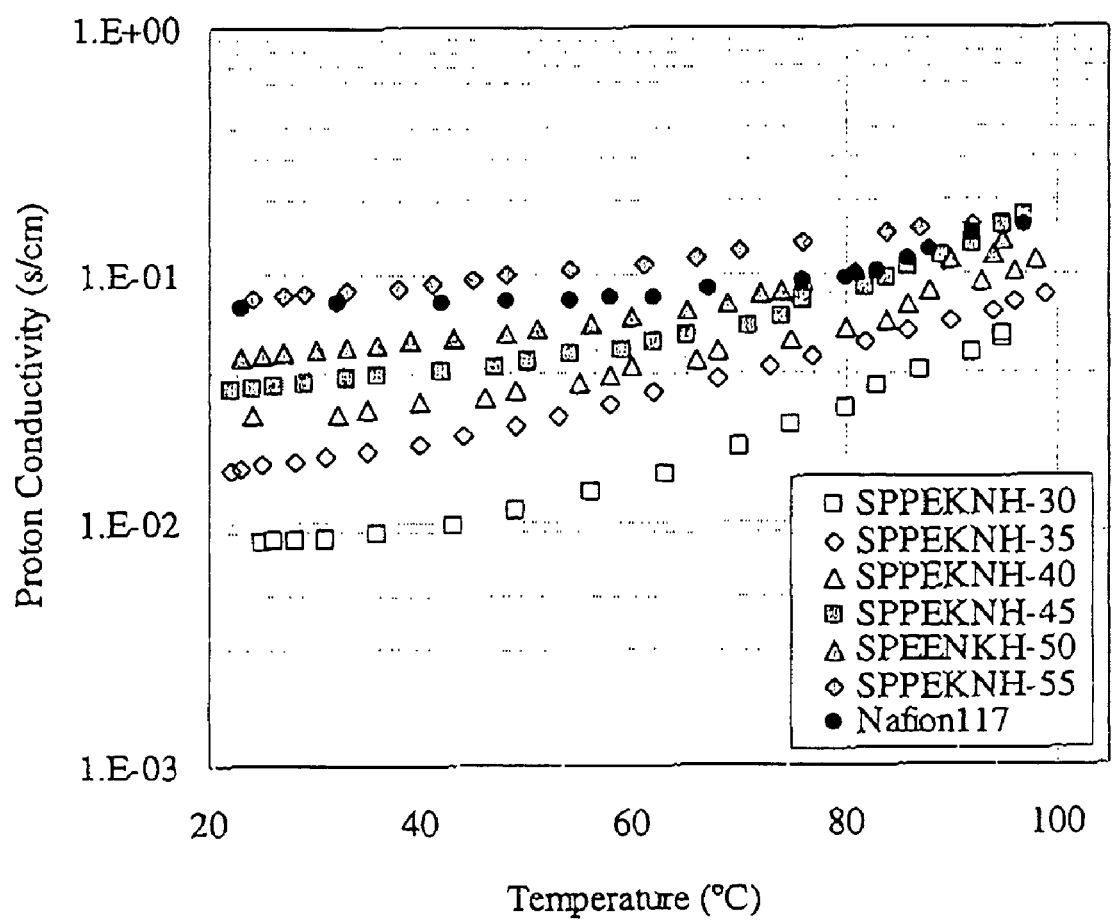
FIG. 12 illustrates Proton conductivities measured longitudinally of SPPEKNH copolymers compared with Nafion 117

Proton conductivities of SPPEKNH copolymers as functions of SC and temperature were measured in air at 100% relative humidity in the longitudinal direction by AC impedance spectroscopy and shown in FIG. 12. For comparative purpose, the proton conductivity of Nafion®117 was also measured under the same experimental conditions.

The SPPEKNH membrane film series showed room temperature proton conductivities in the range of around $10^{-2}$ to $10^{-1}$ S/cm according to the SC values. SPPEKNH-60 swelled excessively even at room temperature; thus its proton conductivity could not be measured. Generally speaking, proton conductivities increase with SC, temperature and the values are from $8.3 \times 10^{-3}$ to $1.7 \times 10^{-1}$ S/cm. For comparison, Nafion®117 showed proton conductivities from $7.5 \times 10^{-2}$ at room temperature to $1.6 \times 10^{-1}$ S/cm at 97° C. SPPEKN-50 and SPPEKN-55 shown proton conductivities higher than or close to Nafion®117 at all test temperatures; however, they swelled at elevated temperatures or even dissolved in hot water. Thus, SPPEKNH-50 and SPPEKNH-55 are unsuitable for PEM applications at elevated temperatures although they may be used at room temperature. SPPEKNH-35, SPPE-KNH-40 and SPPEKNH-45 films showed good proton conductivities, from $10^{-2}$ to $10^{-1}$ S/cm at different temperatures, close to the values of Nafion117. In addition, since they maintained reasonable dimensional stabilities and tensile strengths in both the dry and hydrated states, they could be considered as promising candidates for PEMs applications. Compared with Nafion®117, SPPEKNM copolymers exhibited a more rapid increase in proton conductivities with temperature, suggesting that SPPEKNH copolymers have higher activation energy for proton conductivity.

Figure 13:
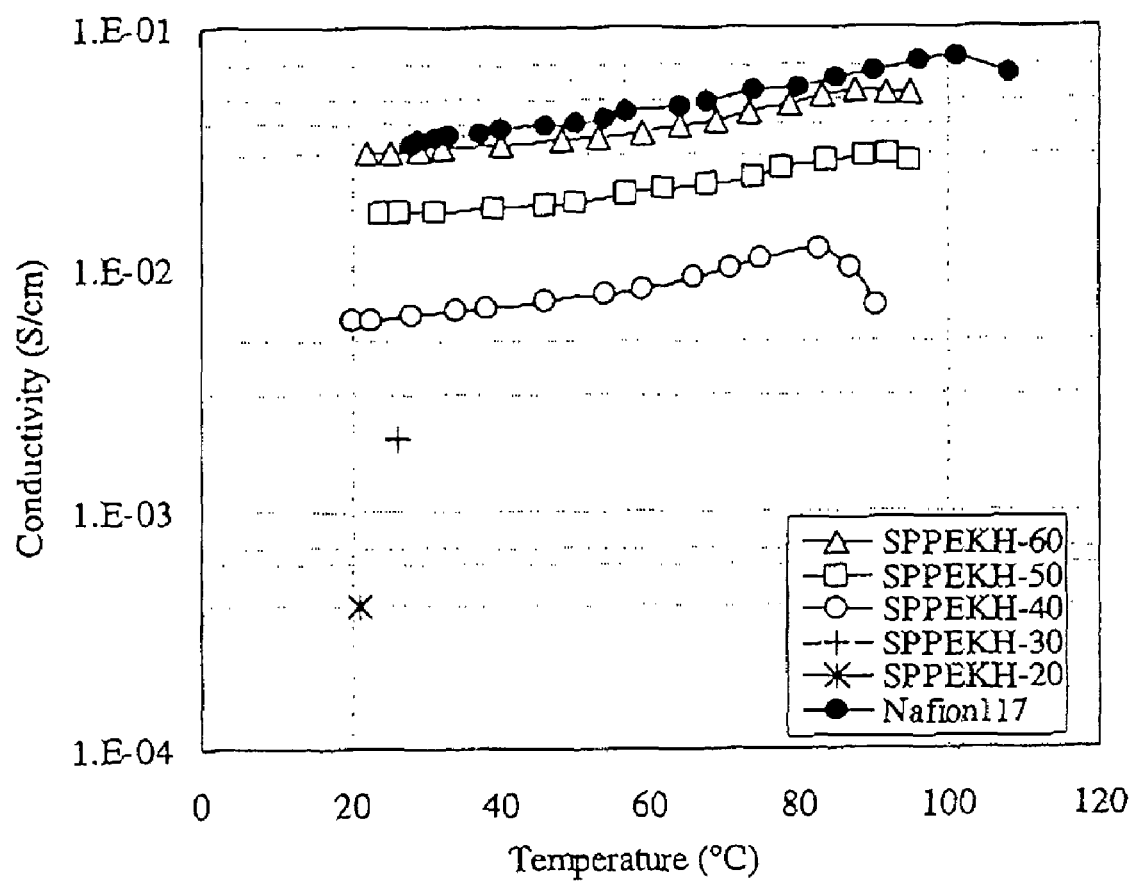
FIG. 13 illustrates Proton conductivities measured transversely of SPPEKH copolymers compared with Nafion 117

Since the proton conductivities of SPPEKH copolymers (FIG. 13) were measured in their transverse direction in our previous study, their data are not directly comparable with those of SPPEKNH copolymers, which were obtained in their longitudinal direction. We have observed that proton conductivity values we measured transversely are typically 3-5 times lower than those measured longitudinally. The comparisons of each series were made against Nafion 117 which were measured either in the transverse and longitudinal directions. In both FIGS. 12 and 13, SPPEKH and SPPEKNH respectively showed proton conductivities close to the values of Nafion117. SPPEKNH and SPPEKH copolymers with similar SC values showed similar differences in proton conductivities compared with Nafion117. The introduction of nitrile groups didn't lead to a significant decrease in the proton conductivities of copolymers.

Conclusions

Sulfonated poly(phthalazinone ether ketone nitrile) copolymers with high molecular weight were prepared by direct copolymerization reaction of disodium 3,3'-disulfonate-4,4'-difluorobenzophenone (SDFB-Na), 2,6-difluorobenzonitrile (2,6-DFBN), and 4-(4-hydroxyphenyl)-1 (2H)-phthalazinone (DHPZ) under general polycondensation reaction conditions. The sulfonic acid group content (SC) and nitrile content in the copolymers were balanced by varying the ratio of sulfonated monomer SDFB-Na to unsulfonated monomer 2,6-DFBN and characterized by FT-IR and NMR measurements. All SPEEKNH copolymers exhibited thermal stabilities up to 270° C., but no $T_g$s were observed up to their degradation temperatures.

Characteristic absorptions of aryl carbonyl, sulfonate and nitrile groups were observed in the resulting copolymers by FT-IR characterization. $^1$H NMR was also used to characterize the polymer structures. Membrane films in both salt and acid forms of SPPEKN copolymers with SDFB-Na to 2,6-DFBN mole feed ratios up to 60/40 were cast from the N,N-dimethylacetamide (DMAc) polymer solutions followed by immersing in 2 N sulfuric acid at ambient temperature. An increase of sulfonate groups in the copolymers resulted in increased glass transition temperature ($T_g$) and membrane hydrophilicity. The sodium form copolymers were thermally more stable than their acid form. The introduction of highly polar nitrile groups were expected to increase the intermolecular forces and make the polymers less moisture absorbable than previously prepared sulfonated poly(phthalazinone ether ketone) (SPPEK) copolymers and improve the combination of polymer and catalyst in the possible future usage The presence of highly polar nitrile groups in SPPEKNH renders the copolymers less moisture absorbable and swellable than the previously prepared SPPEKH copolymers. The SPPEK copolymers exhibited tensile strength stronger than Nafion®117 and reasonable flexibility in both the dry and hydrated states. The proton conductivities of SPPEKNH copolymers were in the range of $10^{-2}$ to $10^{-1}$ S/cm, increasing with SC values and temperature. Direct comparisons were made with Nafion®117 measured under the same conditions, to remove variability with measurement techniques. Nitrile groups are also anticipated to promote adhesion of the polymers to catalyst, carbon black in membrane electrolyte assembly (MEA) or certain conducting inorganics such as heteropolyacids in composite membranes[40]. Considering the combination of thermal properties, tensile strength, dimensional stability in the hydrated state and proton conductivity values, SPPEKN-35, -40 and -45 appear to be potentially good candidate for proton conducting membrane materials for fuel cells applications.

Experimental Part Other SPAEENs Containing Napthalene Structure

Materials.

6,7-Dihydroxynaphthalene-2-sulfonate sodium salt (2,3-DHNS-6), and 2,7-dihydroxynaphthalene-3,6-sulfonate disodium salt (2,7-DHNS-3,6) were purchased from Rintech, Inc. and recrystallized from deionized water. Dimethylsulfoxide (DMSO) and N-methyl-2-pyrrolidone (NMP) (Aldrich) were vacuum distilled prior to use. 4,4'-Biphenol (Aldrich) was sublimated before usage for purification. All other chemicals obtained commercially were reagent grade and used as received.

Copolymerization.

In a typical reaction, 10 mmol 2,6-BFBN, 4 mmol 2,3-DHNS-6, 6 mmol 4,4'-biphenol, and 15 mmol $K_2CO_3$ were added into a three-neck equipped flask with a magnetic stirrer, a Dean-Stark trap, and an argon gas inlet. Then, 10 mL DMSO (or NMP) and 10 mL chlorobenzene were charged into the reaction flask under an argon atmosphere. The reaction mixture was heated to around 130° C. After dehydration and removal of chlorobenzene, the reaction temperature was increased to about 160° C. When the solution viscosity had obviously increased, the mixture was cooled to 100° C. and coagulated into a large excess of water or ethanol with vigorous stirring. P-SPAEEN-40 was resulted, where n (40) refers to the 2,3-DHNS-6 content of aromatic phenol monomers. The product was washed thoroughly with water or ethanol several times.

Copolymer Analysis and Measurement.

$^1$H NMR spectra were obtained on a Varian Unity Inova NMR spectrometer operating at a proton frequency of 399.95 MHz. Deuterated dimethylsulfoxide (DMSO-$d_6$) was the NMR solvent and tetramethylsilane (TMS) was used as the chemical shift reference (0 ppm). IR spectra were measured on a Nicolet 520 Fourier transform spectrometer with membrane film samples in a diamond cell.

A TA Instruments thermogravimetric analyser (TGA) instrument model 2950 was used for measuring $T_d$s. Polymer samples for TGA analysis were preheated to 150° C. at 10° C./min under air atmosphere and held isothermally for 40 min for moisture removal. Samples were then heated from 90° C. to 750° C. at 10° C./min for $T_d$ measurement. A TA Instruments differential scanning calorimeter (DSC) model 2920 calibrated with tin at 231.93° C. and lead at 327.50° C. was used for measuring $T_g$s.

Intrinsic viscosities were determined using an Ubbelohde viscometer for N,N-dimethylacetamide (DMAc) solutions of copolymer at 30° C.

Preparation of Membrane Films.

An amount of 0.8 to 1.0 g sulfonated copolymer in the sodium salt form was dissolved in 20 mL of DMAc and filtered. The filtered solution was poured onto a leveled glass plate having a circular glass retaining wall and dried at about 40° C. for about one day. The acid form (SPAEENH-n) membrane films were obtained by immersing corresponding sodium form SPAEEN-n membrane films in 2 N $H_2SO_4$ for 24 h at room temperature, followed by deionized water for 24 h during which time the water was changed several times. The thickness of the membrane films was in the range of 40 to 70 µm.

Water Uptake Content Measurement and Swelling Ratio

The sample films were soaked in deionized water for 24 h at determined temperatures. The membrane films were then dried at 80° C. for 24 h. Weights of dry and wet membranes were measured. The water uptake content was calculated as $$\text{Uptake content (\%)} = \frac{\omega_{wet} - \omega_{dry}}{\omega_{dry}} \times 100$$

Where $\omega_{dry}$ and $\omega_{wet}$ are the masses of dried and wet samples respectively. The swelling ratio was calculated from films 5~10 cm long as:

$$\text{Swelling ratio (\%)} = \frac{l_{wet} - l_{dry}}{l_{dry}} \times 100$$

Where $l_{dry}$ and $l_{wet}$ are the lengths of dry and wet samples respectively.

Proton Conductivity

The proton conductivity measurements were performed on SPAEENH membrane films by AC impedance spectroscopy over a frequency range of 1-$10^7$ Hz with oscillating voltage 50-500 mV, using a system based on a Solartron 1260 gain phase analyzer. Prior to the proton conductivity measurements, membranes were immersed in 98° C. water for 36 h to hydrate. To avoid excessive swelling, P-SPAEEN-H60 and D-SPAEENH-40 were pretreated in 80° C. water instead of 98° C. and other D-SPAEENH copolymers were only immersed in water at room temperature. A 20×10 mm membrane sample was clamped between two stainless steel electrodes in a temperature controlled cell open to the air by a pinhole where the sample was equilibrated at 100% RH at ambient atmospheric pressure. The proton conductivity (a) of the samples in the longitudinal direction was calculated from the impedance data, using the relationship σ=d/RS where d and S are the thickness and face area of the sample respectively and R was derived from the low intersect of the high frequency semi-circle on a complex impedance plane with the Re (Z) axis. The impedance data were corrected for the contribution from the empty and short circuited cell.

Results and Discussion

Synthesis and Characterization of SPAEEN Copolymers

Copolymers from two investigated sulfonated naphthalene-based bisphenols: 2,3-DHNS-6 and 2,7-DHNS-3,6 were denoted as P-SPAEEN and D-SPAEEN respectively, with the prefixes of P- and D meaning sulfonic acid groups located, pendant on a phenyl ring and di-substituted accordingly. The above results on m-SPAEENs are combined for comparison. SPAEEN copolymers were synthesized by copolymerization of 2,6-DFBN, one of the three sulfonated naphthalene-based bisphenols under typical polymerization reaction conditions as shown in Scheme 1. For these syntheses, the solvent selection is a key for high molecular weight. N-methyl-2-pyrrolidone (NMP) was initially used as solvent for polymerization, and all sulfonate content D-SPAEENs completely precipitated before high polymers were obtained. P-SPAEEN-20 and P-SPAEEN-30 were successfully prepared in NMP. However, high sulfonate containing P-SPAEENs were not obtained with molecular weights high enough for good quality membranes due to the precipitation of polymers from polymerization solutions which prevented the polymer chains from further propagation. DMSO was used instead for the polymerizations of the other copolymers and high molecular weights were obtained due to the improved dissolvability with DMSO for copolymers. However, long reaction time was required for polymerizations with high content of more sterically hindered 2,3-DHNS-6 as monomer. In contrast, D-SPAEEN copolymers were most easily to be obtained, which is attributed to its stretched structure. Nevertheless, 2,3-DHNS-6 based SPAEEN copolymers showed decreasing viscosities with increasing SC values and high molecular weight 2,8-DHNS-6 based SPAEEN copolymers are limited with SC values lower than 0.6 due to their angled structures, which made their polymer chains more entangled and more difficult to propagate. Properties of the resulting polymers such as theoretical equivalent weight per sulfonate group (EW), ion exchange capacity (IEC) of SPAEEN-X copolymers are summarized in Table 14 uted to C=C stretching and only slight differences appeared with the bands positions for different copolymers.

Figure 25:
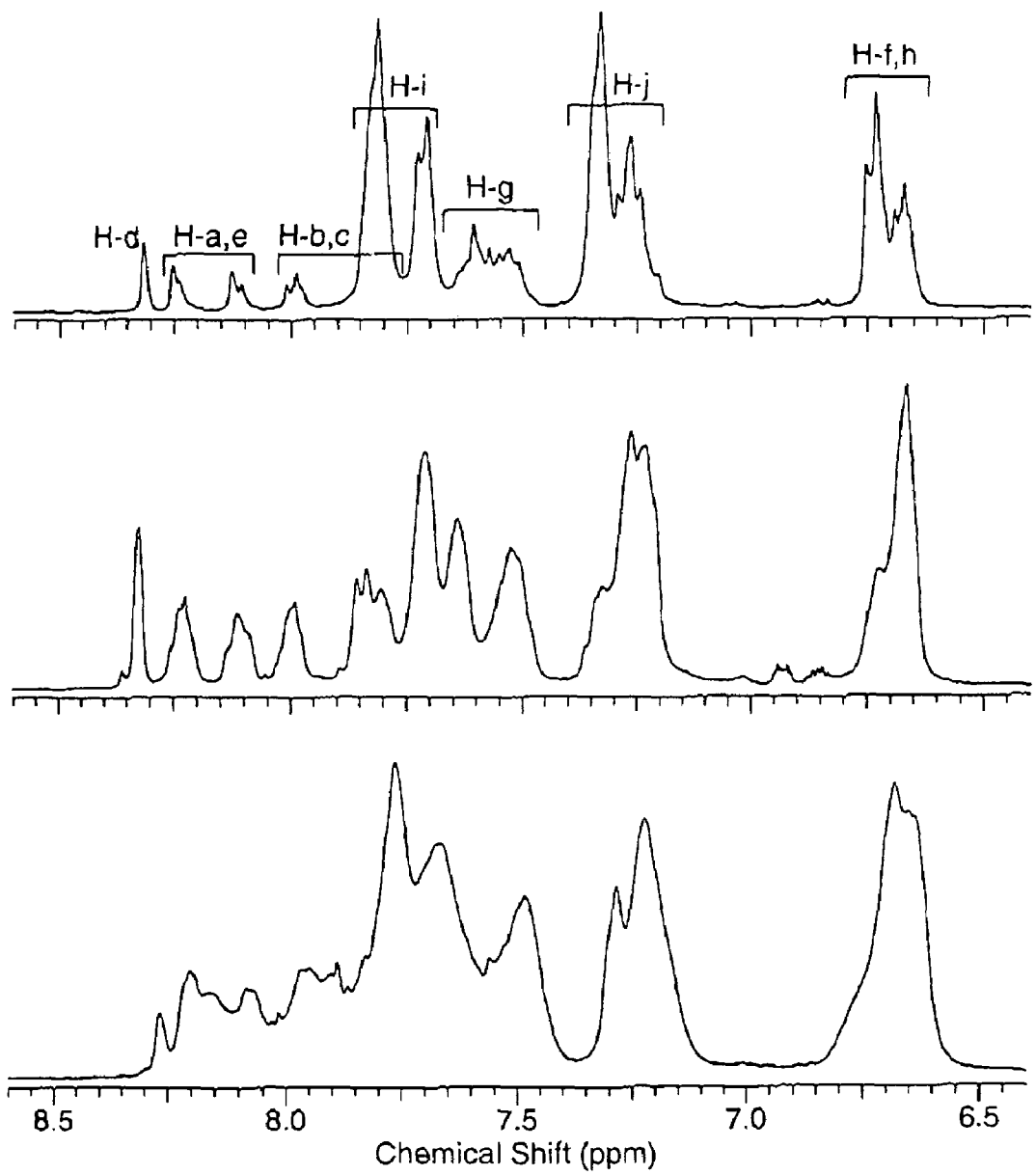
FIG. 25 illustrates $^1$H NMR spectrum of SPAEEN in DMSO-d$_6$

The structural properties of the synthesized polymers were also studied by liquid phase $^1$H NMR spectroscopy with DMSO-$d_6$ as the solvent and reference material. Take P-SPAEEN copolymers as an example. FIG. 25 shows three spectra of the aromatic protons for the sulfonated P-SPAEEN-20, 40 and 60 in sodium form. As expected, the spectra have some similarities with the SPAEEN spectra published before [51]; for example, the chemical shift for the benzonitrile and biphenol segments are nearly the same. The five proton signals from the naphthalene sulfonate group appear at high frequencies due to the deshielding ring current effect of the adjacent benzene rings (H-$_{a,b,d,e}$) and also due to the electron withdrawing sulfonate group (H-$_{c,d}$). Two-spin systems Hb-c, Hf-g, Hg-h and Hi-j were identified by 2D COSY. The $^1$H NMR spectra were used to corroborate SCs with the expected SCs from feed ratios by simple comparison of the intensities of the benzonitrile H-$_{f,h}$ (2.00H) with the H-$_j$ signals of the biphenol segment. As an example, the intensity of H-$_j$ signal for P-SPAEEN-60 was 1.71H for the four H-$_j$ protons resulting in 0.42 biphenol unit hence 0.58 naphtha-

TABLE 14

Syntheses of SPAEEN copolymers

| Polymer | 4,4'-BP mmol | 2,6-DFBN mmol | sulfonated biphenol Mmol | [η]$^a$ dL/g | EW (IEC) expected g/mol SO$_3$ (Meq g$^{-1}$) | SC expected | SC from $^1$H-NMR data |
|---|---|---|---|---|---|---|---|
| PAEEN-0 | 5 | 5 | 0 | — | — | 0 | 0 |
| m-SPAEEN-20 | 8 | 10 | 2 | 0.85$^b$ | 1480 (0.68) | 0.2 | 0.19 |
| m-SPAEEN-30 | 7 | 10 | 3 | 1.0$^b$ | 1005 (1.0) | 0.3 | 0.29 |
| m-SPAEEN-40 | 6 | 10 | 4 | 0.62$^b$ | 767 (1.3) | 0.4 | 0.38 |
| m-SPAEEN-50 | 5 | 10 | 5 | 0.9$^b$ | 625 (1.6) | 0.5 | 0.50 |
| m-SPAEEN-60 | 4 | 10 | 6 | 0.82$^b$ | 530 (1.9) | 0.6 | 0.57 |
| P-SPAEEN-20 | 8 | 10 | 2 | 2.3 | 1480 (0.68) | 0.2 | |
| P-SPAEEN-30 | 7 | 10 | 3 | 1.9 | 1005 (1.0) | 0.3 | |
| P-SPAEEN-40 | 6 | 10 | 4 | 1.3 | 767 (1.3) | 0.4 | |
| P-SPAEEN-50 | 5 | 10 | 5 | 1.9 | 625 (1.6) | 0.5 | |
| P-SPAEEN-60 | 4 | 10 | 6 | 1.6 | 530 (1.9) | 0.6 | 0.58 |
| P-SPAEEN-70 | 3 | 10 | 7 | 1.5 | 462 (2.2) | 0.7 | |
| P-SPAEEN-80 | 2 | 10 | 8 | 0.87 | 411 (2.4) | 0.8 | |
| D-SPAEEN-10 | 9 | 10 | 1 | — | 1492 (0.67) | 0.2 | — |
| D-SPAEEN-20 | 8 | 10 | 2 | 2.5 | 780 (1.3) | 0.4 | |
| D-SPAEEN-30 | 7 | 10 | 3 | 1.4 | 542 (1.8) | 0.6 | |
| D-SPAEEN-40 | 6 | 10 | 4 | 1.5 | 423 (2.4) | 0.8 | |
| D-SPAEEN-50 | 5 | 10 | 5 | 2.1 | 352 (2.8) | 1.0 | |
| D-SPAEEN-60 | 4 | 10 | 6 | 2.0 | 305 (3.3) | 1.2 | |

$^a$Measured at 30° C. in DMAc.
$^b$Measured at 25° C. in DMAc.

P-SPAEEN-20 to P-SPAEEN-60 have good solubility in DMAc, NMP, DMSO and N,N-dimethylformamide (DMF) and could readily be cast into membrane films.

Figure 24A:
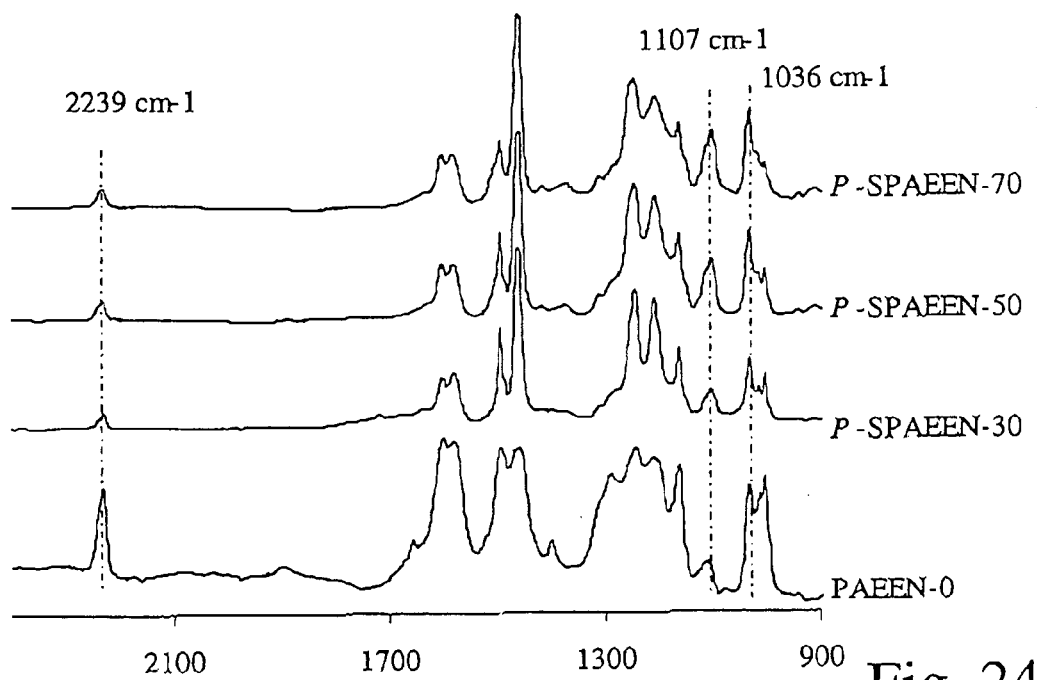
FIG. 24 illustrates FT-IR spectra of SPAEEN copolymers
Figure 24B:
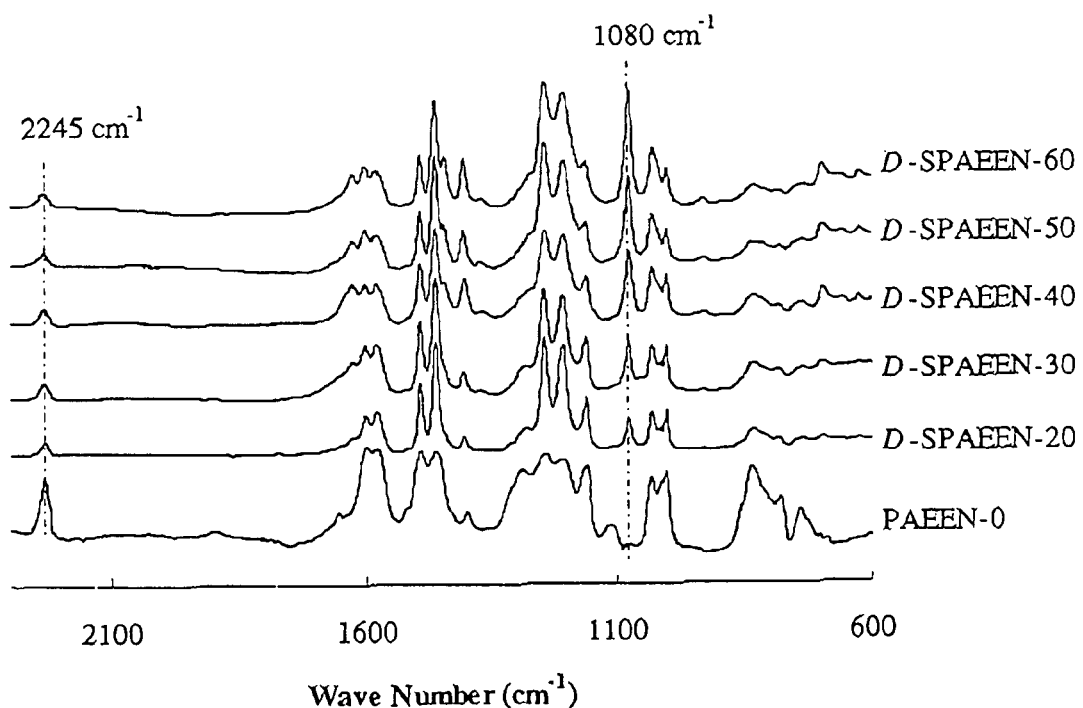

The chemical structures of SPAEEN copolymers were characterized by FT-IR and $^1$H NMR. In FT-IR spectra of P-SPAEEN and D-SPAEEN copolymers (FIG. 24), characteristic bands of the aromatic sulfonate salt are observed at 1036 and 1107 cm$^{-1}$ for P-SPAEEN copolymers and 1080 cm$^{-1}$ for D-SPAEEN copolymers and the intensity of these characteristic absorption bands increase with SC. The characteristic stretching band of nitrile groups was observed at 2239 cm for P-SPAEEN copolymers and 2245 cm$^{-1}$ for D-SPAEEN copolymers. The absorption bands at around 1211 and 1254 cm$^{-1}$ are assigned to phenoxy groups. The absorption bands at 1463 and 1495 cm$^{-1}$ were assigned to phenyl ring and the bands at 1589 and 1604 cm$^{-1}$ are attriblene sulfonate. $^1$H NMR confirmed that SC values are in the reasonable scale of expected values.

Figure 26A:
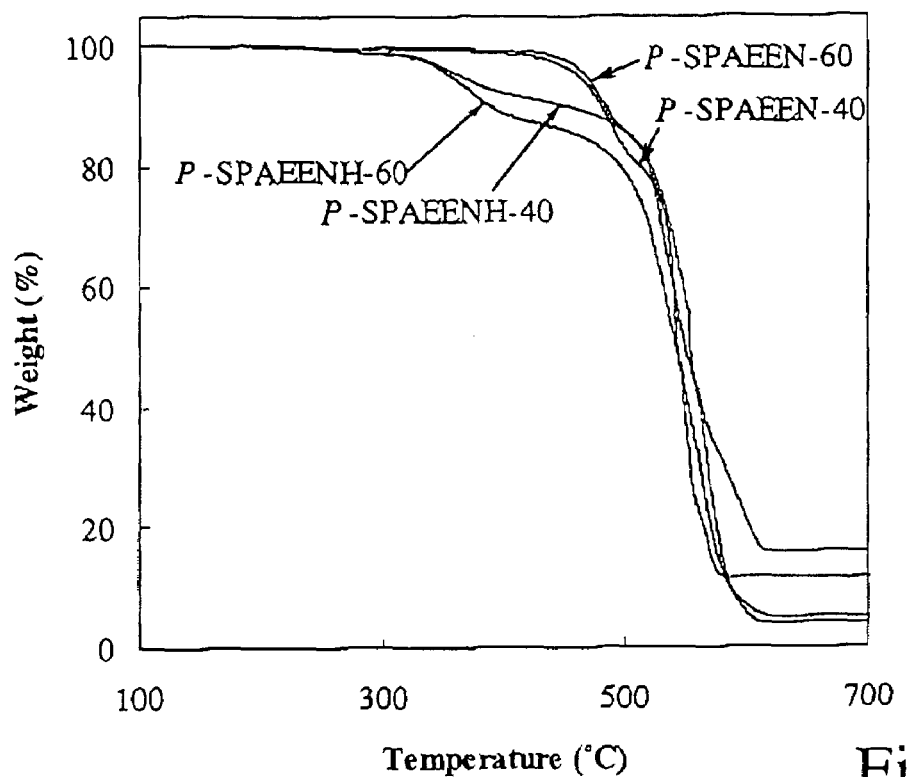
FIG. 26 illustrates TGA traces of SPAEEN copolymers in air
Figure 26B:
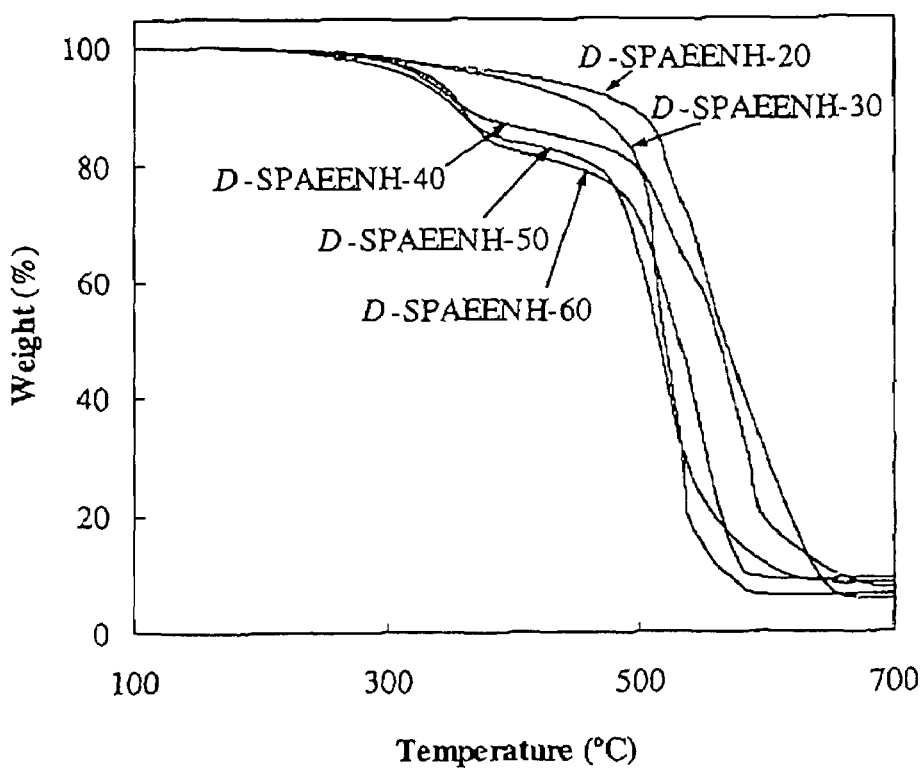
Figure 27A:
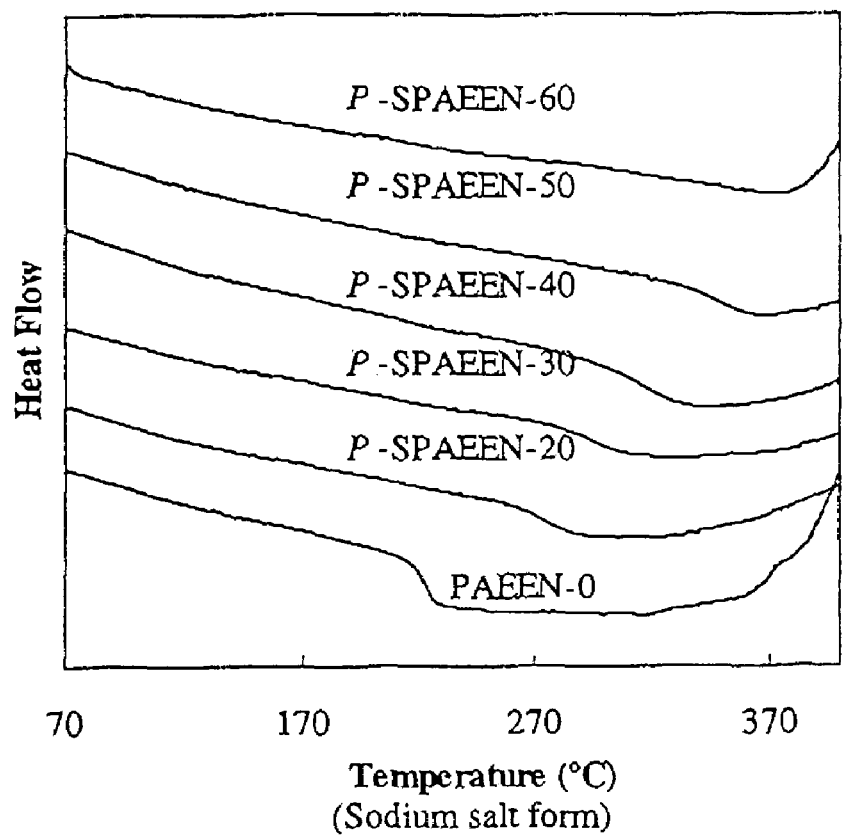
FIG. 27 illustrates DSC curves of P-SPAEEN copolymers
Figure 27B:
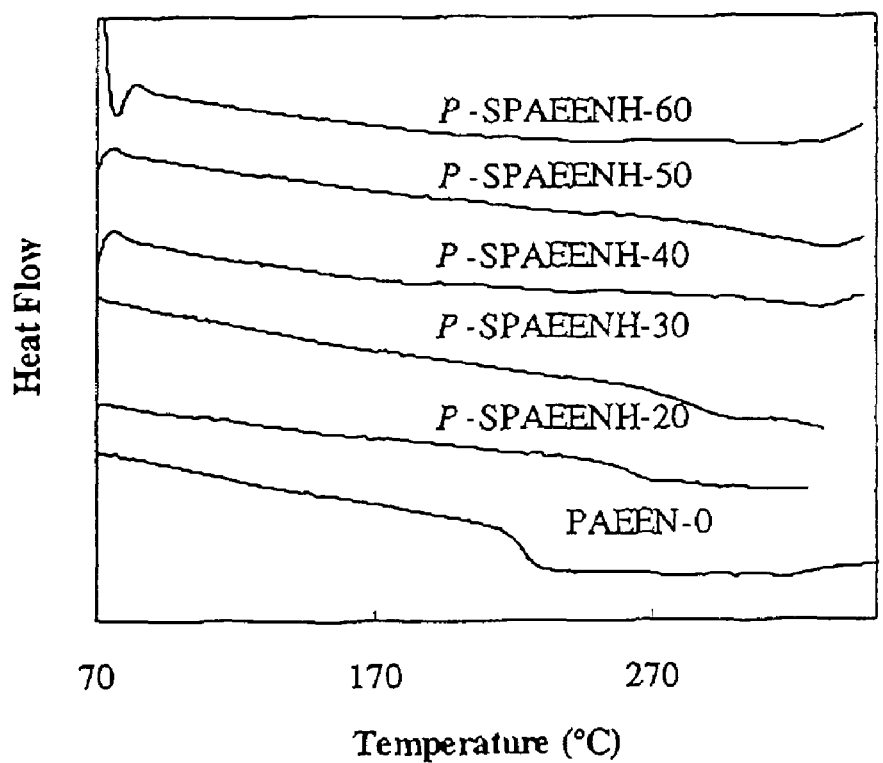
Figure 28A:
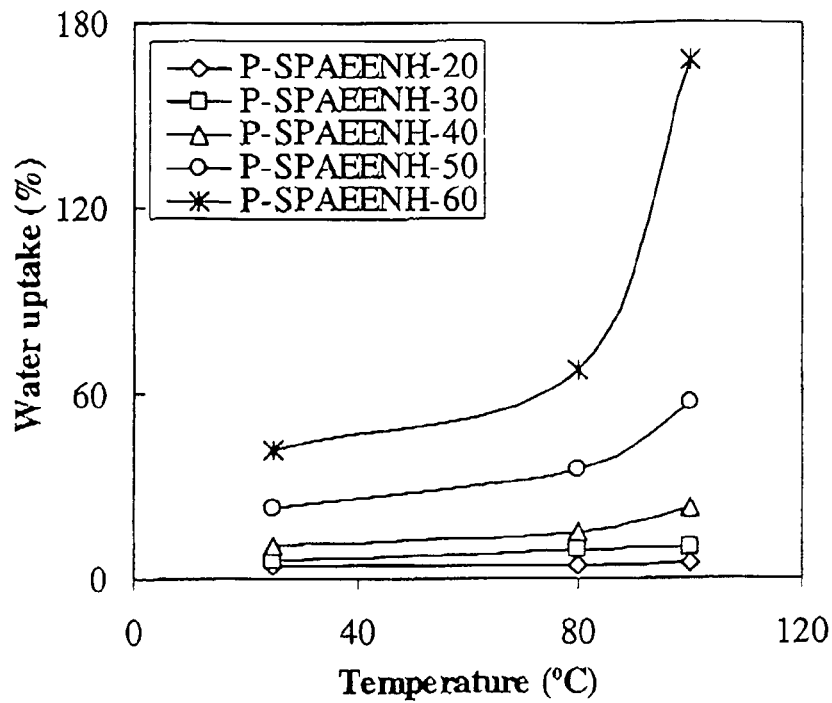
FIG. 28 illustrates water uptake and swelling of SPAEENH copolymers
Figure 28B:
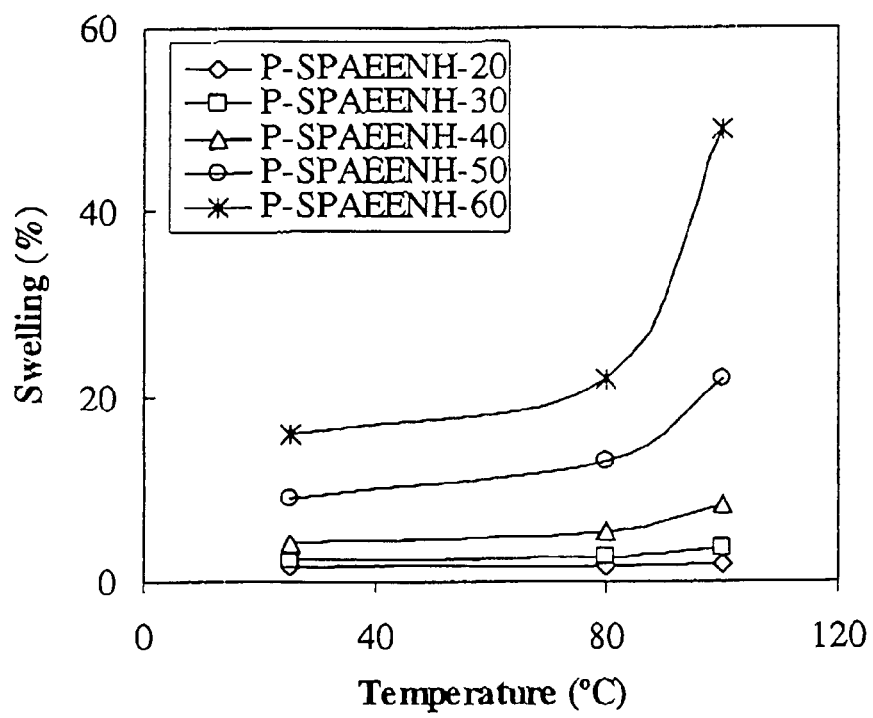
Figure 28C:
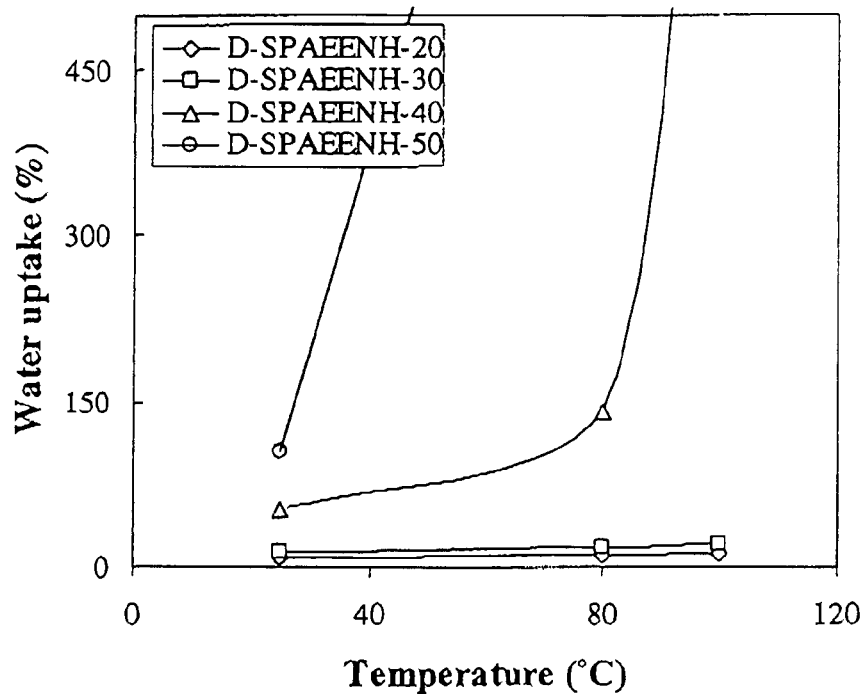
Figure 28D:
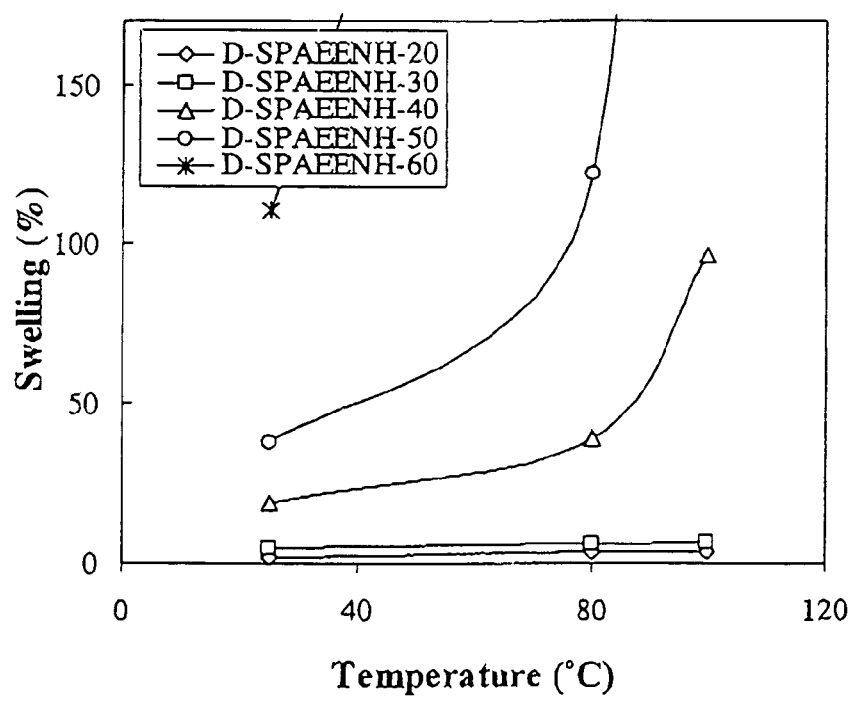

Thermal properties including glass transition temperatures (T$_g$s) and thermal decomposition temperatures in the air (T$_d$s) of SPAEEN copolymers were investigated by TGA and DSC analyses and illustrated in FIGS. 26 and 27 respectively. Similar to m-SPAEEN copolymers, P-SPAEEN and D-SPAEEN copolymers showed high thermal stabilities. Sodium form copolymers lost weight at around 430° C. due to the degradation of polymer main chain, and acid form copolymers showed earlier weight loss at around 264-470° C. differently depending on the sulfonic acid content due to the cleavage of —SO$_3$H. All SPAEEN copolymers show sufficient thermo-oxidative stabilities since PEMs are mainly used in air at about 100° C. For DSC measurements, copolymers in both sodium and acid forms were initially heated at a 10°

C./min rate to about 10° C. below their decomposition temperatures based on TGA curves. After cooling, they were reheated at a heating rate of 10° C./min to their decomposition temperatures, and the data from the second scan were reported for $T_g$s. FIG. 27 shows that $T_g$s of P-SPAEEN copolymers increase with SC values in both sodium and acid forms. Sodium form copolymers have higher $T_g$s than their corresponding acid forms. In addition, the glass transitions become less sensitive to DSC detection with the increase in SC values and the $T_g$s of P-SPAEEN-60 were not detected in both sodium and acid forms. $T_g$s of D-SPAEEN were not as sensitive to DSC detection as those of m-SPAEEN and D-SPAEEN copolymers. Table 15 summarizes the observed $T_{d5\%}$, onset weight loss temperatures ($T_d$) data and $T_g$s of SPAEEN copolymers.

TABLE 15

Thermal properties of SPAEEN copolymers

| Polymer | $T_g$ (° C.) Na form | $T_g$ (° C.) Acid form | $T_{d5\%}$ (° C.) Na form | $T_{d5\%}$ (° C.) Acid form | $T_d$ (° C.) extrapolated onset for first weight loss Na form | $T_d$ (° C.) extrapolated onset for first weight loss Acid form |
|---|---|---|---|---|---|---|
| PAEEN-0 | 224 | | | — | | — |
| m-SPAEEN-20 | 233 | 230 | 477 | 390 | 521 | 264 |
| m-SPAEEN-30 | 261 | 244 | 468 | 361 | 504 | 290 |
| m-SPAEEN-40 | 310 | 247 | 449 | 352 | 491 | 290 |
| m-SPAEEN-50 | 313 | 260ª | 467 | 341 | 489 | 297 |
| m-SPAEEN-60 | 336 | — | 463 | 344 | 512 | 310 |
| P-SPAEEN-20 | 274 | 261 | 461 | 472 | 486 | 345 |
| P-SPAEEN-30 | 296 | 285 | 432 | 363 | 456 | 327 |
| P-SPAEEN-40 | 317 | 311 | 469 | 365 | 462 | 328 |
| P-SPAEEN-50 | 349 | 324 | 471 | 363 | 459 | 332 |
| P-SPAEEN-60 | ND | ND | 468 | 356 | 452 | 323 |
| D-SPAEEN-20 | 228 | ND | — | 370 | — | 415 |
| D-SPAEEN-30 | 224 | ND | — | 330 | — | 386 |
| D-SPAEEN-40 | ND | ND | — | 301 | — | 328 |
| D-SPAEEN-50 | ND | ND | — | 320 | — | 305 |
| D-SPAEEN-60 | ND | ND | — | 335 | — | 331 |

ND: not detected
—: Not measured.

This table shows that their $T_g$s vary from 224 to 349° C. in sodium form and from 224 to 385° C. in acid form. Since some acid form copolymers, such as P-SPAEENH-50, were observed with $T_g$s around their decomposition temperature, the reported value are only an approximation. In addition, it is noteworthy that D-SPAEEN was detected with $T_m$ at 362° C. for the first scan, close to the $T_m$ of 366° C. for unsulfonated PAEEN in its first scan. The combination of $T_g$s and $T_d$ values leads us to conclude that all P-SPAEENH copolymers have good thermal stabilities for PEM usages.

Properties of Membranes

In PEMPCs and DMFCs, PEMs are prepared into membrane electrode assemblies (MEA)s and serve as separators for the reactants, catalysts support and provide the required ionic pathway between the anode and the cathode. Therefore, their properties such as mechanical properties and thermal stability, water management, proton conductivity and adhesive ability to catalyst and other additives are crucial for the fuel cell performance. The thermal stabilities have been described above. The introduction of highly polar nitrile has been anticipated to promote adhesion of the polymers to many substrates via interaction with other polar chemical groups such as those of acid fillers in composite membranes or catalyst layer of MEA. Our ongoing work on MEA has confirmed that catalyst layer adheres well to the SPAEENH copolymers, supporting the claims that nitrites facilitate catalyst layer binding through polar interactions.

As disclosed above, m-SPAEEN based films with SC up to 0.6 maintained good shapes and mechanical strengths in both dry and fully hydrated states. P-SPAEEN-20 and P-SPAEEN-30 were cast into flexible films. P-SPAEEN-40 and P-SPAEEN-50 were cast into robust films. The film of P-SPAEEN-60 was fragile and P-SPAEEN-70 was brittle when completely dehydrated. The change in strength appearances of membrane films may be related to both the contents of entangled ortho-biphenol and molecular weights of polymers. However, all hydrated films of P-SPAEENs with sulfonate contents up to 60% are tough enough. All D-SPAEEN copolymers with SC up to 0.6 are tough and flexible at dry states and high sulfonic acid containing D-SPAEEN copolymers swelled too much, or even dissolved in water especially at elevated temperatures and lost their mechanical properties.

Researchers in McGrath's group found[25] that bisphenols have a marked influence on water uptake of prepared sulfonated poly(aryl ether sulfone)s and attributed it to the hydrophobicities of bisphenols. In this investigation, bifluorobenzonitrile and 4,4'-biphenol form the hydrophobic part and with exactly the same structure in all SPAEEN copolymers. As the hydrophilic part, three bisphenol monomers all have naphthalene skeleton and sulfonate group and their derivative SPAEEN copolymers only differ from each other in the linkage and sulfonate positions, thus they can be considered as large isomers. Thus the difference in water management has to be re-explained. FIG. 28 shows that after 24 h immersion in water, P-SPAEENH copolymers absorbed water in the range of 4.0% to 168% and increased their lengths by 1.6% to 49% depending on the 2,3-DHNS-6 content and temperature and D-SPAEENH copolymers absorbed water higher than 8.8% and increased their lengths by 2% till to dissolved in hot water. Their comparison along with 2,8-DHNS-6 based m-SPAEENH copolymers on water uptake and swelling was listed in Table 16.

TABLE 16

Comparisons on swelling and conductivity of different polymers

| Polymer | EW expected g/mol SO$_3$ | Room temperature Swelling ratio (%) | Room temperature Conductivity (S/cm) | 80° C. Swelling ratio (%) | 80° C. Conductivity (S/cm) | 100° C. Swelling ratio (%) | 100° C. Conductivity (S/cm) |
|---|---|---|---|---|---|---|---|
| m-SPAEENH-50 | 625 | 6.2 | $3.5 \times 10^{-2}$ | 10 | $6.4 \times 10^{-2}$ | 12 | $7.8 \times 10^{-2}$ |
| m-SPAEENH-60 | 530 | 7.5 | $8.3 \times 10^{-2}$ | 15 | $1.4 \times 10^{-1}$ | 24 | $1.5 \times 10^{-1}$ |
| P-SPAEENH-50 | 625 | 9.1 | $3.9 \times 10^{-2}$ | 13 | $8.8 \times 10^{-2}$ | 22 | $1.3 \times 10^{-1}$ |
| P-SPAEEN-H60 | 530 | 16 | $7.9 \times 10^{-2}$ | 22 | $1.5 \times 10^{-1}$ | 49 | $2.0 \times 10^{-1}$ |
| D-SPAEENH-30 | 542 | 4.9 | $1.5 \times 10^{-2}$ | 6.1 | $2.9 \times 10^{-2}$ | 6.8 | $3.7 \times 10^{-2}$ |

TABLE 16-continued

Comparisons on swelling and conductivity of different polymers

| Polymer | EW expected g/mol SO$_3$ | Room temperature Swelling ratio (%) | Room temperature Conductivity (S/cm) | 80° C. Swelling ratio (%) | 80° C. Conductivity (S/cm) | 100° C. Swelling ratio (%) | 100° C. Conductivity (S/cm) |
|---|---|---|---|---|---|---|---|
| D-SPAEENH-40 | 423 | 19 | $8.0 \times 10^{-2}$ | 39 | $1.5 \times 10^{-1}$ | 96 | $1.8 \times 10^{-1}$ |
| SPAEEKKH-100[21] | 575 | 18 | — | Excessively swollen | — | dissolved | — |
| Nafion 117 | 1100 | 13 | $7.5 \times 10^{-2}$ | 20 | $9.6 \times 10^{-2}$ | — | $1.6 \times 10^{-1}$ |

Figure 29:
FIG. 29 illustrates molecular models of SPAEENH copolymers obtained from ACD/ChemSketch
Figure 29:
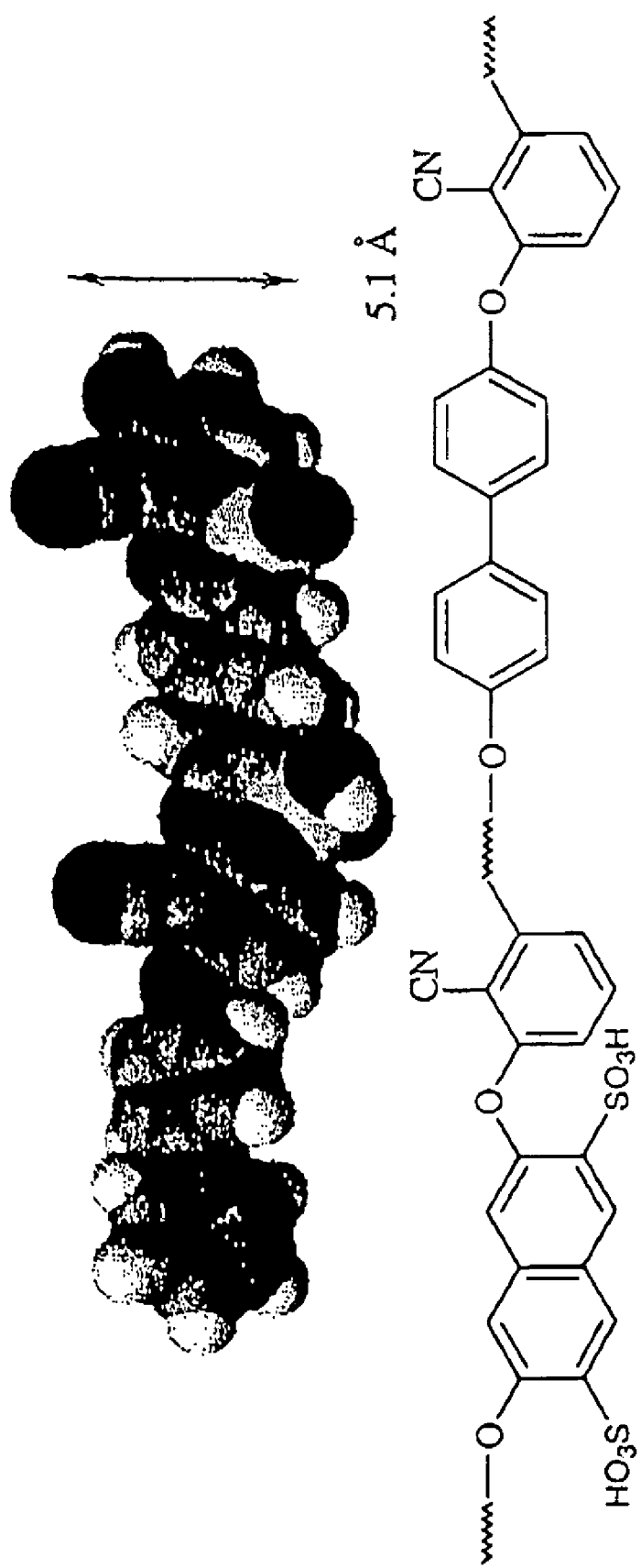

From Table 16, it can be seen that P-SPAEENH copolymers show slightly higher water uptakes and swellings than M-SPAEENH copolymers at the same EW values, especially at high sulfonic acid content. Since D-SPAEENH copolymers have slight higher EW values than corresponding m-SPAEENH and P-SPAEENH copolymers with same SC values. Their comparisons are not directly. However, it still can be seen that D-SPAEENH copolymers have the lowest water uptake and swelling ratios among the three kinds of SPAEENHs at similar EW values. Compared with m-SPAEENH copolymers, comb-like branched naphthalene-sulfonic acid segment in P-SPAEENH copolymers show a kinetic diameter of 9.1 Å (FIG. 29) estimated by ACD/ChemSketch calculation, bigger than the value of 6.0 Å of angled naphthalene-sulfonic acid segment in m-SPAEENH. So, P-SPAEENH copolymers have larger interchain spaces for water molecules in hydrophilic domains in the membranes and absorbed more water than m-SPAEENH copolymers at the same EW values. Among the three SPAEENH copolymers, D-SPAEENHs are most stretching and naphthalene-sulfonic acid segment has the smallest kinetic diameter of 5.1 Å. Thus, D-SPAEENH copolymers have the smallest interchain spaces and smallest free volume for water molecules and therefore show lowest water uptakes and swellings. The P-SPAEENH copolymers with SC values up to 0.5 swelled less than 25% and are dimensionally stable enough up to 100° C. and with SC values up to 0.6 they are dimensionally stable up to 80° C.; D-SPAEENH-30 is dimensional stable up to 100° C. and D-SPAEENH-40 swelled too much at 80° C.

Compared with our previously prepared sulfonic acid-containing poly(aryl ether ether ketone ketone)s (SPAEEKKH) based on 2,3-DHNS-6 (Table 16), P-SPAEENH show much lower water uptakes and considerably improved dimensional stabilities. SPAEEKKH (EW 575 g/molSO$_3$) excessively swelled at 80° C. and dissolved in 100° C. hot water, however, P-SPAEEN-H60 (EW 530 g/molSO$_3$) only showed water uptake of 68% and 168% and swelling of 22% and 49% at 80 and 100° C. respectively. These phenomena are explained by taking the molecular structures of the different polymers into account. Compared with ketone structures in SPAEEKKH polymer main chain, nitrile groups have stronger polarity, and are pendant on aromatic rings of P-SPAEENH copolymers; they enhance the intermolecular interaction of P-SPAEENH copolymers and enhance the hydrophobic network structure, consequently enhancing the dimensional stability of the membrane films. TEM was tried to be used to characterize the percolating network structures and explain the behaviors of membrane films, according to reference articles[25, 26], with their electro aggregation of different chain segments and phase separation, which forms ionic pathways. Unfortunately, film samples under TEM were fully dehydrated and not ionic channels were observed.

Figure 30A:
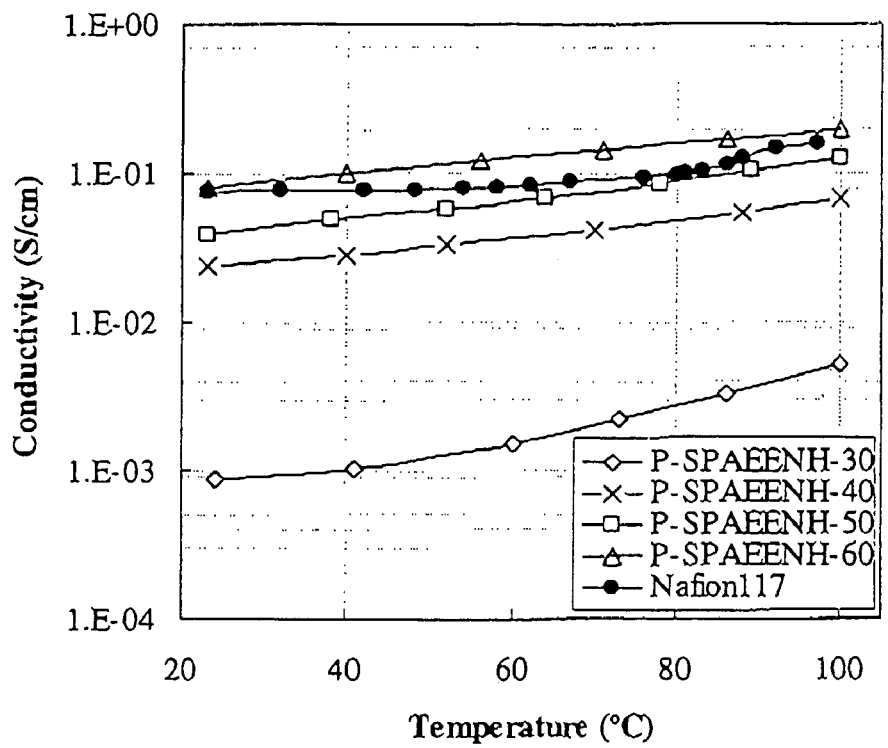
FIG. 30 illustrates proton conductivity of SPAEENH copolymers
Figure 30B:
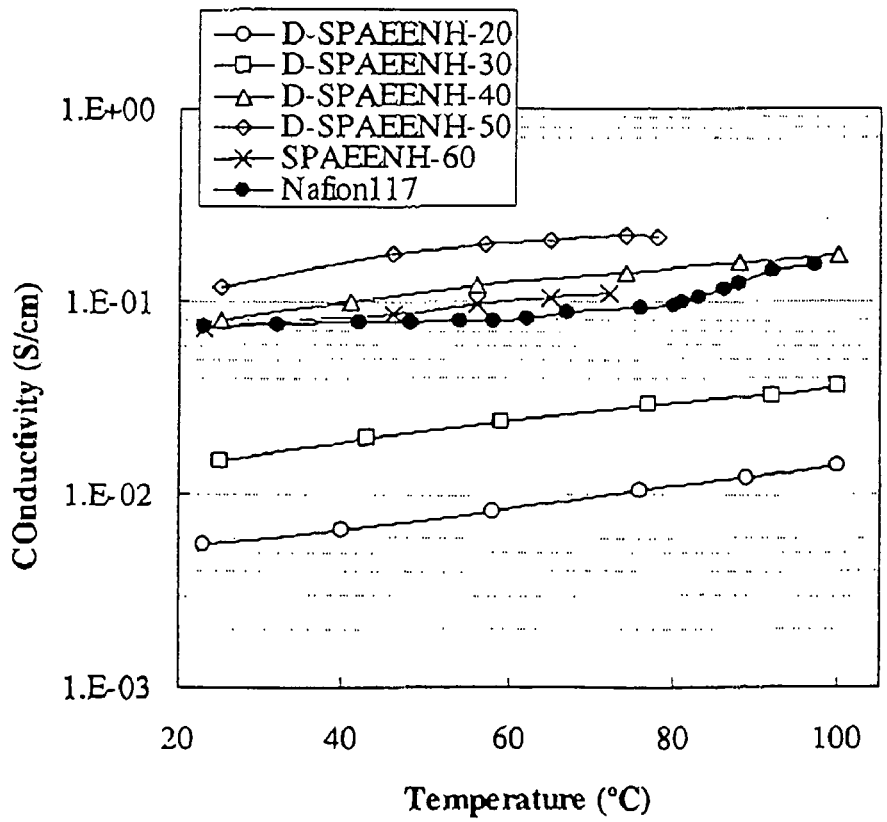

The temperature dependence of proton conductivity of P-SPAEENH and D-SPAEENH copolymers together with Nafion 117 for comparison is plotted in FIG. 30. It shows that the proton conductivities of P-SPAEENH copolymers increase with both SC and temperature and P-SPAEENH copolymers with SC values of 0.4 to 0.6 all show proton conductivities higher than $10^{-2}$ S/cm from room temperature to 100° C., a lowest value of practical interest for use as PEMs in fuel cells. P-SPAEENH-50 and P-SPAEENH-60 show high proton conductivities comparable to Nafion117, ranging from $3.9 \times 10^{-2}$ to $2.0 \times 10^{-1}$ S/cm at similar water uptake and swellings. D-SPAEENH copolymers show increase in proton conductivities with both temperature and SC, and for SC of 1.2, proton conductivities decrease again due to its excessive swelling. D-SPAEENH-30 and with much higher SC values show proton conductivities higher than 1.2 S/cm. Comparisons on swellings and proton conductivities of SPAEENH copolymers are listed Table 16. It can be seen that P-SPAEENH films normally show somewhat higher proton conductivities than corresponding m-SPAEENH films at the same SC values and same temperatures, in accordance with their higher water uptake and swellings; and their increase in proton conductivity with SC and temperature is parallel to their swelling. As aforementioned, it is the result of their different kinetic diameters. However, although D-SPAEENHs have small kinetic diameters, the films show smaller increase in proton conductivities with their swellings than m-SPAEENHs and P-SPAEENHs. It may be the effect result of ether linkage in polymer chains on sulfonic acid groups. In m-SPAEENH and P-SPAEENH polymer chains, sulfonic acid groups are located on meta position to ether linkage or on a different benzene ring from ether linkage and are less deactivated by electro-donating ether group. However, in D-SPAEENH polymer chain, sulfonic acid are located ortho to ether linkage and deactivated. Proton conductivity depends on the concentration of protons in membrane, their ability to dissociate and their speed of diffusion. Thus, for similar sulfonic acid concentration membranes at a determined temperature, the different dissociation abilities of sulfonic acid and diffusion of protons will result in their different conductivities. In D-SPAEENH, although more water is absorbed, their ether-deactivated sulfonic acid groups are more difficult to dissociate and hold water more tenaciously and lower the overall transport rates of protons. As a result, the proton conductivities are lowered. In addition, different distribution of sulfonic acid groups in polymer chains may also contribute to their different conductivities

CONCLUSION

Three series of naphthalene-based copoly(aryl ether ether nitrile)s containing sulfonic acid groups have been successfully prepared from commercially available monomers via one-step polycondensation reactions. They were solvent-cast into dry membranes, which are from flexible, robust to fragile. All SPAEENH copolymers have good thermal stabilities with decomposition temperatures higher than 264° C. and $T_g$s higher than 224° C. P-SPAEENH and m-SPAEENH films show lower water uptakes and swellings but more obvious increase in proton conductivities with water content than D-SPAEENH films. P-SPAEENH films show somewhat higher swelling and proton conductivities than m-SPAEENH films due to their increased intermolecular distance. The meta linkage or iso-ring connection of sulfonic acid groups to ether linkage makes them less deactivated in sulfonic acids and lead to higher proton conductivities of P-SPAEENH and m-SPAEENH films than D-SPAEENH films. P-SPAEENH and m-SPAEENH films show proton conductivities close to or higher than those of Nafion 117 at similar water uptake and swelling values. The combination of inexpensive monomers, high thermal stability, low dimensional swelling, and high proton conductivity makes m-SPAEENH-50, m-SPAEENH-60, P-SPAEENH-50 and P-SPAEEN-60 attractive as PEM materials for fuel cells applications up to 100° C. or 80° C. respectively.

EXAMPLE

Figure 31:
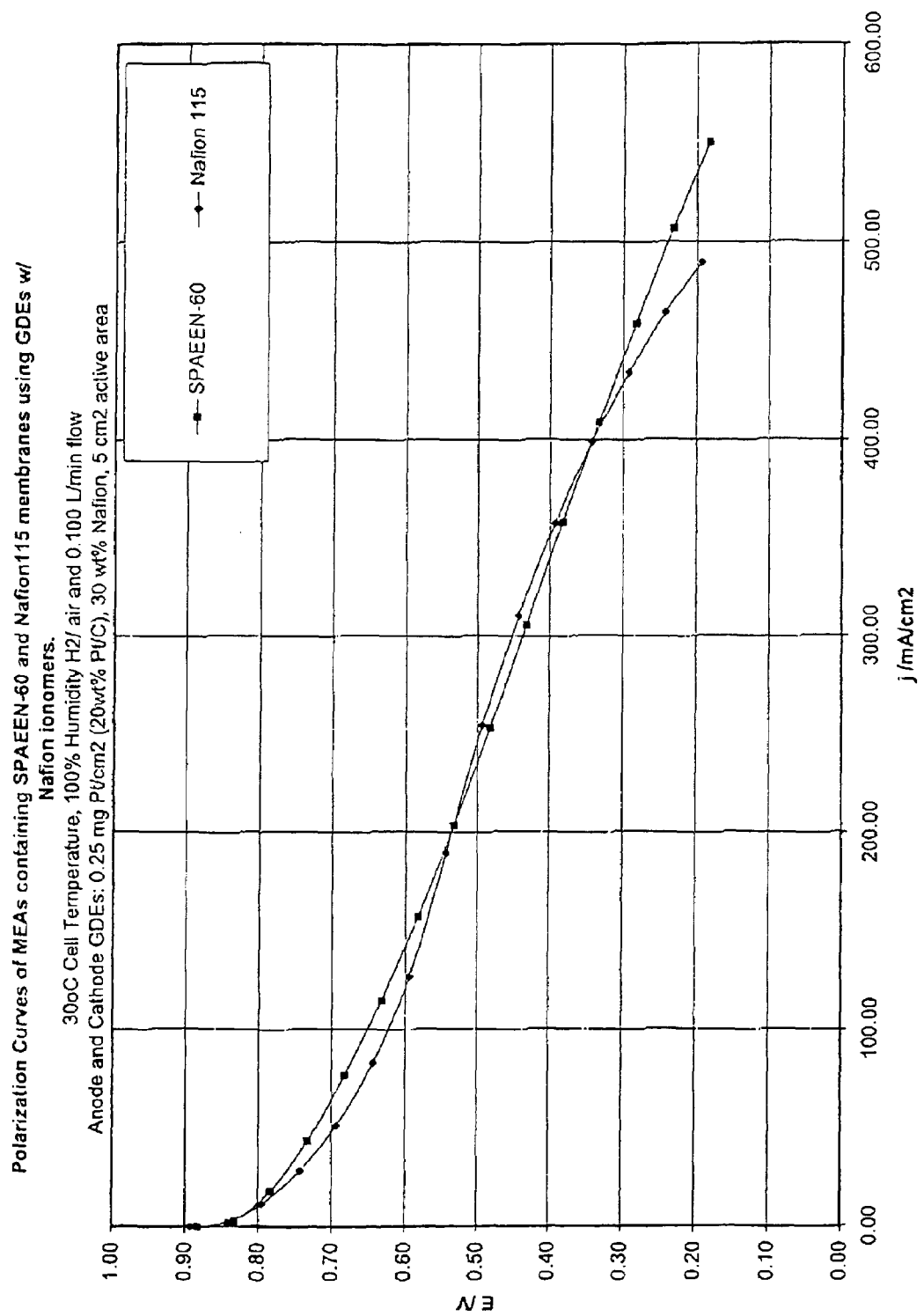
FIG. 31 illustrates the polarization curves of MEAs containing SPAEEN-60 and Nafion 115 membranes using GDEs/Nafion onomers.

Test of MEA containing SPAEEN-60, compared to Nafion 115 membranes using GDEs w/Nafion ionomers, at 30° C. cell temperature, 100% humidity H2/air and 0.100 L/min flow, with anode and cathode GDEs: 0.25 mg Pt/cm$^2$(20 wt % Pt/C), 30 wt % Nafion, 5 cm$^2$ active area. A graph of the results is shown in FIG. 31.

REFERENCES

[1] Roziere, J.; Jones, D. J. *Annu. Rev. Mater. Res.* 2003, 33, 503-55.
[2] Mecerreyes, D.; Grande, H.; Miguel, O.; Ochoteco, E.; Marcilla, R.; Cantero, I. *Chem. Mater.* 2004, 16, 604-607.
[3] Yang, Y.; Shi, Z.; Holdcroft, S. *Macromolecules* 2004, 37, 1678-1681.
[4] Wang, I.; Meng, Y. Z.; Wang, S. J.; Shang, X. Y.; Li, L.; Hay, A. S. *Macromolecules* 2004, 37, 3151-3158.
[5] Ueda, M.; Toyota, H.; Ouchi, T.; Sugiyama, J.; Yonetake, K.; Masuko, T.; Teramoto, T. *J. Polym. Sci., Part A: Polym. Chem. Ed.* 1993, 31, 853-858.
[6] Genies, C.; Mercier, R.; Sillion, B.; Comet, N.; Gebel, G.; Pineri, M. *Polymer* 2001, 42, 359-373.
[7] Miyatake, K.; Hay, A. S.; *J. Polym. Sci., Part A: Polym. Chem. Ed.* 2001, 39, 3211-3217.
[8] Wang, F.; Hickner, M.; Kim, Y. S.; Zawodzinski, T. A.; McGrath, J. E. *J. Membrane Sci.* 2002, 197, 231-242.
[9] Faure, S.; Comet, N.; Gebel, G.; Mercier, R.; Pineri, M.; Sillion, B.; in Proceedings of the Second International Symposium on New Materials for Fuel Cell and Modern Battery Systems, (Savadogo, O.; Roberge, P. R. eds.), Montreal, Canada, 1997, July 6-10, p. 818.
[10] Nolte, R.; Ledjeff, K.; Bauer, M.; Mülhaupt, R. *J. Membrane Sci.* 1993, 83, 211-220.
[11] Kobayashi, T.; Rikukawa, M.; Sanui, K.; Ogata, N. *Solid Stare Ionics* 1998, 106, 219-225.
[12] Glipa, X.; Haddad, M. E.; Jones, D. J.; Roziere, J. *Solid State Ionics* 1997, 97, 323-331.
[13] Kerres, J.; Cui, W.; Reichle, S. *J. Polym. Sci., Part A: Polym. Chem. Ed* 1996, 34, 2421-2438.
[14] Soczka-Guth, T.; Baurneister, J.; Frank, G.; Knauf, R. International Patent WO 1999, 99/29763.
[15] Kim, Y. S.; Dong, L.; Hickner, M. A.; McGrath, J. E. *Macromolecules* 2003, 36, 6281.
[16] Harrison, W. L.; Wang, F.; Mecham, J. B.; Bhanu, V. A.; Hill, M.; Kim, Y. S.; McGrath, J. E. *J. Polym. Sci. Part A: Polym. Chem.* 2003, 41, 2264.
[17] Gao, Y.; Robertson, G. P.; Guiver, M. D.; Jian, X. *J. Polym. Sci. Part A: Polym. Chem.* 2003, 41, 497.
[18] Gao, Y.; Robertson, G. P.; Guiver, M. D.; Jian, X.; Mikhailenko, S. D.; Wang, K.; Kaliaguine, S. *J. Polym. Sci. Part A: Polym. Chem.* 2003, 41, 2731.
[19] Gao, Y.; Robertson, G. P.; Guiver, M. D.; Jian, X.; Mikhailenko, S. D.; Wang, K.; Kaliaguine, S. *J. Membrane Sci.* 2003, 227, 39.
[20] Xiao, G.; Sun, G.; Yan, D.; Zhu, P.; Tao, P. *Polymer* 2002, 43, 5335.
[21] Xiao, G.; Sun, G.; Yan, D. *Macromol. Rapid Commun.* 2002, 23, 488.
[22] Gao, Y.; Robertson, G. P.; Guiver, M. D.; Mikhailenko, S. D.; Li, X; Kaliaguine, S. *Macromolecules* 2004, 37, 6748
[23] Xing, P; Robertson, Robertson, G. P.; Guiver, M. D.; Mikhailenko, S. D.; Kaliaguine, S. *Macromolecules* 2004, 37, 7960
[24] Cotter, R. J. Engineering Plastics: Handbook of Polyarylethers; Gordon and Breach Science Publishers S.A., Basel Switzerland, 1995.
[25] Wang, S.; McGrath, J. In Synthetic Methods in Step-Growth Polymers; Rogers, M. E.; Long, T. E. (Eds.); Hoboken, N.J. Wiley, 2003; Chapter 6.
[26] Kricheldorf, H. R.; Meier, J.; Schwarz, G. *Macromol. Chem., Rapid Commun.* 1987, 8, 529.
[27] Kricheldorf, H. R.; Berghahn, M. *Macromol. Chem., Rapid Commun.* 1991, 12, 529.
[28] Kricheldorf, H. R.; Garaleh, M.; Schwarz, G. *J. Polym. Sci. Part A: Polym. Chem.* 2003, 41, 3838.
[29] Mohanty, D. K.; Walstrom, A. M.; Ward, T. C.; McGrath, J. E. *Polym. Prepr.* 1986, 27, 147.
[30] Mohanty, D. K.; Hedrick, J. L.; Gobetz, K.; Johnson, B. C.; Yilgor, I.; Yilgor, E.; Yang, R.; McGrath, J. E. *Polym. Prepr.* 1982, 23, 284.
[31] Blinne, G.; Bender, H.; Neumann, P. 1986, U.S. Pat. No. 4,567,248.
[32] Hoehn, H. H.; Richter, J. W. 1975, U.S. Pat. No. 3,899, 309.
[33] Heath, D. R.; Wirth, J. G. 1973, U.S. Pat. No. 3,730,946.
[34] Murakami, T. 1990, U.S. Pat. No. 4,972,016.
[35] Krizan, T. D. 1992, U.S. Pat. No. 5,080,698.
[36] Matsuo, S.; Murakami, T.; Takasawa, R. 1987, U.S. Pat. No. 4,703,104.
[37] Matsuo, S.; Murakami, T. 1987, U.S. Pat. No. 4,663,427.
[38] Matsuo, S.; Murakami, T. 1987, U.S. Pat. No. 4,640,975.
[39] Sakaguchi, Y.; Kitamura, K.; Nagahara, S.; Takase, S. *Polym. Prepr.* 2004, 45, 56.
[40] Sumner, M. J.; Harrison, W. L.; Weyers, R. M.; Kim, Y. S.; McGrath, J. E.; Riffle, J. S.; Brink, A.; Brink, M. H. *J. Membrane Sci.* 2004, 239, 199.
[41] Meng, Y. Z.; Tjong, S. C.; Hay, A. S.; Wang, S. J. *J. Polym. Sci. Part A: Polym. Chem.* 2001, 39, 3218.
[42] Besso, E.; Eisenberg, A. Properties and structures of ionomers and ionomeric membranes, in Proceedings of the Symposium on Membranes and Ionic and Electronic Conducting Polymers, (Yeager, E. B.; Schumm, B.; Mauritz, Jr. K.; Abbey, K.; Blankenship, D.; Akridge, J. eds.), Cleveland, United States, 1982, May 17-19, p. 4.
[43] Gieke, T. D.; Munn, G. E.; Wilson, F. C. *J Polym Sci, Polym Phys* 1981, 19 1687.

[44] Zawodzinski, T. A.; Derouin, C.; Raszinski, S.; Sherman, R. J.; Smith, V. T.; Springer, T. E.; Gottesfeld, S. *J. Electrochem. Soc.* 1993, 140, 1041.
[45] Jian, X. G.; Meng, Y. Z.; Zheng, H. B. Chin. Pat. 93109180.2 (1993).
[46] Jian, X. G.; Meng, Y. Z.; Zheng, H. B. Chin. Pat. 93109179.9 (1993).
[47] Yoshida, S.; Hay, A. S. Macromolecules, 1995, 36, 2579-2581.
[48] Ding, Y.; Hay, A. R.; Hay, A. S. Polym Prepr, 1997, 38, 187-188.
[49] Kim Y S, Wang F, Hickner M, Mccartney S, Hong Y T, Harrison W, Zawodziniski T A, McGrath J E. J Polym Sci Part B: Polym Phys 2003; 41:2816.
[50] Kim, Y. S.; Dong, L.; Hickner, M. A.; McGrath, J. E. *Macromolecules* 2003, 36, 6281.
[51] Gao Y, Robertson G P, Guiver M D, Mikhailenko S D, Li X, Kaliaguine S. Macromolecules 2005; 38:3237

What is claimed is:

1. A sulfonated aromatic nitrile containing polymer of structural formula I,

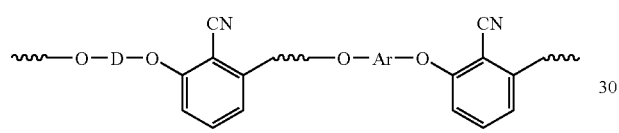

wherein D is

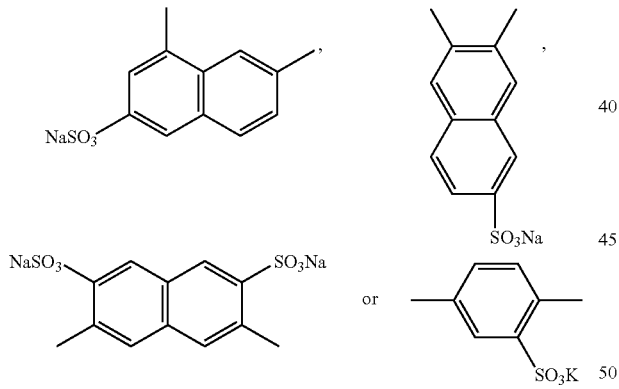

having a sulfonic acid content (SC) expressed as a number per repeat unit of polymer of from 0.5 to 1.0, and wherein Ar is phenyl or diphenyl.

2. A polymer according to claim 1, wherein Ar is diphenyl.

3. A polymer according to claim 2, wherein D is

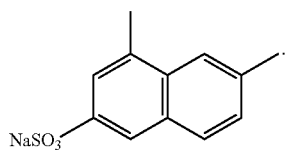

4. A polymer according to claim 2, wherein D is

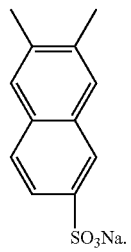

5. A polymer according to claim 2, wherein D is

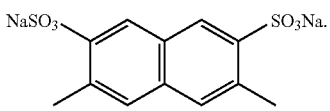

6. A polymer according to claim 2, wherein D is

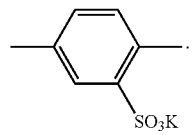

7. A process for making a sulfonated aromatic nitrile containing polymer of structural formula I as defined in claim 1, comprising reacting a sulfonated diphenol monomer with an aromatic nitrile monomer and a bisphenol-type monomer in the presence of potassium carbonate, wherein the molar feed ratio of sulfonated diphenol monomer to the bisphenol type monomer is varied to provide a sulfonic acid group content (SC) expressed as a number per repeat unit of polymer of from 0.5 to 1.0, wherein the bisphenol-type monomer is of the structural formula HO—Ar—OH, wherein Ar is phenyl or diphenyl and wherein sulfonated diphenol monomer the sulfonate groups are in acid or salt form and wherein the sulfonated diphenol monomer is

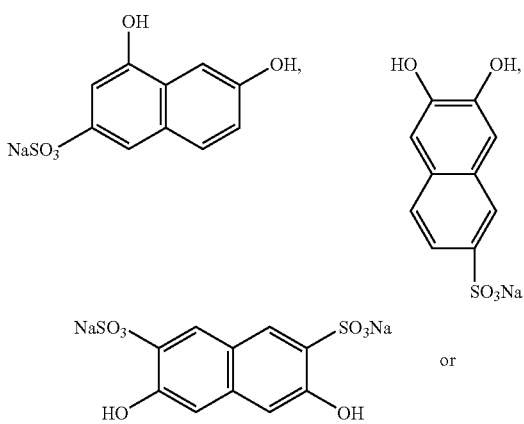

-continued

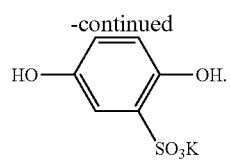

8. A process according to claim 7, wherein Ar is diphenyl.
9. A process according to claim 8, wherein the aromatic nitrile monomer is 2,6-dihalo benzonitrile.
10. A process according to claim 9, wherein aromatic nitrile monomer is 2,6-difluoro benzonitrile.
11. A proton exchange membrane, comprising a sulfonated aromatic nitrite containing polymer, of structural formula I as defined in claim 1

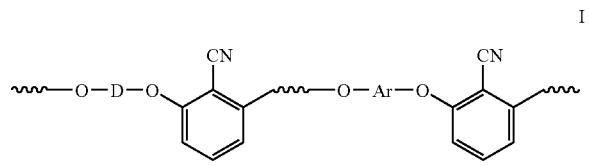

wherein D is

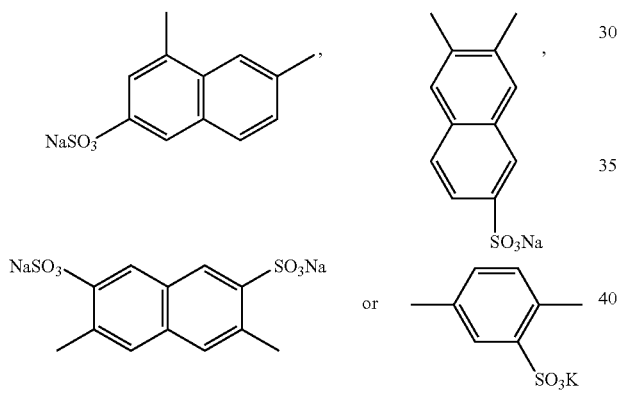

having a sulfonic acid content (SC) expressed as a number per repeat unit of polymer of from 0.5 to 1.0,
and wherein the sulfonate is in the acid or salt form and wherein Ar is phenyl or diphenyl.

12. A process for making a proton exchange membrane, comprising a sulfonated aromatic nitrile containing polymer of structural formula I as defined in claim 1

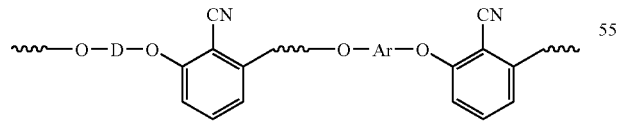

wherein D is

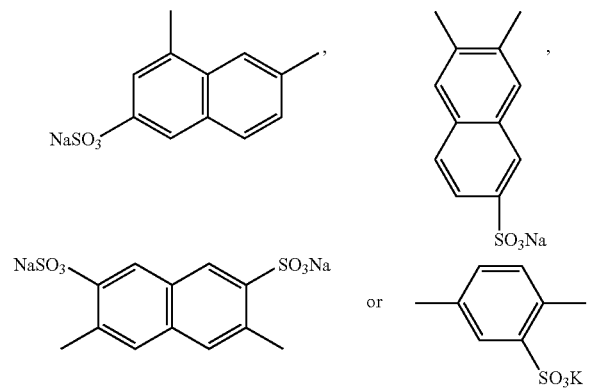

having a sulfonic acid content (SC) expressed as a number per repeat unit of polymer of from 0.5 to 1.0
and wherein the sulfonate is in the acid or salt form and wherein Ar is phenyl or diphenyl,
the process comprising casting the membrane from a solution of the polymer in a solvent.

13. A process according to claim 8, wherein the sulfonated diphenol monomer is

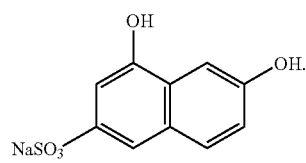

14. A process according to claim 8, wherein the sulfonated diphenol monomer is

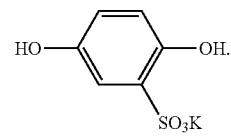

15. A polymer according to claim 3, wherein the SC is 0.6.
16. A process according to claim 14, wherein the amount of

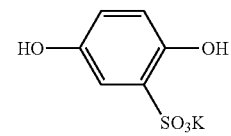

is 6 mmol, providing an SC of 0.6.

* * * * *